United States Patent
Gilley et al.

(10) Patent No.: US 12,088,963 B2
(45) Date of Patent: *Sep. 10, 2024

(54) SYSTEM AND METHOD FOR MOVIE SEGMENT BOOKMARKING AND SHARING

(71) Applicant: Open Text SA ULC, Halifax (CA)

(72) Inventors: Thomas S. Gilley, New York, NY (US); Eric Hoffert, South Orange, NJ (US); Brenda Pomerance, New York, NY (US); Razvan Pop, Satu Mare (RO)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,557

(22) Filed: Apr. 28, 2023

(65) Prior Publication Data

US 2023/0319235 A1    Oct. 5, 2023

Related U.S. Application Data

(63) Continuation of application No. 17/836,860, filed on Jun. 9, 2022, now Pat. No. 11,706,388, which is a
(Continued)

(51) Int. Cl.
*G06F 3/048* (2013.01)
*G06F 16/78* (2019.01)
(Continued)

(52) U.S. Cl.
CPC ............. *H04N 7/173* (2013.01); *G06F 16/78* (2019.01); *G06F 16/7844* (2019.01);
(Continued)

(58) Field of Classification Search
None
See application file for complete search history.

(56) References Cited

U.S. PATENT DOCUMENTS 11,930,227 B2    3/2024    Gilley et al.
11,990,157 B2    5/2024    Gilley et al.
(Continued)

OTHER PUBLICATIONS

Final Office Action issued for U.S. Appl. No. 17/010,731, mailed May 16, 2023, 21 pages.
(Continued)

*Primary Examiner* — William C Trapanese
(74) *Attorney, Agent, or Firm* — Sprinkle IP Law Group

(57) ABSTRACT

Several ways are provided for a viewer of a movie to create a deep tag, that is, a bookmark for a segment of the movie. The deep tag can be associated with descriptive text and sent to an address provided by the viewer, either an e-mail address or an instant messaging address. Additionally, before the deep tag is created, it can be checked whether the content owner of the movie is known. If known, the content owner's rules, if any, regarding deep tagging are followed. If unknown, a set of registered content owners can be alerted of the presence of new content. When ownership of the new content is established, the already-created deep tags can be updated in accordance with the content owner's rules, if any, regarding deep tagging.

20 Claims, 36 Drawing Sheets

Related U.S. Application Data continuation of application No. 17/209,101, filed on Mar. 22, 2021, now Pat. No. 11,381,779, which is a continuation of application No. 16/744,840, filed on Jan. 16, 2020, now Pat. No. 10,958,876, which is a continuation of application No. 15/365,308, filed on Nov. 30, 2016, now Pat. No. 10,594,981, which is a continuation of application No. 11/713,115, filed on Feb. 27, 2007, now Pat. No. 9,648,281, which is a continuation-in-part of application No. 11/592,901, filed on Nov. 3, 2006, now Pat. No. 8,145,528, which is a continuation-in-part of application No. 11/439,593, filed on May 23, 2006, now Pat. No. 7,877,689, and a continuation-in-part of application No. 11/439,594, filed on May 23, 2006, now Pat. No. 8,724,969, and a continuation-in-part of application No. 11/439,600, filed on May 23, 2006, now Pat. No. 8,755,673.

(60) Provisional application No. 60/683,662, filed on May 23, 2005.

(51) Int. Cl.
*G06F 16/783* (2019.01)
*G11B 27/034* (2006.01)
*H04N 7/173* (2011.01)
*H04N 21/2547* (2011.01)
*H04N 21/258* (2011.01)
*H04N 21/262* (2011.01)
*H04N 21/2743* (2011.01)
*H04N 21/4786* (2011.01)
*H04N 21/4788* (2011.01)
*H04N 21/81* (2011.01)
*H04N 21/8355* (2011.01)
*H04N 21/845* (2011.01)

(52) U.S. Cl.
CPC ....... *G11B 27/034* (2013.01); *H04N 21/2547* (2013.01); *H04N 21/25866* (2013.01); *H04N 21/262* (2013.01); *H04N 21/2743* (2013.01); *H04N 21/4786* (2013.01); *H04N 21/4788* (2013.01); *H04N 21/812* (2013.01); *H04N 21/8355* (2013.01); *H04N 21/8455* (2013.01); *G11B 2220/2562* (2013.01)

(56) References Cited

U.S. PATENT DOCUMENTS

| | | |
|---|---|---|
| 11,991,406 B2 | 5/2024 | Gilley et al. |
| 2002/0144263 A1 | 10/2002 | Eldering et al. |
| 2002/0145622 A1 | 10/2002 | Kauffman et al. |
| 2004/0103429 A1 | 5/2004 | Carlucci et al. |
| 2004/0128317 A1* | 7/2004 | Sull ................ G06F 16/743 |
| 2005/0058460 A1 | 3/2005 | Wang |
| 2006/0013554 A1 | 1/2006 | Poslinski |
| 2006/0224940 A1 | 10/2006 | Lee |
| 2023/0197113 A1 | 6/2023 | Gilley et al. |

OTHER PUBLICATIONS

Notice of Allowance issued for U.S. Appl. No. 17/093,727, mailed Aug. 1, 2023, 9 pages.
Notice of Allowance issued for U.S. Appl. No. 17/196,087, mailed Jul. 20, 2023, 14 pages.
Office Action issued for U.S. Appl. No. 18/170,764, mailed Jul. 7, 2023, 14 pages.
Office Action issued for U.S. Appl. No. 18/171,287, mailed Jul. 11, 2023, 10 pages.
Office Action issued for U.S. Appl. No. 17/010,731, mailed Sep. 8, 2023, 9 pages.
Notice of Allowance issued for U.S. Appl. No. 17/093,727, mailed Oct. 30, 2023, 9 pages.
Notice of Allowance issued for U.S. Appl. No. 18/171,287, mailed Oct. 30, 2023, 9 pages.
Notice of Allowance issued for U.S. Appl. No. 17/010,731, mailed Dec. 29, 2023, 9 pages.
Office Action issued for U.S. Appl. No. 18/170,764, mailed Dec. 29, 2023, 12 pages.
Notice of Allowance issued for U.S. Appl. No. 17/093,727, mailed Mar. 20, 2024, 9 pages.
Office Action issued for U.S. Appl. No. 18/170,764, mailed Jun. 6, 2024, 9 pages.
Notice of Allowance issued for U.S. Appl. No. 17/196,087 mailed Feb. 22, 2024, 11 pages.

* cited by examiner

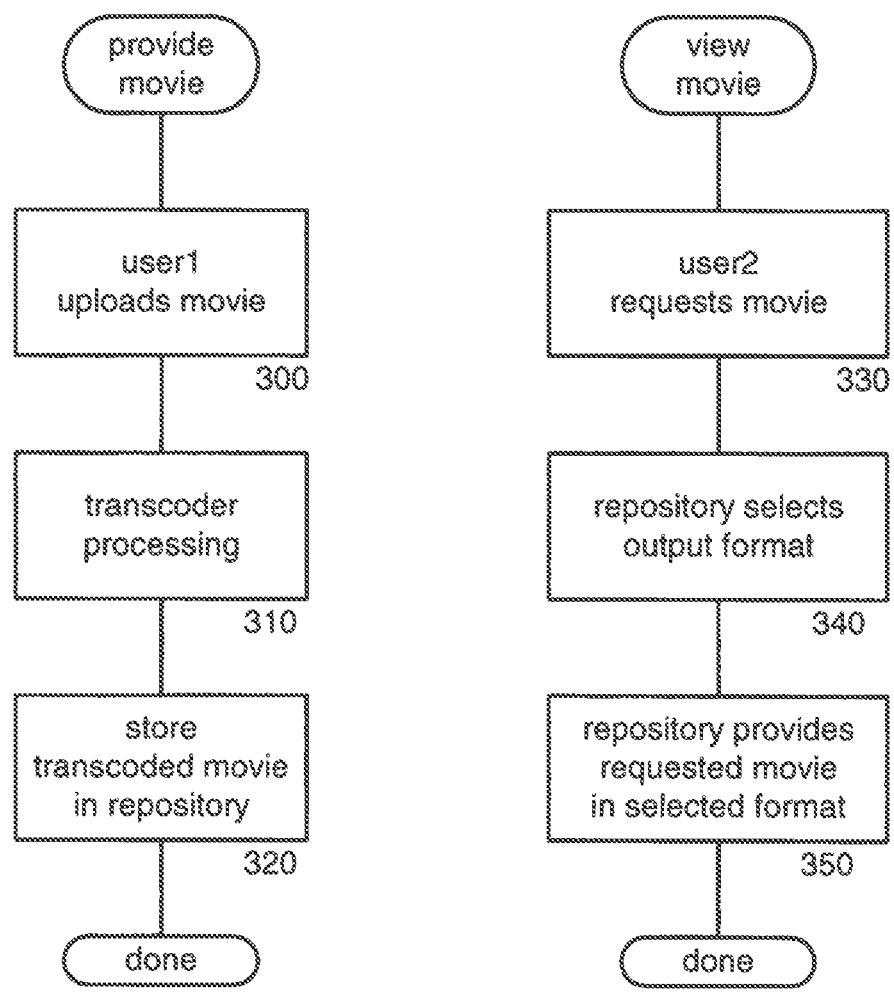

Fig. 19A
(Prior Art)
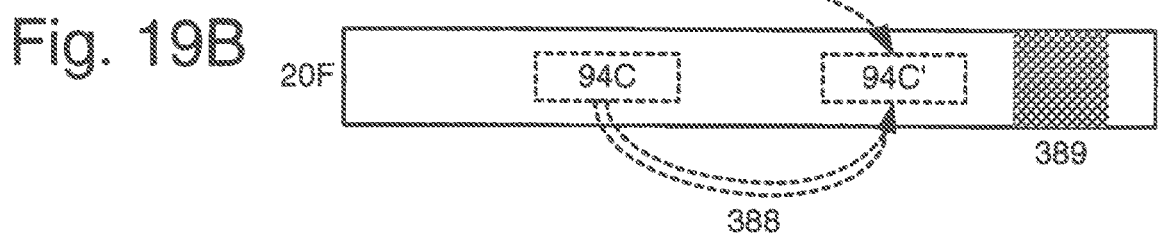
Fig. 19B
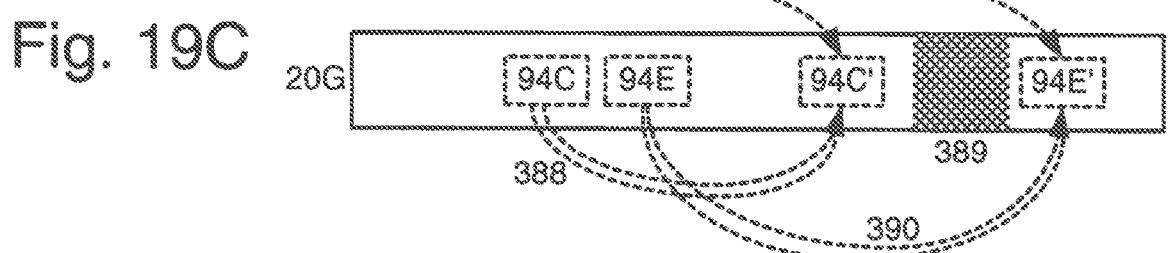
Fig. 19C
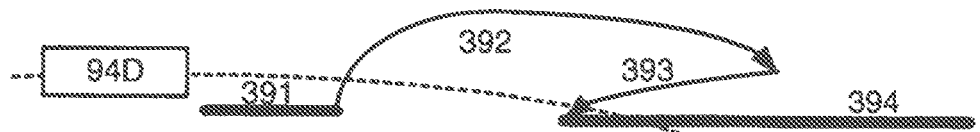
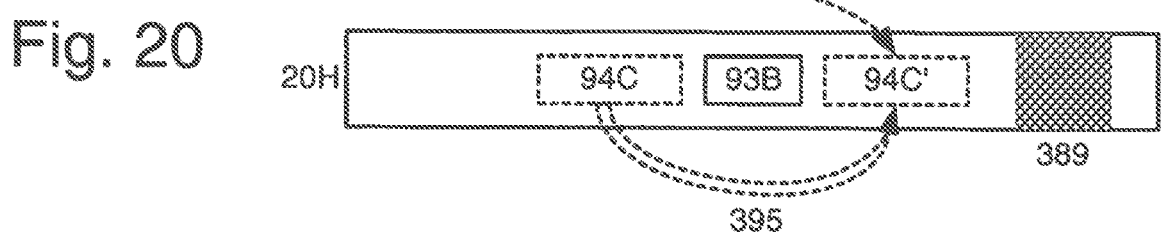
Fig. 20

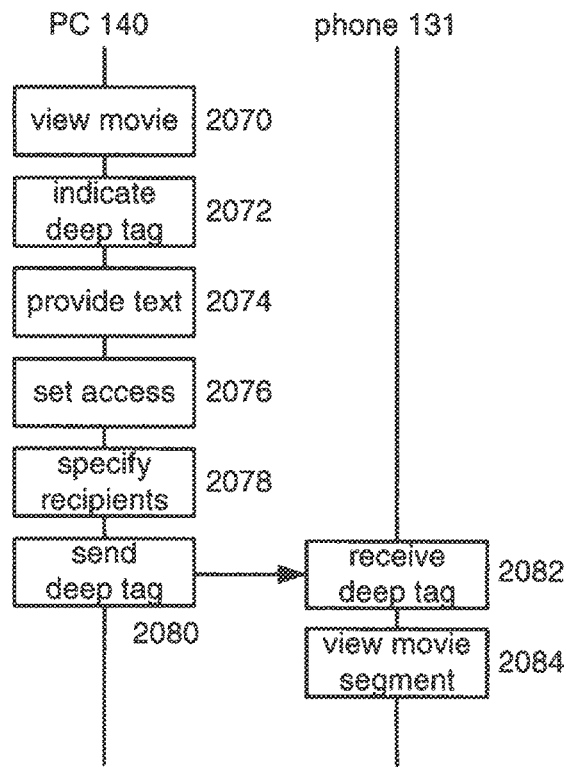

DEEP TAG, Known Content Owner
ID
MovieID
UserID
DTStartTime
DTEndTime
DTDescription
No.DTSnapshots
DTSnapshotPointers

DEEP TAG, Unknown Content Owner
ID
MovieID
Movie-ID-print
UserID
DTStartTime
DTEndTime
DTDescription
No.DTSnapshots
DTSnapshotPointers
DTCreationDateTime
(Sender1,Recipient1,FirstViewDate1)
DT1Description
(Sender2,Recipient2,FirstViewDate2)
(Sender3,Recipient3,FirstViewDate3)
(Sender4,Recipient4,FirstViewDate4)
DT4Description
(Sender5,Recipient5,FirstViewDate5)

Fig. 38B

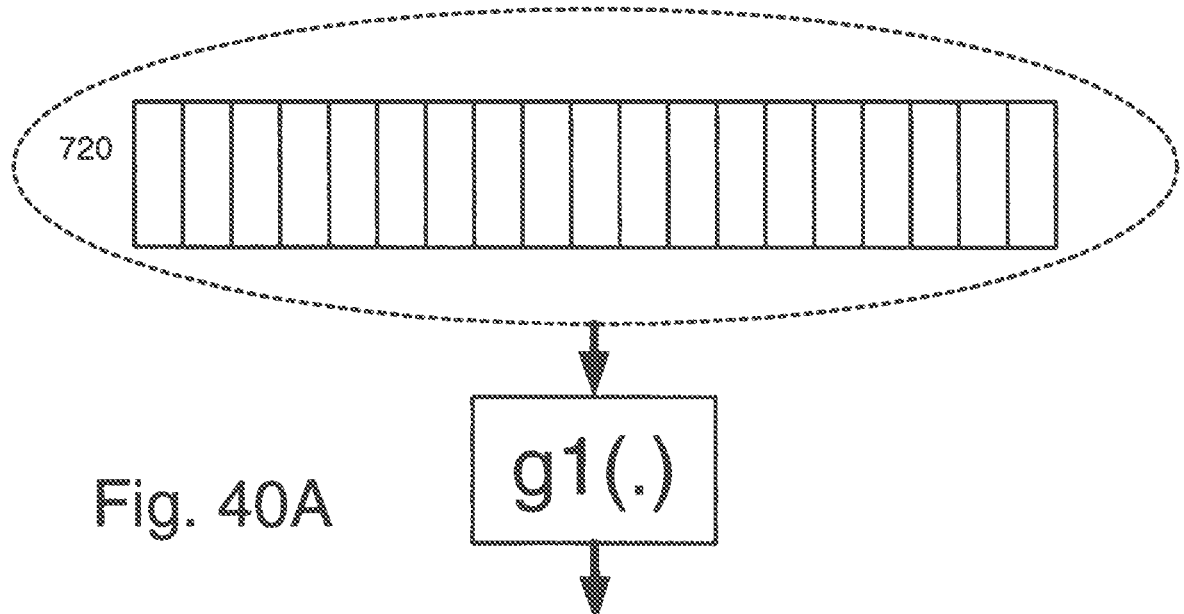
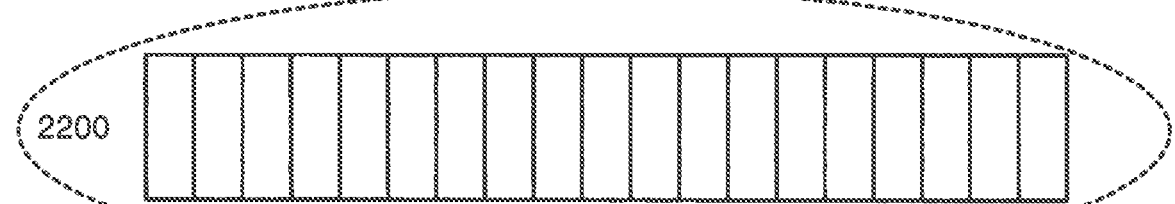
Fig. 40A
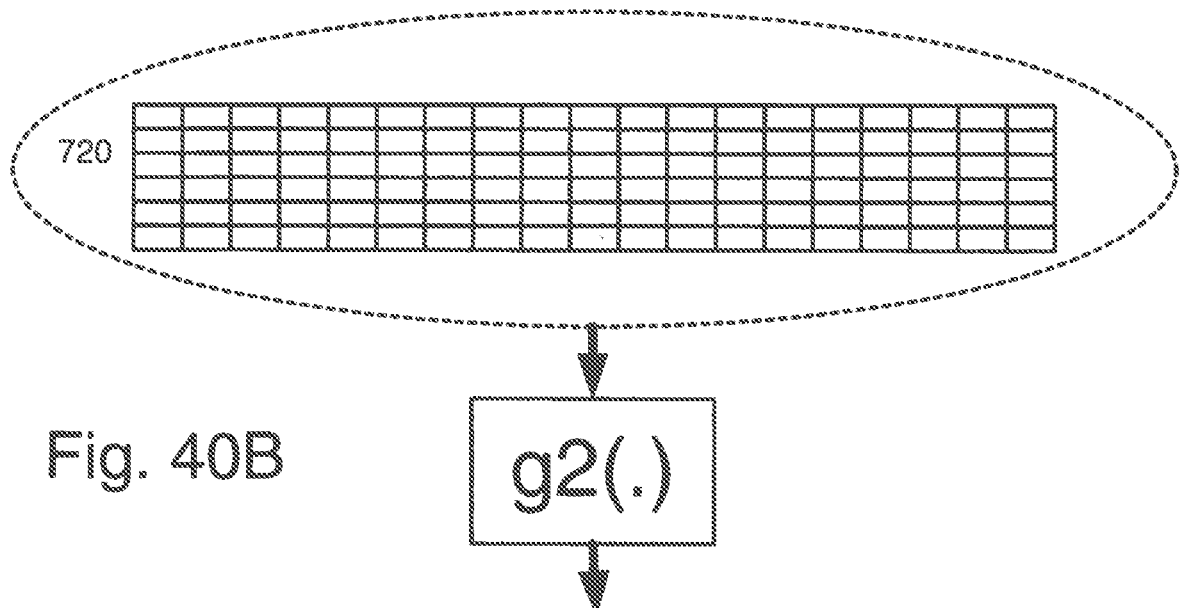
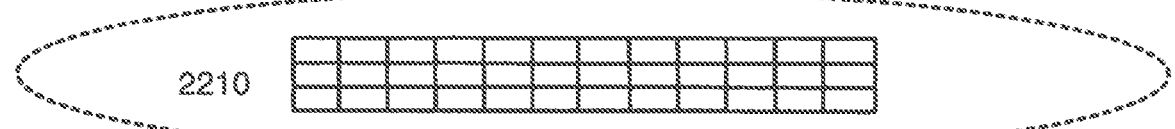
Fig. 40B

2350

Your Sender email address: ☐

Recipient email addresses: ☐

Access:  o No changes allowed to this deep tag
         o Add Comments OK
         o No restrictions on changing this deep tag Enable Instant Deep Tag:  o (Submit)  (Cancel)

SYSTEM AND METHOD FOR MOVIE SEGMENT BOOKMARKING AND SHARING

CROSS-REFERENCE TO RELATED APPLICATIONS

This application is a continuation of, and claims a benefit of priority from, U.S. patent application Ser. No. 17/836,860, filed Jun. 9, 2022, now U.S. Pat. No 11,706,338, entitled "SYSTEM AND METHOD FOR MOVIE SEGMENT BOOKMARKING AND SHARING," which is a continuation of U.S. patent application Ser. No. 17/209,101, filed Mar. 22, 2021, now U.S. Pat. No. 11,381,779, entitled "SYSTEM AND METHOD FOR MOVIE SEGMENT BOOKMARKING AND SHARING," which is a continuation of U.S. patent application Ser. No. 16/744,840, filed Jan. 16, 2020, now U.S. Pat. No. 10,958,876, entitled "SYSTEM AND METHOD FOR MOVIE SEGMENT BOOKMARKING AND SHARING," which is a continuation of U.S. patent application Ser. No. 15/365,308, filed Nov. 30, 2016, now U.S. Pat. No. 10,594,981, entitled "SYSTEM AND METHOD FOR MOVIE SEGMENT BOOKMARKING AND SHARING," which is a continuation of U.S. patent application Ser. No. 11/713,115, filed Feb. 27, 2007, now U.S. Pat. No. 9,648,281, entitled "SYSTEM AND METHOD FOR MOVIE SEGMENT BOOKMARKING AND SHARING," which is a continuation-in-part of U.S. patent application Ser. No. 11/592,901, filed Nov. 3, 2006, now U.S. Pat. No. 8,145,528, entitled "MOVIE ADVERTISING PLACEMENT OPTIMIZATION BASED ON BEHAVIOR AND CONTENT ANALYSIS," which is a continuation-in-part of U.S. patent application Ser. No. 11/439,600, filed May 23, 2006, now U.S. Pat. No. 8,755,673, entitled "METHOD, SYSTEM AND COMPUTER PROGRAM PRODUCT FOR EDITING MOVIES IN DISTRIBUTED SCALABLE MEDIA ENVIRONMENT," of U.S. patent application Ser. No. 11/439,594, filed May 23, 2006, now U.S. Pat. No. 8,724,969, entitled "METHOD, SYSTEM AND COMPUTER PROGRAM PRODUCT FOR EDITING MOVIES IN DISTRIBUTED SCALABLE MEDIA ENVIRONMENT," and of U.S. patent application Ser. No. 11/439,593, filed May 23, 2006, now U.S. Pat. No. 7,877,689, entitled "DISTRIBUTED SCALABLE MEDIA ENVIRONMENT FOR MOVIE ADVERTISING PLACEMENT IN USER-CREATED MOVIES," which claim a benefit of priority from U.S. Provisional Application No. 60/683,662, filed May 23, 2005, entitled "DISTRIBUTED SCALABLE MEDIA ENVIRONMENT." All applications referenced in this paragraph are fully incorporated herein in their entireties.

BACKGROUND OF THE RELATED ART

The invention relates to processing recorded video and audio, and more specifically, to techniques for determining where in a movie to insert an ad.

Linear media editing systems used for analog audio, video tape and photographic film are manual, time consuming and cumbersome to reduce content into a final form and distribute. In more recent times computer systems allow for time efficient non-linear video editing systems. Current non-linear editing on computer oriented systems involves capturing media content permitting rapid access to the media content at any point in the linear sequence for moving portions into any order and storing the media content on a storage device, such as a magnetic disk drive or digital versatile disk (DVD).

The average person currently has small set of alternatives for editing content from media capture devices such as camcorders, camera phones, audio recorders, and other media capture devices without having to incur the costs of a computer system and software for editing. In addition, non-linear editing systems are complex and very difficult to use.

People capture various random and personally interesting events, such as work, travel and entertainment event using their camcorders or camera phones. To edit this content, people require easy to use non-linear editing systems that facilitate editing without a high degree of computer or editing skill.

Media content storage technologies provide for storing great amounts of interactive multimedia, for example, the DVD format. Unfortunately, the DVD Specification for authoring is very complex, as are the computer systems that attempt to embody it. A further disadvantage of conventional DVD authoring systems is that they provide a DVD author with only minimal control and flexibility.

The process of authoring a DVD includes a number of complex steps and equipment. Accordingly, there is a need for authoring systems and methods that reduces the time, cost and complexity of the authoring and distributing DVD.

Separate and distinct systems for computer based non-linear editing, DVD authoring, and distributions are known. However, no system exists that enables an ad to be flexibly placed in different areas of a movie according to an automatic procedure.

SUMMARY OF THE INVENTION

In accordance with the present invention, there is provided a method for enabling a viewer to create a deep tag for a segment of a movie. An indicator for generating the deep tag representing the segment of the movie is provided. An actuation of the indicator is received from the viewer. A deep tag corresponding to the actuation of the indicator is created and stored.

In some cases, descriptive text provided by the viewer is associated with the deep tag, and the deep tag is sent to at least one address provided by the viewer.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 7 and 8 are flowcharts depicting high-level operation of movie uploading and downloading, respectively;

FIGS. 19A-19C are charts illustrating slip-ad;

FIG. 20 is a chart illustrating ad bounceback and slip-ad;

FIG. 37 is a flowchart showing creation of a deep tag and sending the deep tag to another party;

FIGS. 38A and 38B show embodiments of deep tags;

FIGS. 40A-40D depict different ways to create a movie-id-print;

DETAILED DESCRIPTION

As used herein and in the claims, the term "movie" refers to video and/or audio data intended for display to a human. In some cases, the video and audio data are separate but associated data, while in other cases, the video and audio are combined. In still other cases, video exists without audio, and vice-versa. Video encompasses still image data and moving image data.

As used herein and in the claims, the term "editing" includes but is not limited to removing portions of a movie, combining at least two movies to create a new movie, and/or generation of special effects that are composited into a movie. The term "compositing" refers to combining by inserting or overlaying additional content into movie content, for example, adding foreign language subtitles.

As used herein, the term "editor" sometimes means a human who is editing a movie, and sometimes means a computer software program used by the human who is editing a movie to perform the editing.

The disclosures of the following patents are hereby incorporated by reference in their entirety:

| U.S. Pat. No. | Issue Date | Title |
|---|---|---|
| 5,880,722 | Mar. 9, 1999 | Video cursor with zoom in the user interface of a video editor |
| 5,886,692 | Mar. 23, 1999 | Attracting/repelling edit blocks in a user interface of a video editor |
| 6,027,257 | Feb. 22, 2000 | Pan and tilt unit |
| 6,157,771 | Dec. 5, 2000 | Method and apparatus for seeking within audiovisual files |
| 6,181,883 | Jan. 30, 2001 | Dual purpose camera for VSC with conventional film and digital image capture modules |
| 6,201,925 | Mar. 13, 2001 | Method and apparatus for editing video files |
| 6,262,777 | Jul. 17, 2001 | Method and apparatus for synchronizing edited audiovisual files |
| 6,285,361 | Sep. 4, 2001 | Method and apparatus for clipping video segments from an audiovisual file |
| 6,400,886 | Jun. 4, 2002 | Method and apparatus for stitching edited video segments |
| 6,661,430 | Dec. 9, 2003 | Method and apparatus for copying an audiovisual segment |

Figure 1:
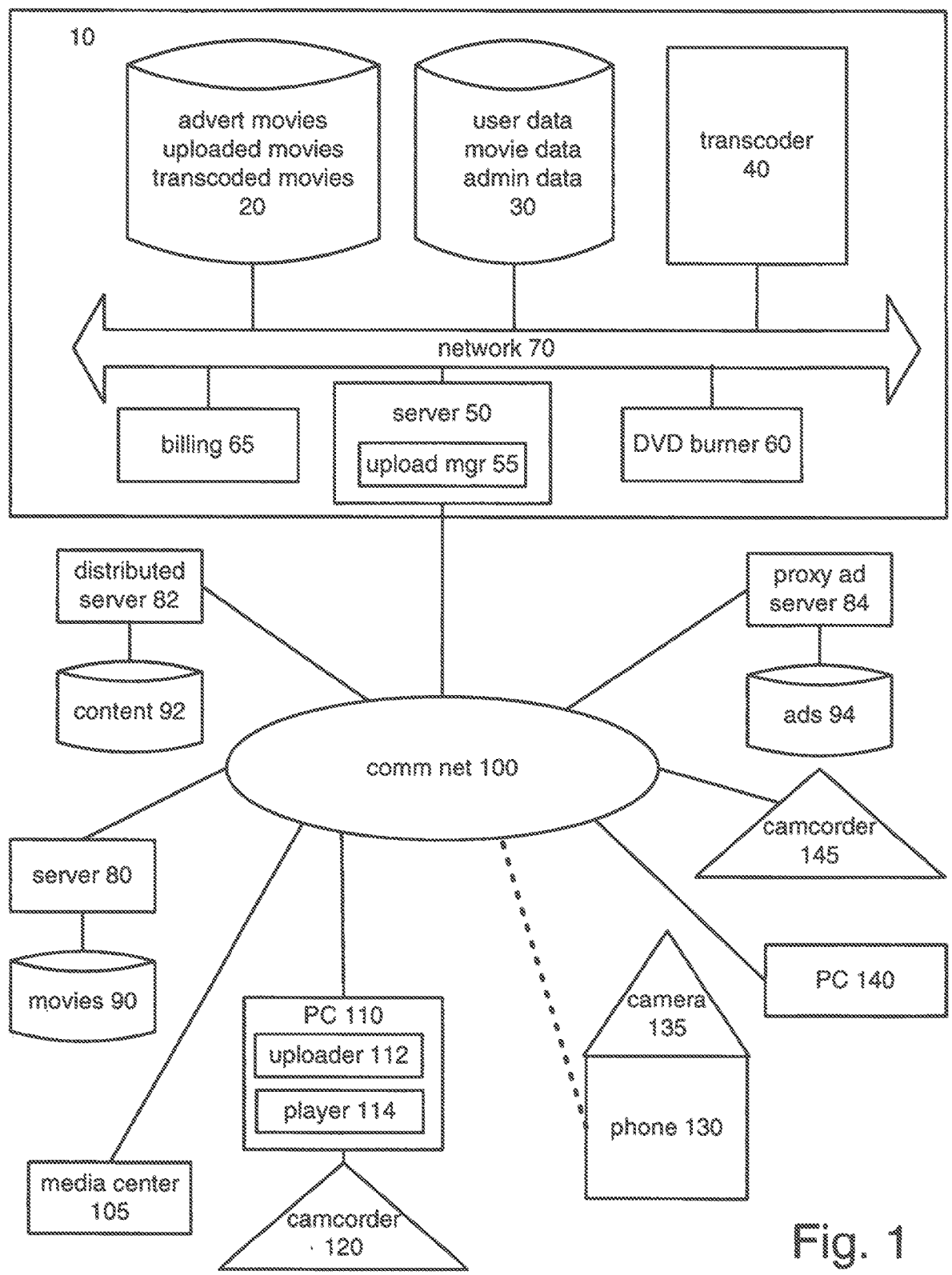
FIG. 1 is a configuration diagram for one embodiment of the present invention wherein the transcoder is used via a public communication network.

There are several environments in which a user might want to use a movie. Turning to FIG. 1, an environment including public communication network 100 is shown. Network 100 may be the Internet. Coupled to network 100 are movie system 10, server 80, distributed server 82, proxy ad server 84, media center 105, PC 110, phone 130, PC 140 and camcorder 145. Coupling occurs via wireline and/or wireless communication lines, possibly with intermediate computers such as an Internet service provider (not shown).

Movie system 10 includes videobase 20, database 30, transcoder 40, server 50, DVD burner 60 and internal network 70. In some embodiments, videobase 20 and database 30 are combined. Elements 20, 30, 40, 50 are general purpose computers programmed according to the present invention, and include suitable processors, memory, storage and communication interfaces; and each element may be embodied in one or many physical units depending on factors such as expected processing volume, redundant hardware design and so on.

Videobase 20 serves to store movies uploaded by users, in their uploaded format, and to store transcoded versions of these movies. Videobase 20 also stores advertisement movies, referred to herein as "ads", intended for inclusion in the transcoded movies.

Database 30 serves to store data for movie system 10, including data relating to users of movie system 10, movies processed by movie system 10, and suitable administrative data such as usage, throughput and audit trail information. In some embodiments, users use movie system 10 for free and the suppliers of ads pay upon ad viewing. In other embodiments, users pay based on usage or a flat rate.

Transcoder 40 serves to receive uploaded movies and process them to generate transcoded movies, as described in detail below with regard to FIG. 10.

Server 50 receives requests from users via network 100 and responds thereto. In cases where responding to a request requires the services of transcoder 40, server 50 passes appropriate messages between transcoder 40 and network 100. Server 50 also functions as a firewall to protect network 70 from improper usage.

Server 50 executes upload manager 55, a software program that works with uploader 112, described below, to upload a movie to server 50.

DVD burner 60 is responsive to commands from transcoder 40 to create a digital video disk, which is then shipped via conventional physical shipping services. In other embodiments, instead of a digital video disk, a read-only or read-write storage medium is created and then the medium is physically delivered to a recipient. Suitable formats include CD (compact digital), DVD (digital video disk), Blu-ray Disc, HD (high definition) DVD, flash drives (transistor memory), jump drives (removable disk drives) and the like.

Billing program 65 examines usage data created by transcoder 40 and server 50. The usage data is part of the administrative data in database 30. Billing program 65 then generates invoices and applies authorized payments. For example, some users may have preauthorized charges to their credit cards, telephone bills or bank accounts for their usage of movie system 10. As another example, transcoded movies created by users may include advertising, for which the advertisers agree to pay based on number of views, and if so, billing system 65 arranges payments to users based on usage of the transcoded movies with advertising.

There is a cost to store and distribute movies. To offset this cost, and to reward users, movie system 10 enables movie creators to include ads, either manually or automatically, in their movies. Movie system 10 enables flexible ad placement, including at the start or end of a movie, within selected frames of a movie, and at a selected location and size within the selected frames. Advertisers generally pay for placement of their ads based on number of times their ad is viewed, and possibly in accordance with the popularity of the place in the movie where the ad is inserted, how much time the ad is inserted for, and the size of the ad relative to a movie frame.

Internal network 70 serves to carry communication traffic between the elements of movie system 10. Internal network 70 may be a local area network at a single premises, or may span multiple premises.

Server 80 is a general purpose computer coupled to storage 90. Server 80 responds to requests from communication network 100 by providing movies stored in storage 90. By providing the address of server 80 to movie system 10, one of the movies stored in storage 90 can be used as an input for transcoder 40.

Distributed server 82 is a general purpose computer coupled to storage 92. Storage 92 holds copies of some or all of the transcoded movies stored in storage 20 of movie system 10. In some embodiments, there are many instances of server 82 and storage 92. Distributed server 82 responds to requests from viewers for the transcoded movies stored therein. Use of distributed server 82 reduces response time to requests, reduces the amount of work that movie system 10 needs to do, and reduces bandwidth utilization since usually the instance of server 82 that is closest to the requestor responds thereto. Products and services according to distributed server 82 are available from Kontiki, a Verisign company, and from Akamai.

Proxy ad server 84 is a general purpose computer coupled to storage 94. Storage 94 stores ads. Operation of proxy ad server 84 is discussed below with regard to FIG. 6.

Media center 105 generally represents a television that is able to communicate via network 100. In some embodiments, a viewer provides instructions to media center 105 via a remote keypad, while in other embodiments, a viewer provides instructions to media center 105 using a full keyboard with function keys and so on. In still other embodiments, media center 105 includes a voice recognition unit so that the viewer provides instructions through speech. In some embodiments, such as a home, media center 105 is able to communicate directly with PC 110 and/or phone 130.

PC 110 is a general purpose personal computer coupled to camcorder 120. Camcorder 120 enables a user to record a movie and transfer the movie to PC 110.

PC 110 executes uploader 112 and player 114. Uploader 112 is a software program that enables a movie to be uploaded from PC 110 to server 50. Player 114 is a software program that enables PC 110 to view and edit movies, in conjunction with transcoder 40. When PC 110 registers with server 50, server 50 downloads uploader 112 and player 114 to PC 110.

Uploader 112 functions to locate movie files stored in PC 110, and to manage transmission of the movie files to upload manager 55 of server 50 using a suitable protocol such as the secure file transfer protocol (sftp). In embodiments having a peer-to-peer network for downloading, such as networks using the BitTorrent protocol, the peer-to-peer network is also used for uploading. Since movie files are large, the file uploading may be interrupted; uploader 112 enables the uploading to resume at its interruption point. In some embodiments, uploader 112 converts a very large file, such as a 36 Mb file in DV format, to a smaller file of comparable visual quality, such as a 3 Mb files in MPEG format. Uploader 112 enables the user of PC 110 to select a file for uploading; to monitor the status of the upload, such as percent completed and speed of uploading; to pause and resume the uploading; and to cancel the uploading.

Player 114 is a client application for a PC browser. In some embodiments, player 114 resides on a portable device such as a mobile phone or network-attached digital video camera without a browser, and in these embodiments, player 114 is a network enabled client application.

Player 114 enables a user to view a movie, including forward seek and rewind functions; to seek the compressed video on a remote server using random seek points; to request a movie download from the random seek point, for example, in accordance with U.S. Pat. No. 6,157,771, the disclosure of which is hereby incorporated by reference in its entirety; and to use the functions described below with regard to FIG. 10 on the movie, including creating and editing deep tags (movie segment bookmarks, see FIG. 38A), creating and editing mash-ups, adding special effects, providing sharing permission to other users, creating virtual and/or physical DVDs, inserting ads, and creating and editing watermarks. FIG. 11, discussed below, shows a graphical user interface for player 114.

Phone 130 is a wireless communication device executing versions of uploader 112 and player 114 adapted for the device capabilities of phone 130. Phone 130 is a coupled to camera 135, which serves to capture images and provide the captured images to phone 130 as a movie signal. In some embodiments, phone 130 uses the multimedia messaging service (MMS) protocol to transmit and/or receive movies. In other embodiments (not shown), phone 130 communicates with a local network using a protocol such as WiFi, and the WiFi network in turn communicates with communication network 100.

PC 140 is a general purpose personal computer that is able to view transcoded movies by obtaining an address for the movie, or a segment thereof, and providing the address to server 50. As an example, a user of PC 110 or a user of phone 130 may upload a movie to movie system 10, edit the uploaded movie, and provide to the user of PC 140, via email, an address of an edited segment that the user of PC 140 is permitted to view.

Camcorder 145 is a network enabled movie capture device configured to upload its recordings to movie system 10. In some embodiments, there is at least one predefined user group able to immediately edit information uploaded from camcorder 145. This configuration is useful in a security application, for example.

The user of PC 110 or phone 130 serves as an editor. PC 110, phone 130, PC 140 and camcorder 145 are each at respective locations that are remote from the location of movie system 10.

The capabilities of movie system 10 are available via each of the user devices shown in FIG. 1.

Other embodiments of the present invention wherein the transcoder is local to the movie file are described below. Embodiments in which the movie file is not uploaded via a public communication network are sometimes referred to as a transcoder appliance model.

Figure 2A:
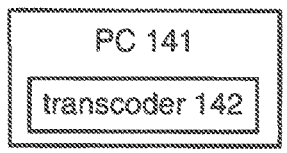
FIGS. 2A and 2B are configuration diagrams for other embodiments of the present invention wherein the transcoder resides locally.

FIG. 2A shows PC 141 as executing transcoder 142. PC 141 typically receives at least one movie to be edited, such as from server 80, and uses transcoder 142 to edit the movie. In some embodiments, transcoder 142 provides only a subset of the functions provided by transcoder 40, in accordance with the processing capability of PC 141. After creating a transcoded movie, PC 141 uploads the transcoded movie to storage 20 in movie system 10, such as by connecting to communication network 100.

Figure 2B:
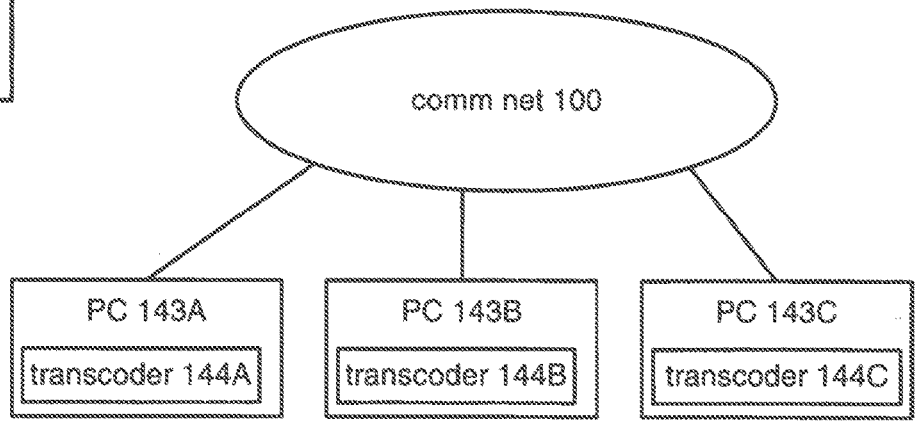

FIG. 2B shows a peer-to-peer transcoder network. PCs 143A, 143B, 143C are connected to communication network 100 and respectively execute transcoders 144A, 1434B, 144C. Since movie editing can involve substantial processing, each of transcoders 144A, 144B, 144C is adapted to distribute parts (tasks) of an editing job to others of transcoders 144A, 144B, 144C. Of course, each of transcoders 144A, 144B, 144C is adapted to receive an editing task, to execute the task, typically as part of background processing, and to send the completed task back to the originating transcoder.

Figure 3:
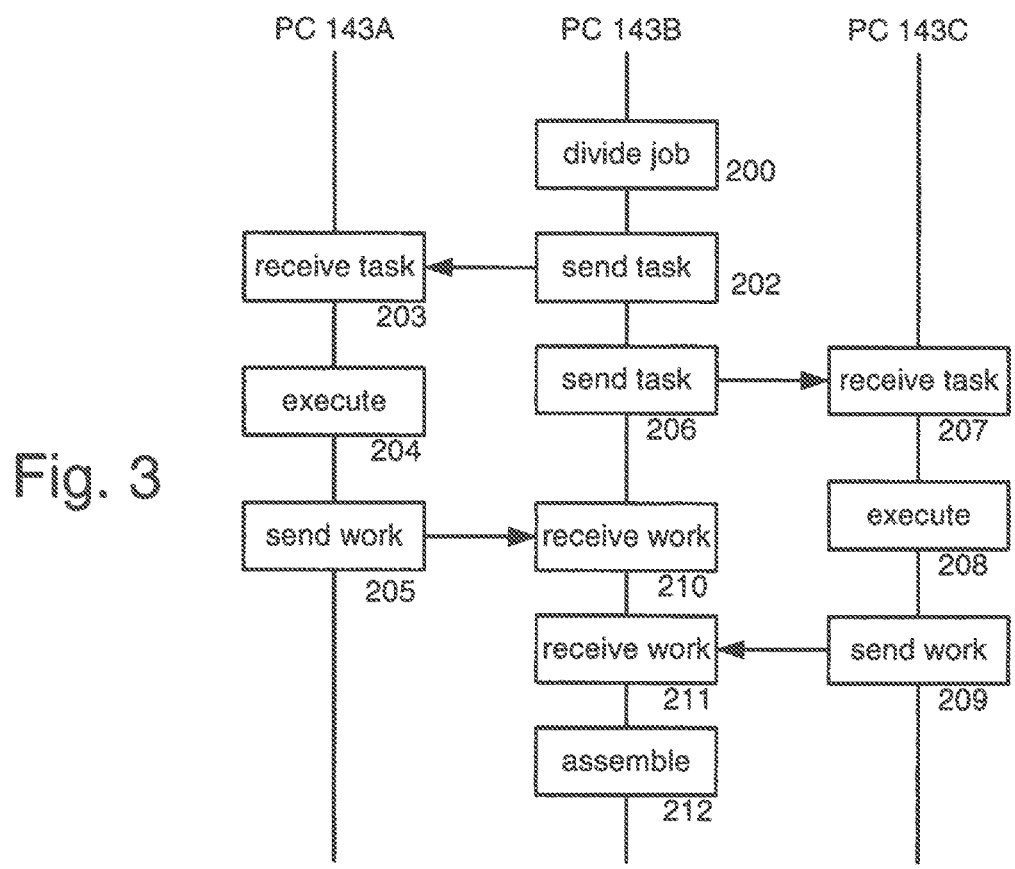
FIG. 3 is an event chart showing distribution and collection of work for a PC-based transcoder using a peer-to-peer network.

FIG. 3 is a flowchart illustrating peer-to-peer transcoding. Let it be assumed that the user of PC 143B is editing a movie. At some point, the user will command a job that transcoder 144B recognizes as requiring substantial processing. Examples are applying a special effect to each frame of a movie, applying a special effect to combine one movie with another such as picture-in-picture (PIP), and compositing of ad placement objects such as cars, clothing, beverages etc. into a movie scene, and so on.

At step 200, transcoder 144B divides the job into tasks. At step 202, transcoder 144B sends one task to transcoder 144A. At step 206, transcoder 144B sends another task to transcoder 144C. At step 210, transcoder 144B receives the completed task from transcoder 144A. At step 211, transcoder 144B receives the completed task from transcoder 144C. At step 212, transcoder 144B assembles the completed tasks into a completed job.

At step 203, transcoder 144A receives a task. At step 204, transcoder 144A executes its task. At step 205, transcoder 144A sends the executed task back to transcoder 144B.

At step 207, transcoder 144C receives a task. At step 208, transcoder 144C executes its task. At step 209, transcoder 144C sends the executed task back to transcoder 144B.

Figure 4A:
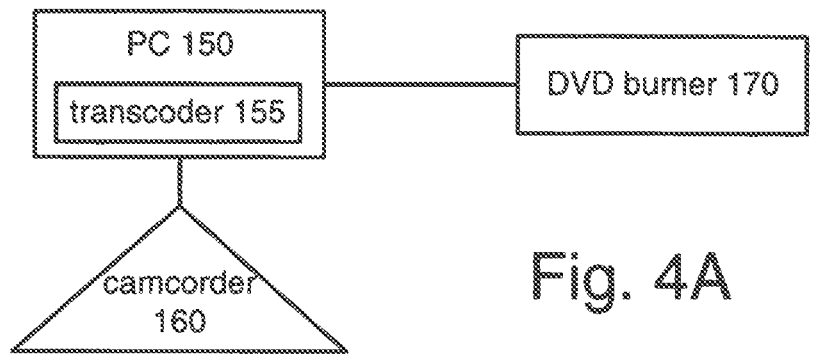
FIGS. 4A-4C are configuration diagrams for embodiments of the present invention wherein the transcoder resides locally.

Turning to the transcoder appliance model, FIG. 4A shows PC 150, camcorder 160 and DVD burner 170. Camcorder 160 is for recording a movie and providing the recorded movie to PC 150. PC 150 is a general purpose personal computer operative to receive and store a recorded movie; to enable a user to edit the stored movie using transcoder 155, which is a software program operative in a similar manner as transcoder 40; and to provide a transcoded movie to DVD burner 170 for recording thereon, in similar manner as DVD burner 60.

Figure 4B:
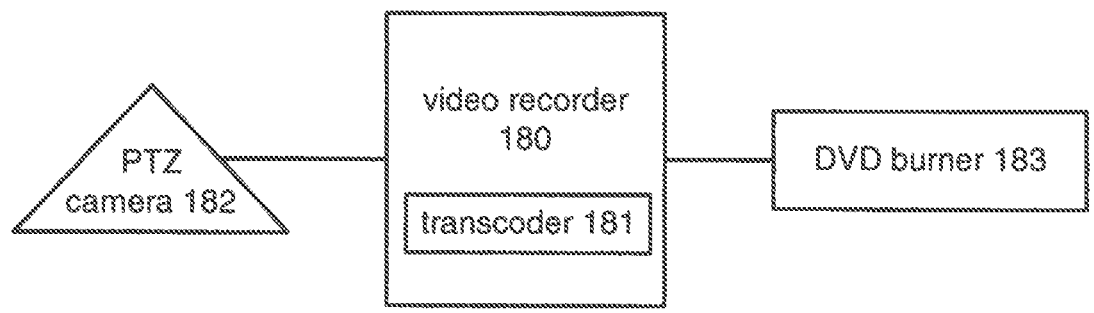

FIG. 4B shows video recorder 180, robotic camera with pan-tilt-zoom (PTZ) control 182, and DVD burner 183. Robotic camera 182 is operative to provide a video signal to video recorder 180. Video recorder 180 is a general purpose computer operative to receive and store the video signal from robotic camera 182, to enable a user to edit the stored video using transcoder 181, which is a software program operative in a similar manner as transcoder 40; and to provide a transcoded movie to DVD burner 183 for recording thereon, in similar manner as DVD burner 60.

Figure 4C:
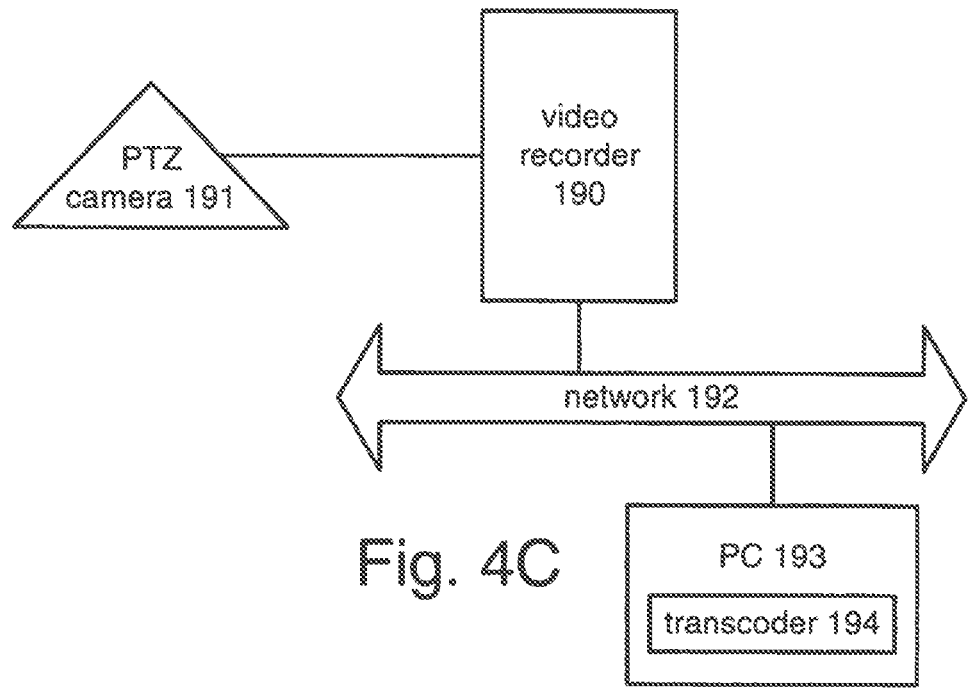

FIG. 4C shows robotic camera 191, video recorder 190, private network 192 and PC 193. PTZ camera 191 is operative to provide a video signal to video recorder 190. Video recorder 190 is operative to receive and store the video signal from robotic camera 191, and to provide the stored video to PC 193 via private network 192. Private network 192 is a local area network, virtual private network, or the like, which serves to couple video recorder 190 and PC 193. PC 193 is a general-purpose personal computer operative to receive video from video recorder 190, sometimes in response to a command from PC 193 and sometimes on a periodic or as-available basis from video recorder 190; to store the received video; and to execute transcoder 194 to edit the stored video to produce transcoded video. Transcoder 194 is a software program operative in a similar manner as transcoder 40.

Figure 5A:
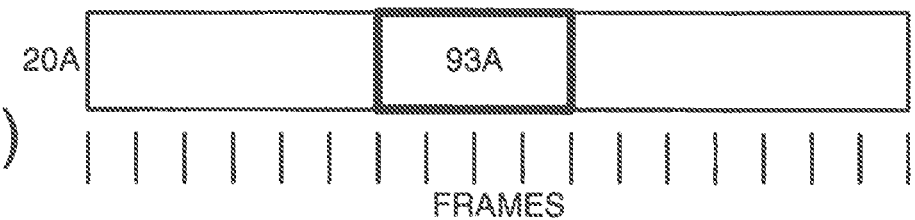
FIGS. 5A-5D are charts illustrating various forms of static and proxy ad placement in a movie.

FIG. 5A is a chart showing static ad 93A in a mid-roll position in movie 20A. Movie 20A comprises frames of video presenting content, such as a comedy movie. During playback, at a particular frame, the comedy movie stops, and the frames of ad 93A are played back, then the frames of the comedy movie resume playback. Conventionally, ad 93A is placed at the start of the comedy movie, at the end, or at an intermediate point, as shown in FIG. 5A.

Figure 5B:
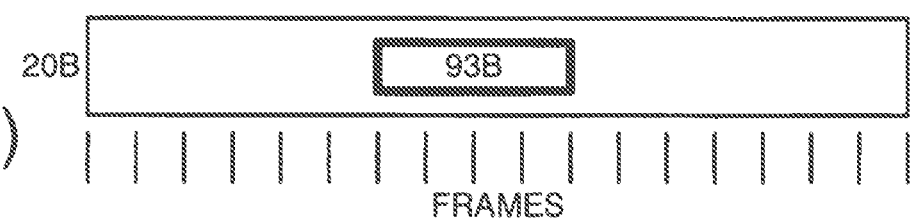

FIG. 5B shows static ad 93B, which is combined with frames of movie 20B to produce composite video. Static ad 93B may be placed, e.g., as a banner at the top, and may show a graphic image or an advertising movie, and so on.

Figure 5C:
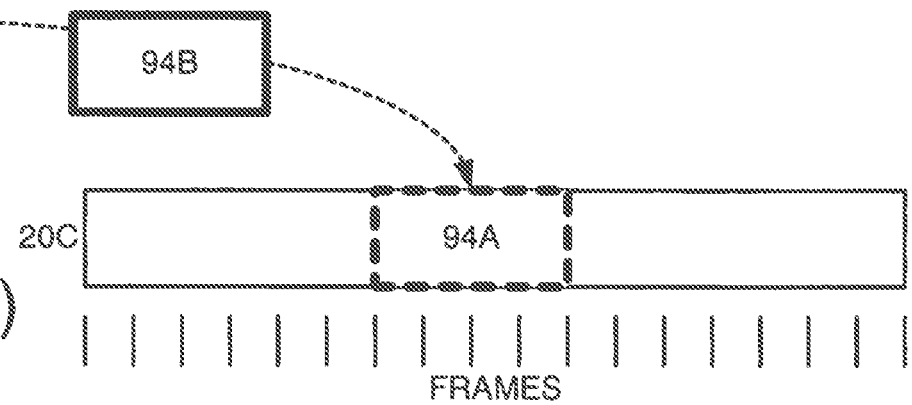

FIG. 5C shows proxy ad 94A at a mid-point position of movie 20C. During playback, at the start of the movie, a request is sent to proxy ad server 84, which replies by sending ad 94B. At a particular frame, the comedy movie stops, and the frames of ad 94B are displayed, then the frames of the comedy movie resume. See FIG. 6 below.

Figure 5D:
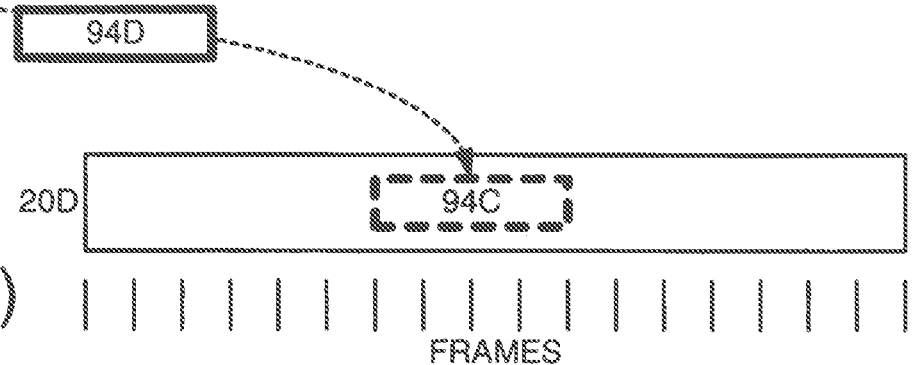

FIG. 5D shows original proxy ad 94C superimposed on frames of movie 20D. Original proxy ad 94C may be placed, e.g., as a banner at the top. During playback of movie 20D, ad 94D is requested from proxy ad server 84, and the frames of ad 94D are combined with the frames of movie 20D to produce composite video that is displayed.

Figure 6:
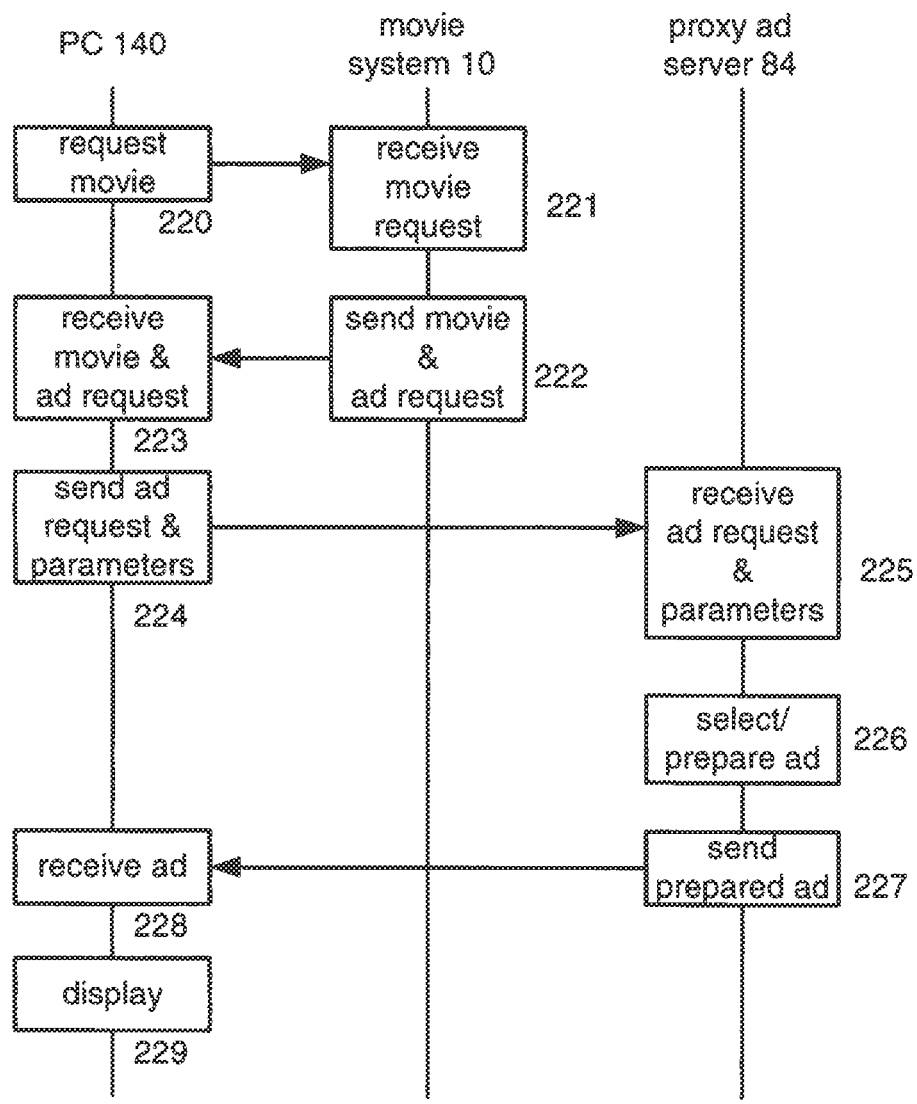
FIG. 6 is an event chart illustrating proxy ad delivery.

FIG. 6 is an event chart illustrating proxy ad delivery. Let it be assumed that the user of PC 140 wants to view a transcoded movie stored in movie system 10, and that the transcoded movie includes therein a proxy ad, with the ad itself residing in storage 94.

At step 220, PC 140 requests the movie from movie system 10. At step 221, movie system 10 receives the request, and at step 222 responds thereto by sending the movie including the proxy ad to PC 140. The proxy ad includes an ad request that PC 140 is expected to send. The ad request typically comprises the network address of proxy ad server 84, and optional or required parameters to be used by proxy ad server 84 such as movie characteristics and/or viewer characteristics, e.g., keywords relating to the movie, display characteristics of PC 140, vertical and horizontal picture resolution of an ad image that can be accommodated in the movie, and so on.

At step 223, PC 140 receives the movie and ad request. At step 224, PC 140 sends the ad request and parameters, if any, to proxy ad server 84. At step 225, proxy ad server 84 receives the ad request and parameters, if any. At step 226, proxy ad server 84 selects an ad from storage 94 in accordance with the parameters, and prepares the ad, such as by sizing, in accordance with the parameters. At step 227, proxy ad server 84 sends the prepared ad to PC 140.

At step 228, PC 140 receives the prepared ad, and plays the movie while inserting the received ad at the location indicated by the proxy ad in the movie.

FIGS. 7-8 are flowcharts depicting high-level operation of movie uploading and downloading, respectively.

Turning to FIG. 7, at step 300, user1 (not shown) at PC 110 uploads a movie to server 50, such as a movie recorded by camcorder 120. The uploaded movie is in an original format, also referred to as a first format or an uploaded format. In some cases, user1 provides an address of server 80, and instructs server 50 to retrieve the movie from server 80. Server 50 stores the uploaded movie in videobase 20. At step 310, transcoder 40 processes the uploaded movie, enabling the user to edit the uploaded movie as described in detail below, to produce a transcoded movie. The transcoded movie is in a proxy format, also referred to as a second format or an intermediate format.

At step 320, transcoder 40 stores the transcoded movie in videobase 20. As described below, user1 can grant permission to other users to view the whole of the transcoded movie, or to view segments of the transcoded movie, by providing suitable addresses to the authorized users.

Turning to FIG. 8, at step 330, user2 (not shown), who has received permission to view the transcoded movie, sends a request for the movie to server 50. The request includes information about the display capability of the device used by user2, such as phone 130 or PC 140.

At step 340, server 50 requests the selected movie from videobase 20, indicating the format for the movie.

At step 350, if the requested format happens to match the stored format, then the movie is provided directly to server 50. Otherwise, videobase 20 is operative to convert the format from the stored format to the requested format. The movie is provided in the requested format, also referred to as a third format, a downloaded format, or an output format. Server 50 then sends the provided movie to user2 via suitable distribution method such as streamed video or podcast, or presentation on a web page, blog, wiki, really simple syndication (RSS) or other technique. In some embodiments, videobase 20 sends the stored movie to transcoder 40, for conversion to the requested format, and then transcoder 40 provides the movie in the requested format to server 50.

Figure 9:
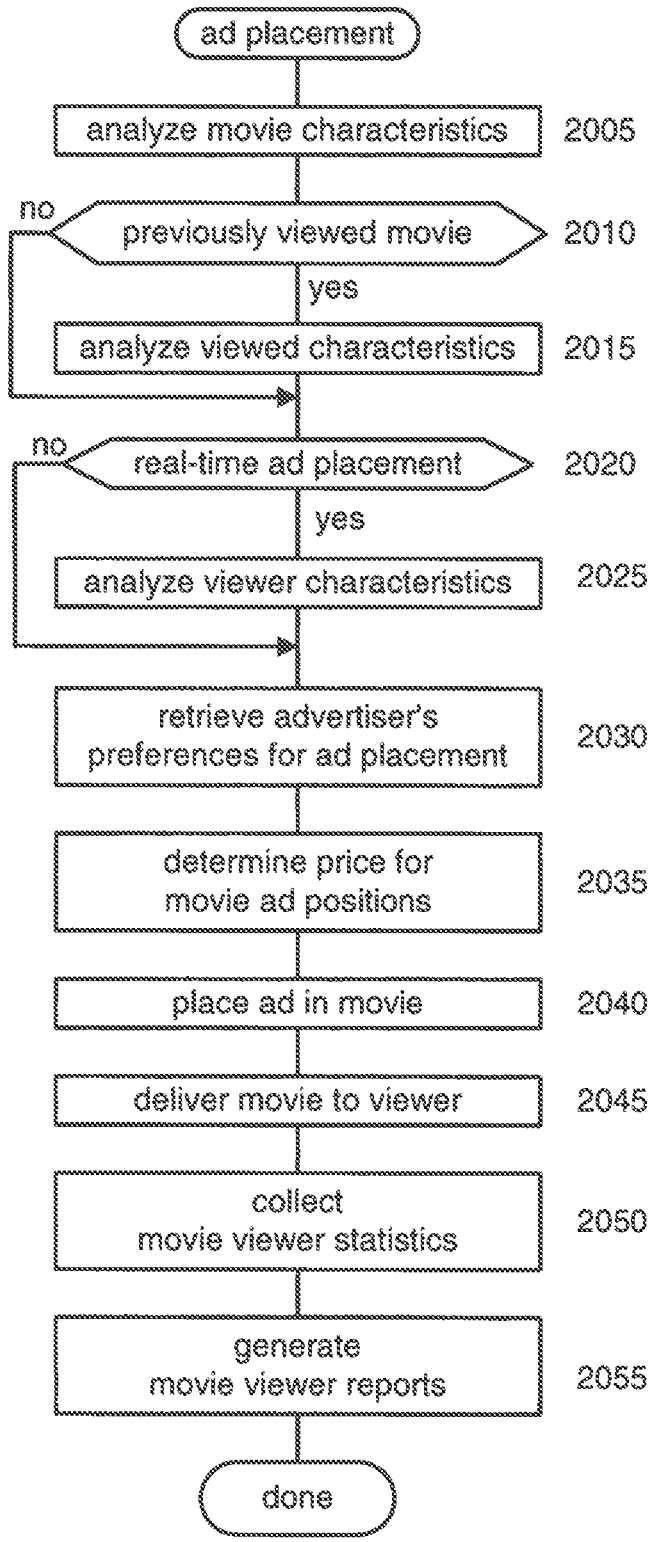
FIG. 9 is a flowchart depicting a high level ad placement procedure.

FIG. 9 depicts the overall ad placement process.

At step 2005, transcoder 40 analyzes the movie characteristics. As used herein and in the claims, inherent movie characteristics means information about the movie itself, without reference to usage or viewing. Examples of inherent movie characteristics include motion, scene changes, face presence, audio track loudness, keywords relating to the movie's subject and so on. In this document, inherent movie characteristics are sometimes referred to as movie characteristics.

At step 2010, transcoder 40 determines whether the movie has been previously viewed. If not, processing proceeds to step 2020. If the movie has been previously viewed, then at step 2015, transcoder 40 analyzes the viewed characteristics of the movie, also referred to herein as the popularity of the movie. Viewed characteristics include number of times that the movie has been requested, number of times that a link or deep tag to the movie has been sent from one viewer to another potential viewer, number of deep tags in the movie, number of times that a particular movie segment was replayed, number of times that viewers paused at a particular movie position, and so on. In some embodiments, the viewed characteristics are associated with the demographics of the viewer, such as gender, age, location, income, interests and so on.

At step 2020, transcoder 40 determines if the ad placement is occurring in real time. As explained below, movie system 10 can operate in one or more of the following modes:

by placing one or more ads in a movie, storing the movie plus ads, and then delivering the stored movie plus ads to a viewer in response to the viewer request, referred to as non-real time ad placement mode;

As explained below, non-real time ad placement mode has a static version and a variable version. In the static version, the ad is placed once, and remains in its place for the duration of the advertising period, i.e., the timeframe that the advertiser pays for. In the variable version, the ad's position may change from time to time, in accordance with changes in the viewed characteristics of the movie and changes in other advertiser's interest in having their ads included in the movie.

by receiving a viewer request for a movie, then placing ads in the movie and delivering the movie plus ads to the viewer, referred to as real-time ad placement mode;

by placing a first set of ads in the movie, storing the movie plus ads, receiving a viewer request, then placing a second set of ads in the movie, and delivering the movie with the first and second sets of ads to the viewer, referred to as real time plus non-real time ad placement mode, or hybrid ad placement mode.

Non-real time ad placement mode enables movie system 10 to operate in essentially a broadcast fashion, for ads. Real-time ad placement mode enables movie system 10 to operate in a narrowcast fashion, wherein the characteristics of the viewer determine what ads are sent to the viewer. If movie system 10 is operating in non-real time ad placement mode, then processing proceeds to step 2030. If movie system 10 is operating in real-time ad placement mode, or hybrid ad placement mode, then at step 2025, transcoder 40 analyzes the viewer's characteristics. In this context, characteristics of the viewer includes demographic information as well as activity of the viewer, such as entering a keyword, the material previously viewed by the viewer and so on.

At step 2030, transcoder 40 retrieves the advertiser's preferences for ad placement. Advertiser preferences can specify movie characteristics, movie popularity characteristics, viewer characteristics, and how much the advertiser is willing to pay depending on the combination of features delivered, which may include whether the ad is viewed or whether the viewer takes an action relating to the ad. For example, some ads include hyperlinks that a viewer can click on, and the advertiser may be willing to pay a first rate if the ad is merely presented to the viewer, and a second rate if the viewer clicks on the hyperlink.

At step 2035, transcoder 40 determines prices for positioning ads at various places in the movie. The price determination procedure is a function of the movie characteristics, the viewed characteristics, the viewer characteristics, advertiser demand, and the price setting mechanism.

At step 2040, transcoder 40 places the at least one ad in the movie. It will be appreciated that an advertiser's rules may specify manual placement, in which case transcoder 40 notifies a person associated with the advertiser of the prices for placing the ad at various positions, and a human manually selects ad placement.

In some cases, an ad is composed into the scene, usually manually. For example, the movie scene might be a living room with a television, and the ad is composed to appear to be on the television in the movie scene. As another example, the movie scene may be a wall with a picture frame, and the ad is composed to appear in the picture frame of the movie scene.

At step 2045, the movie is delivered to the viewer that requested the movie. When movie system 10 operates in non-real time ad placement mode, there is a step (not shown) of storing the movie plus ads in videobase 30 prior to delivering the movie to the requesting viewer.

At step 2050, statistics are collected about movie viewing, such as by server 50 receiving play trails (discussed below), notices of deep tag transmissions and so on, and storing them in database 30.

At step 2055, appropriate viewing reports are generated by billing program 65, server 50 and transcoder 40.

A prior art search engine enables advertisers to bid on keywords. During a set-up phase, the advertiser selects the desired keyword(s), and their maximum bid price. In operation, when a searcher enters the desired keyword, advertiser ads are presented in an order corresponding to their bid amounts, that is, the ad with the highest bid is listed first, followed by ads with sequentially lower bid amounts. When the searcher clicks on an ad, the search engine bills the advertiser, that is, if the ad is merely presented with no response from the searcher, the advertiser does not pay. Advertisers can then view reports on the "click-through" activities for their advertisements.

In an embodiment wherein the price of placing an ad in a movie varies, advertisers can determine the price at least in part by bidding. For example, movie system 10 can determine a starting price based for ad placement in portions of a movie based on popularity, level of motion, length of ad, whether the ad is full-motion video or a static image, and so on. Advertisers can then (i) submit specific bids for specific movies, ex: $100 for placement in movie xyz for two weeks, (ii) can define bidding rules, ex: placement in any travel movies viewed at least 100 times per day, ex: placement in any movie segment having a deep tag with the text label "airplane" and where the movie is one of the most popular 1,000 movies for the day, or (iii) can define results and how much they are willing to pay, ex: at least 100 views per hour by girls of age 10-14 located in California at a cost of up to $20 per hour.

The value placed upon media inventory across a timeline of a movie can vary dramatically and dynamically based on continuously updated statistics on both behavioral and contextual analysis of the video stream; for example, the most prized video segments may be those that are most popular and contain the deep tags for "cars", "hotels", "swimming", etc.

Figure 10:
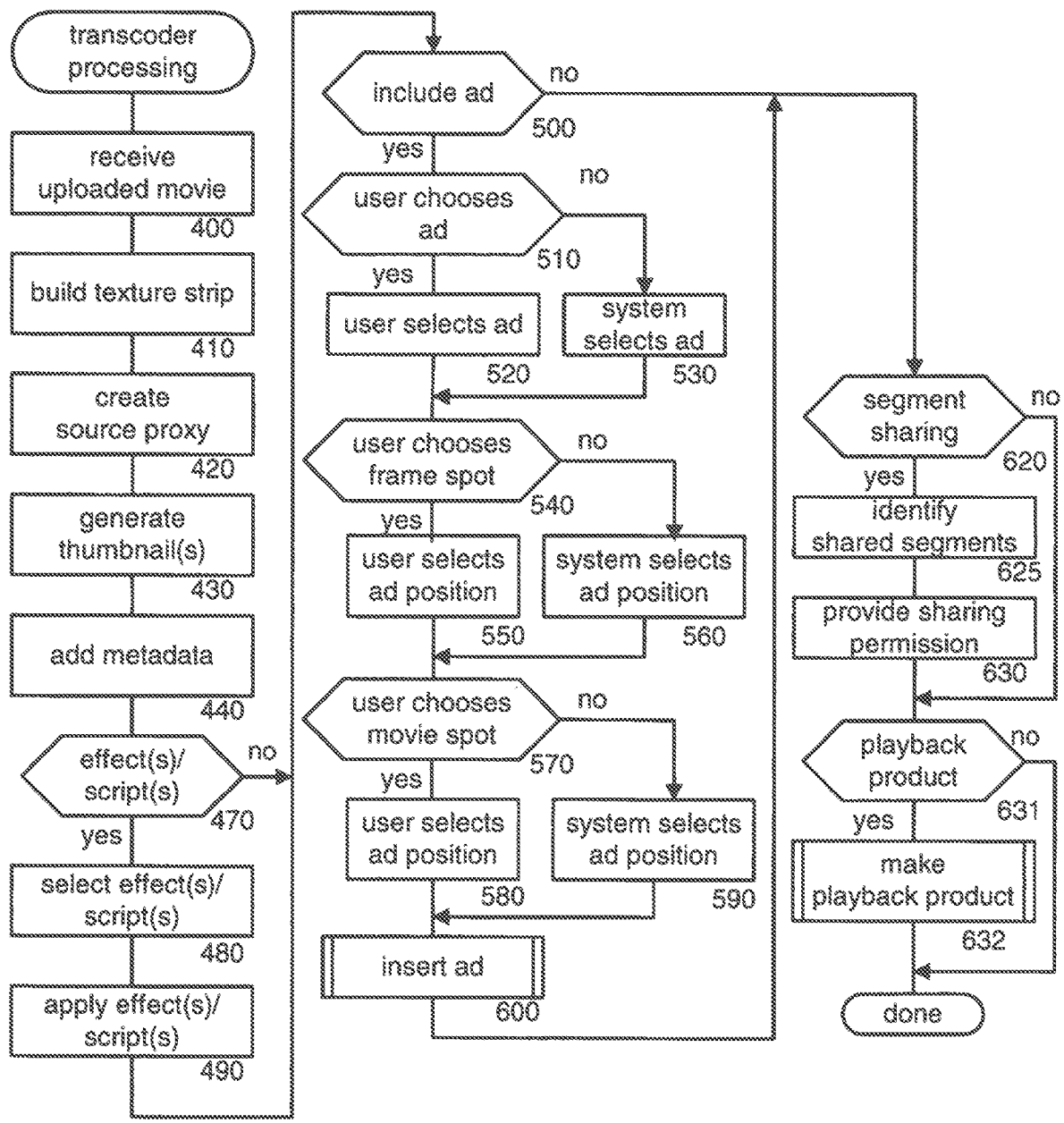
FIG. 10 is a flowchart depicting transcoder operation during movie creation.
Figure 11:
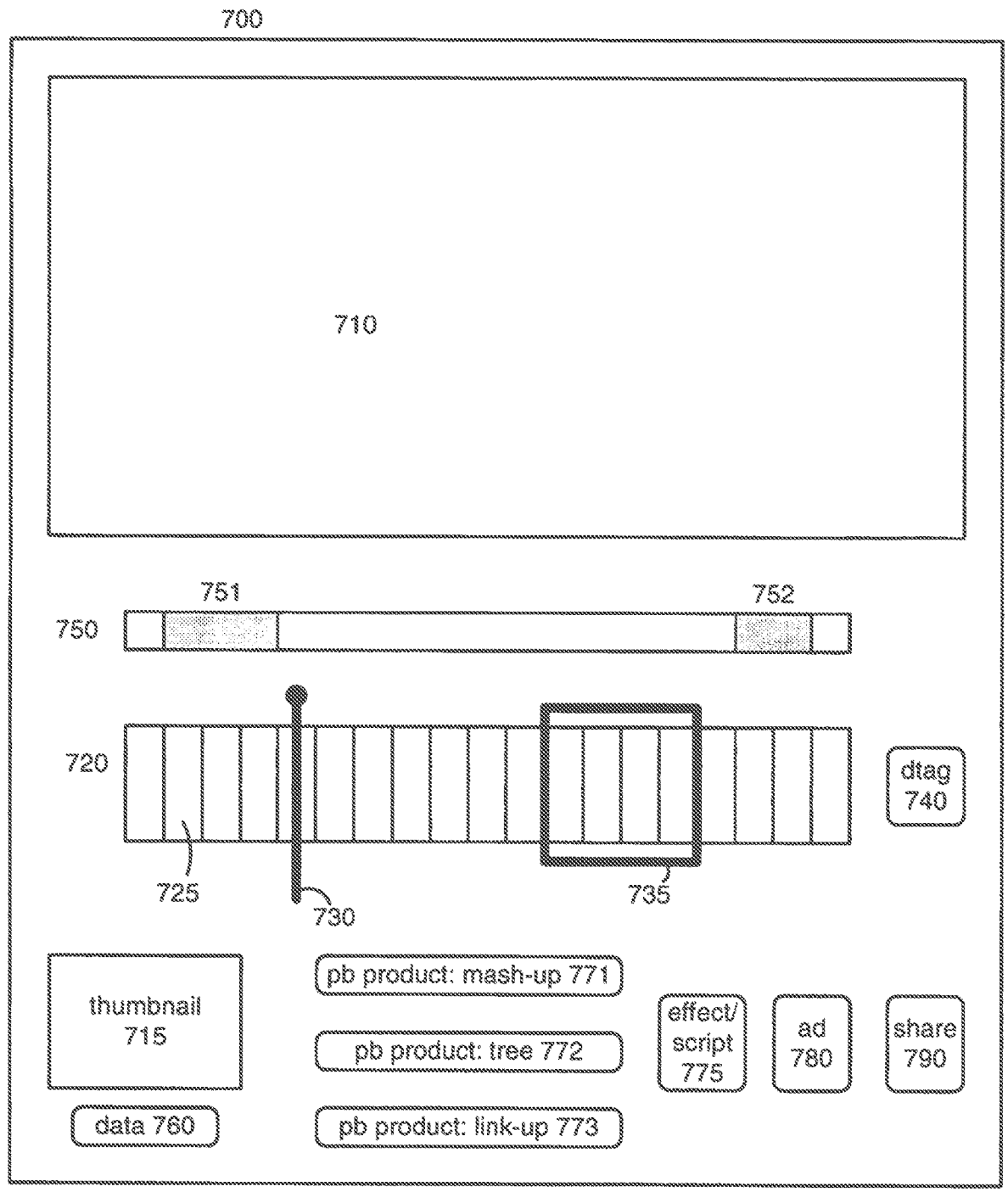
FIG. 11 is a diagram of a user interface for editing a movie.

FIG. 10 is a flowchart depicting transcoder 40 operation.

As an overview, transcoder 40 receives an uploaded movie, creates a representation for easy editing, and adds user-supplied editing data (steps 400-440) to create a transcoded movie. Then, at the user's option, some, all or none of the following functions can be performed, in any desired sequence, and in as many editing sessions as desired:

adding special effects (steps 470-490), including advertising movies in the transcoded movie (steps 500-600), providing permission for other users to view all of the transcoded movie, or segments of the transcoded movie (steps 610-630), and creating a playback product using the transcoded movie, the playback product being one of a mash-up, a tree or a link-up (steps 631-632).

Including an advertising movie in a transcoded movie ensures that even if the viewer of the transcoded movie has a filter for blocking advertising pop-ups and the like, the included advertising movie is viewed, since the filter considers the advertising movie to be part of requested content.

At step 400 of FIG. 10, transcoder 40 receives the uploaded video, either from the user or from another web site. The video may be in one of several formats, some of which involve compression using a scheme wherein a compressed frame refers to an earlier and/or later frame, and then provides change information relative to the earlier and/or later frames. Transcoder 40 converts the uploaded movie to a series of self-referential (uncompressed) frames. Generally, a frame is a collection of picture elements (pixels) corresponding to an image presented to a human viewer.

At step 410, transcoder 40 builds a texture strip representing the movie. Specifically, transcoder 40 applies a function to each frame to generate texture data (see FIG. 39), and saves the texture data as a video image. For example, the function might be to extract the center 8.times.8 pixels of each frame and realign into a 64 pixel height column and the texture strip is the sequence of 64 pixel columns. The texture strip may be saved as a .jpg file. The texture strip serves to represent the entire movie in a convenient information bar, and is sometimes referred to as a navigation bar. The texture strip is an intuitive way of determining the temporal position of a frame relative to the entirety of a movie. The texture strip often is useful in detecting scene changes, which is important when deciding which frames to group together as a segment.

At step 420, transcoder 40 creates a source proxy for the uploaded movie. Generally, a source proxy is a representation of the frames of the movie in a particular format that is easy to convert to other formats and to distribute via public communication network 100. For example, the Flash video format, according to the H.263 standard, can be used for the source proxy.

Using a source proxy reduces the format conversion issue. Specifically, if there are n movie formats, a general transcoder should be able to convert from any input to any output format, which, by brute force, would require $n^2$ different format converters. However, using a source proxy means that only 2n format converters are needed (n converters to the source proxy format, and another n converters from the source proxy format to the output format). Additionally, as new movie formats become available, supporting them requires creating only 2 converters per format (one to the source proxy format, and one from the source proxy format), rather than 2n with the brute force approach. It is recognized that, sometimes, the source proxy format may be the desired output format.

Editing of the proxy format, also referred to as proxy editing, may occur in several ways.

In one embodiment of proxy editing, the edits are applied directly to the proxy frames.

In another embodiment of proxy editing, the proxy frames are maintained as generated, and an edit list is created, comprising edits to be sequentially applied to the proxy frames. Each time the edited movie is provided, the edits are applied anew to the proxy frames. This embodiment is particularly useful when edits need to be undone, or when many users are editing one movie to create separate edited movies.

In a further embodiment of proxy editing, a hybrid approach is used, wherein during an edit session, an edit list is created, and only at the termination of the edit session are the edits applied directly to the proxy frames.

At step 430, transcoder 40 generates a thumbnail, also referred to herein as a snapshot, as a visual representation of the entire movie. Typically, the user selects a frame, and transcoder 40 reduces it to a thumbnail size, such as 177.times.144 pixels. A user having many stored movies can conveniently view their thumbnails, rather than or in addition to text descriptions and/or filename descriptions.

At step 440, transcoder 40 accepts metadata from the user. Movie metadata may include a filename for the transcoded movie, subject matter keywords associated with the movie, a short text description to be associated with the thumbnail, any deep tags the user cares to define, address information such as a hyperlink of information to be associated with the transcoded movie, and an associated movie such as an audio file describing the contents of the movie.

A deep tag is a video bookmark, indicating a sequential group of frames that are to be treated as a separately addressable segment; the deep tag metadata includes the movie filename, the user filename, date of creation of the deep tag, date of most recent modification of the deep tag, a deep tag filename, the start frame, the end frame, the duration of the segment, and a short text description of the segment. A deep tag is understood to be a convenient way of identifying a segment. A deep tag can be thought of as a movie segment bookmark.

FIG. 11 shows screen display 700 of player 114, provided, for example, at PC 110, and including video display 710, thumbnail 715, texture strip 720, positioner 730, deep tag marker 735, deep tag button 740, deep tag bar 750, and function buttons 760, 771, 772, 773, 775, 780 and 790. Screen display 700 is typically used by an editor.

Video display 710 shows the current frame of video. When the editor's device, such as PC 110 or phone 130 permits, the video frame is displayed in its proxy format. However, if the editor's device cannot support the proxy format, the transcoder 40 converts edited frames to an output format suitable for the editor's device prior to sending the edited frames to the editor for display.

Thumbnail 715 is a small image representing the entire movie.

Texture strip 720 comprises sequential frame representations 725 and subsequent information; each frame representation 725 is the result of the function used to create the texture strip, such as a vertical column of 64 pixels, and represents a single frame.

Subsequent information indicates special effects applied to the frames and any advertising inserted in the frames. Texture strip 720 is not limited to video transform visualizations, and can be created by any of the following techniques, or other suitable techniques:

frequency analysis, such as a spectrogram, wherein spectral analysis is performed on an input signal, then the amplitude of the signal at one or more frequencies is plotted against time. A two-dimensional spectrogram plots the amplitude of one frequency versus time; a three-dimensional spectrogram has axes of time, frequency and signal level;

other video and/or audio signal transforms, such as wavelets; and heatmaps (described below).

Positioner 730 indicates where the frame display in video display 710 is located relative to the entirety of the movie. Positioner 730 enables the editor to use texture strip 720 to seek frames in the movie in a random access manner.

Deep tag marker 735 has a left edge that can be adjusted by a user, and also has a right edge that can be adjusted by the user; after the user has adjusted the left and right edges of deep tag marker 735, the user indicates that these settings should be saved as a deep tag, such as by clicking deep tag button 740, and providing a text description corresponding to the movie segment indicated by the deep tag. Deep tag marker 735 enables the editor to use texture strip 720 to select a segment of the movie.

Deep tag bar 750 is a visual representation of deep tags that have already been created for the movie. In the example of FIG. 11, deep tags 751 and 752 have previously been created for the movie, and are located near the start and end, respectively, of the movie being edited.

Function buttons 760, 771, 772, 773, 775, 780 and 790 enable the user to edit the movie. Data button 760 enables the user to view and edit metadata associated with the movie. Playback product buttons 771, 772 and 773 take the user to specialized editing interfaces, discussed below. Effects/scripts button 775 enables the user to add and edit special effects and scripts. Ad button 780 enables the user to include advertising in the movie. Sharing button 790 enables the user to grant permission to other users or user groups to view selected segments of the movie.

Returning to FIG. 10, at step 470, transcoder 40 determines whether the user wishes to apply any special effects and/or add scripts to the transcoded movie; a script is executable program code associated with a movie or a position in a movie. An example of a scripting capability is ActionScript2 for the Macromedia Flash player, that makes it possible for Flash movies to be interactive. Other examples of scripting languages are scalable vector graphics (SVG), a language for describing graphics in extensible markup language (XML), and JavaScript. Other suitable scripting languages will be apparent to those of ordinary skill. For example, the user indicates a desire to apply special effects and/or add scripts by selecting effect/script button 775 in FIG. 11. If so, at step 480, transcoder 40 provides the user with an effects and scripts editor (discussed below with regard to FIG. 12). In some embodiments, there are about 300 different effects on the effects menu. The user selects desired effects and/or scripts and indicates where in the movie they should be applied. At step 490, transcoder 40 applies the effects to the movie and/or associates the scripts with the movie. Generally, the user views the results of the effects, and continues effects editing until satisfied with the result. The user can create multiple versions of a transcoded movie, differing in their special effects and/or scripts.

Examples of special effects include: watermark, mosaic, barndoor, noise, dissolve, spiral, fade in, fade out, increase contrast, decrease contrast, soften perimeter, cut frame, overlay, translucency, wipes, cuts, zooms, and so on.

A movie watermark for a movie including video is one of (a) a permanent graphic such as a logo inserted in each frame of the movie, (b) an overlay graphic such as a logo inserted in each frame of the movie, or (c) hidden information such as a logo, also referred to as steganography. A movie watermark for an audio only movie is (i) a sound file inserted at a predetermined point in the movie, such as its start or end, or (ii) hidden information such as text, also referred to as steganography.

Examples of scripts include: when the movie is fully loaded, then play a sound file; when the cursor clicks on an area, then create a pop-up window with a particular web page; when the cursor clicks on an object in a video scene, then launch a form—such as for product purchase or survey; and so on.

Figure 12:
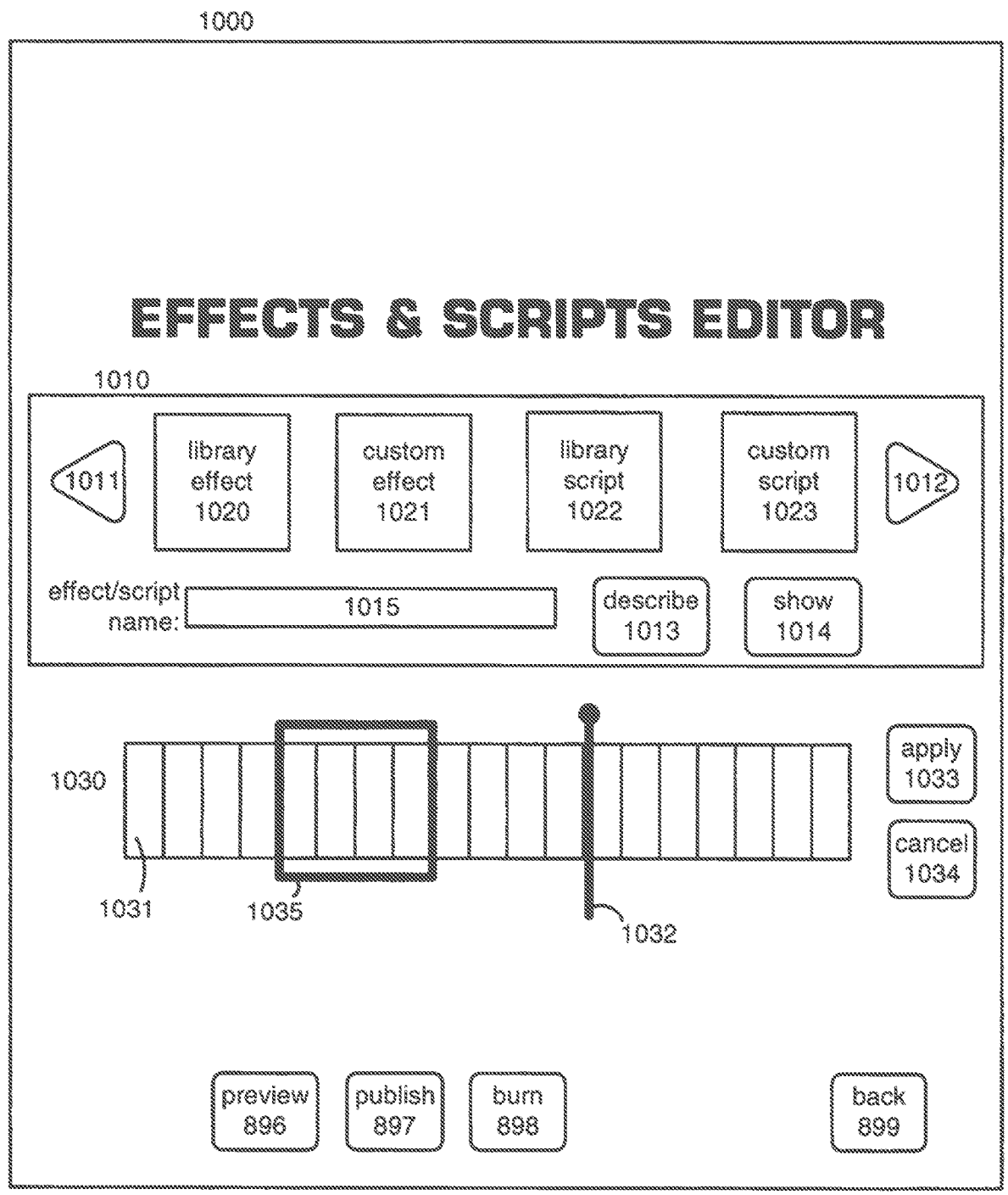
FIG. 12 is a diagram showing an effects and scripts editor interface.

FIG. 12 shows effects and scripts editor interface 1000. Effects area 1010 includes library effect button 1020, custom effect button 1021, library script button 1022 and custom script button 1023. Typically, an effect button has an image of the effect and holding the cursor on the button displays text describing the effect, and a script button has an icon on the button and holding the cursor on the button displays text describing the script. Some scripts also include effects, and some effects also include scripts. Forward and reverse navigation buttons 1011, 1012 enable navigation among the effects and scripts buttons. Clicking describe button 1013 displays text describing the button (same as holding the cursor on the button). Clicking show button 1014 creates a pop-up window showing the effect and/or script in action, useful when the size of the button is too small to fully convey the effect. Effect/script name window 1015 enables the editor to type the name of an effect or to select it from a drop-down menu.

An effect can also include an executable command, as described above with respect to the tree playback product editor.

Texture strip 1030 indicates the frame representations of the movie selected for effects, such as frame representation 1031. Positioner 1032 enables rapid selection of a frame of the movie. Slider 1035 has a left and right edge that can be adjusted by the editor, to indicate frames to receive an effect. After the editor selects an effect in effects area 1010, and adjust slider 1035, the editor clicks apply button 1033 to apply the effect. After the editor has finished applying effects, he or she clicks preview button 896 to preview. If an editor wishes to cancel an effect, she positions slider 1035 on the appropriate frame representations and clicks cancel button 1034. Publish button 897, burn button 898, and back button 899 function as described above.

Returning to FIG. 10, at step 500, transcoder 40 obtains the user's preference for including advertising in the transcoded movie. For example, the user indicates a desire to include advertising by selecting advertising button 780 in FIG. 11. Videobase 20 contains advertising movies, also referred to as ad movies, that is, segments provided by advertisers for inclusion in user-created movies. Database 30 includes the advertiser's preference for the types of movies that the advertiser wants its ad movies to be combined with, whether the advertiser prefers or requires that its ad be used as a static insert or a dynamic insert (discussed below), whether the advertiser permits its ad movies to be used as part of a mash-up video, and how the advertiser pays the user, such as a one-time fee, or per-viewing of the ad movie. Conventional systems place advertising only at the start of user-created content; movie system 10 is more flexible in that advertising can be inserted within a user-created transcoded movie in either a static or a dynamic manner.

If the user wants to include an ad movie in the transcoded movie, at step 510, transcoder 40 determines whether the user wishes to select the ad movie, or to accept an ad movie selected by movie system 10. If the user wishes to select the ad movie, at step 520, transcoder 40 provides the user with a menu of ad movies that are consistent with the characteristics of the user's transcoded movie, and the user selects one or more ad movies for inclusion in their transcoded movie. If the user does not wish to select the ad movies, at step 530, transcoder 40 selects one or more ad movies based on an ad movie selection procedure and its own determination of how many ad movies are appropriate for the transcoded movie. In some embodiments, the ad movie selection procedure is based on maximizing revenue for the user, and following a least-recently-used ad movie selection procedure. In some embodiments, the determination of how many ad movies are appropriate is based on at least one of: the length of the transcoded movie, keywords in the metadata, how many segments are deep tagged, and the length of the deep tagged segments, and so on.

An ad used with movie system 10 can be static or dynamic. A static ad is inserted in the transcoded movie prior to its storage in videobase 20. For a dynamic ad, the transcoded movie is stored in videobase 20 with a placeholder, and when the transcoded movie is presented to a user, the actual ad is inserted, the ad being chosen based on a characteristic of the user such as the user's location, referred to as a "geo-aware" ad, the characteristics of the display device, referred to as a "device aware" ad, or other suitable characteristic.

At step 540, transcoder 40 determines whether the user wishes to control the position of the ad movie(s) within a frame of the transcoded movie, or to accept positioning determined by movie system 10. If the user wishes to control the positioning of the ad movie, at step 550, transcoder 40 provides the user with a graphical interface for controlling ad movie positioning, and a menu of how the ad-movie should be inserted, such as a picture-in-picture at the top, left, right or bottom of the transcoded movie, the top being referred to as a "banner" ad, or as a stand-alone segment in the transcoded movie. In some embodiments, transcoder 40 also provides the user with popularity statistics for portions of the movie, discussed in detail below, so that the user can position the ad in accordance with the parts of the movie that viewers like. In some embodiments, the user selects the size of the space in each frame that the ad may occupy. If the user does not wish to control the positioning of the ad movie, at step 560, transcoder 40 decides where the movie ad should be placed, typically by looking at the default position in the metadata associated with the ad movie.

At step 570, transcoder 40 determines whether the user wishes to control the frames of the transcoded movie where the ad will be placed, or to accept positioning determined by movie system 10. If the user wishes to control the positioning of the ad movie, at step 580, transcoder 40 provides the user with a graphical interface for controlling ad movie positioning, such as a texture strip and slider, and in some cases, popularity statistics (discussed below) for portions of the movie. If the user does not wish to control the positioning of the ad movie, at step 590, transcoder 40 estimates where the movie ad should be placed. Any suitable estimation procedure may be employed. As an example, if the transcoded movie is a completely new movie with no deep tags, the estimation procedure specifies that the first scene having a length of at least the length of the ad movie is the selected position, and that the ad movie should be inserted as a picture-in-picture in the lower right of the transcoded movie. However, if the transcoded movie is associated with at least one other user, then a popularity procedure is used to select the position for the ad movie.

Collection and processing of user statistics will now be discussed. These statistics are employed in the popularity procedure used to automatically position the ad movie.

Figure 13:
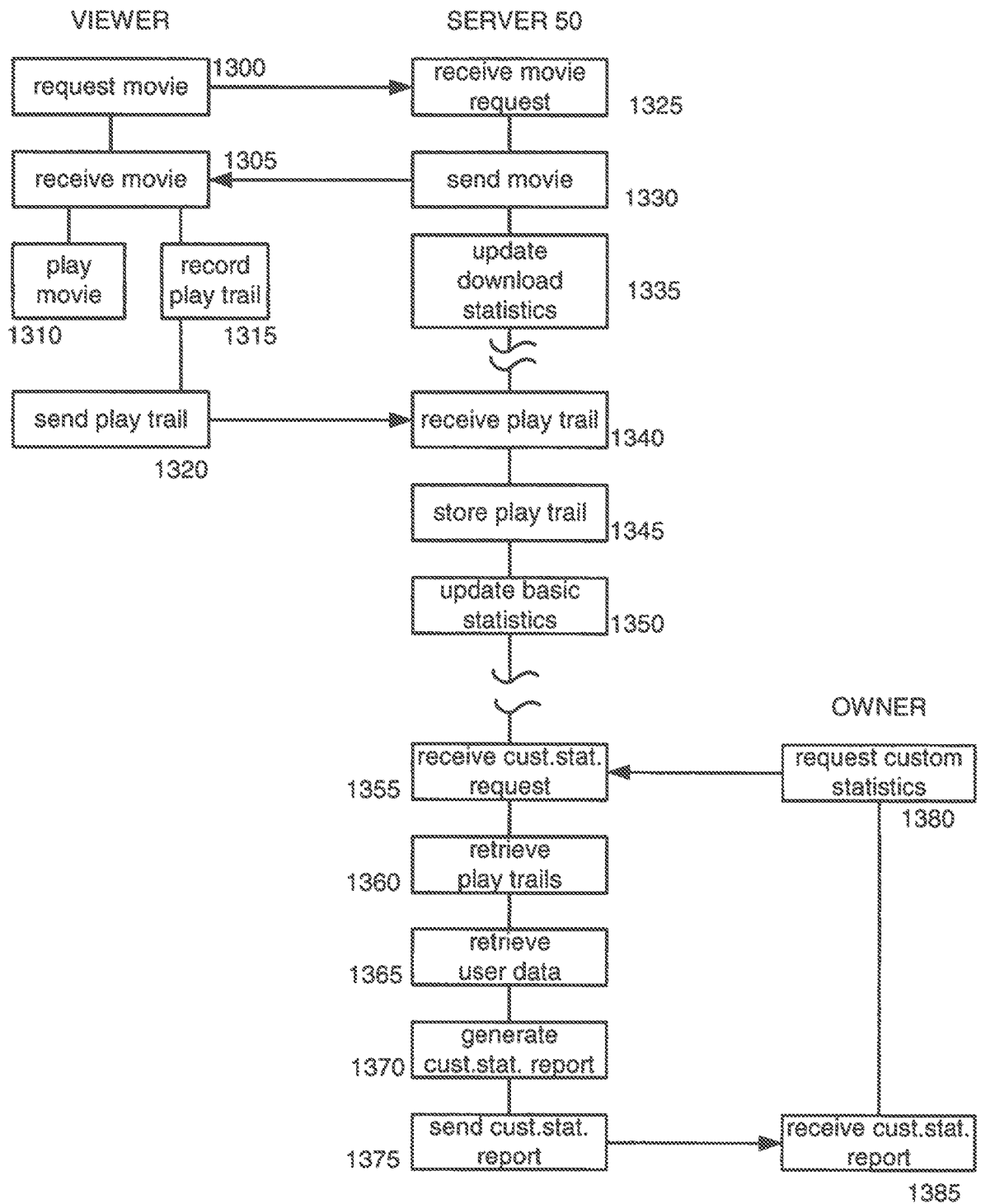
FIG. 13 is a flowchart illustrating collection and processing of usage statistics.

FIG. 13 is a flowchart illustrating collection and processing of usage statistics.

At step 1300, a viewer, such as a user of PC 140, who is understood to also or alternatively be a listener, requests a movie, such as by clicking on a link to the movie, the link being embedded in an e-mail previously sent to the viewer. At step 1325, server 50 receives the movie request, and retrieves the requested movie from videobase 20. At step 1330, server 50 sends the movie to the requesting viewer, and at step 1335, server 50 updates its download statistics for the movie.

At step 1305, the viewer receives the movie, and at step 1310 plays the movie. Playing the movie includes viewing the movie in its intended temporal sequence, pausing, replaying a section of the movie, fast-forwarding, adding one or more deep tags and so on. Meanwhile, at step 1315, a play trail is being recorded. As used herein and in the claims, a "play trail" means a timestamped sequence of actions that a viewer takes when playing a movie. The timestamp is typically measured in tenths of a second since the start of the movie, but may be measured in clock time or by frame number of the movie, or any other convenient metric. Each action in the sequence carries appropriate information to reconstruct what the viewer did, for example, "pause" indicates how long the movie was paused. When the viewer finishes viewing the movie, at step 1320, the play trail is sent to server 50.

Figure 14:
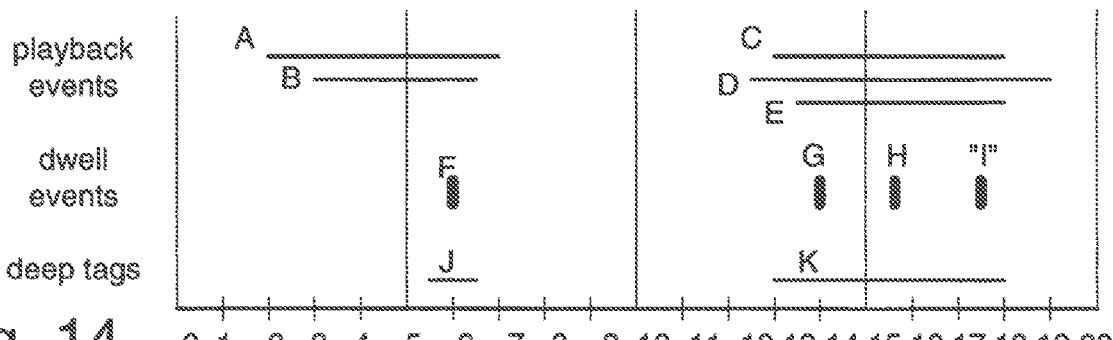
FIG. 14 is a timeline illustrating sample play events.

FIG. 14 is a timeline illustrating sample play events for a particular viewer. The horizontal access indicates elapsed time in a movie, such as seconds or frames. Events A-E indicate where the viewer replayed portions of the movie. Events F-I indicate where the viewer paused the movie. Events J-K indicate deep tags created by the viewer. A movie play event corresponds to viewer actions that alter the playing sequence of a movie, that is, make the playing sequence be other than a frame by frame display with each frame being displayed for the same time interval.

Figure 15:
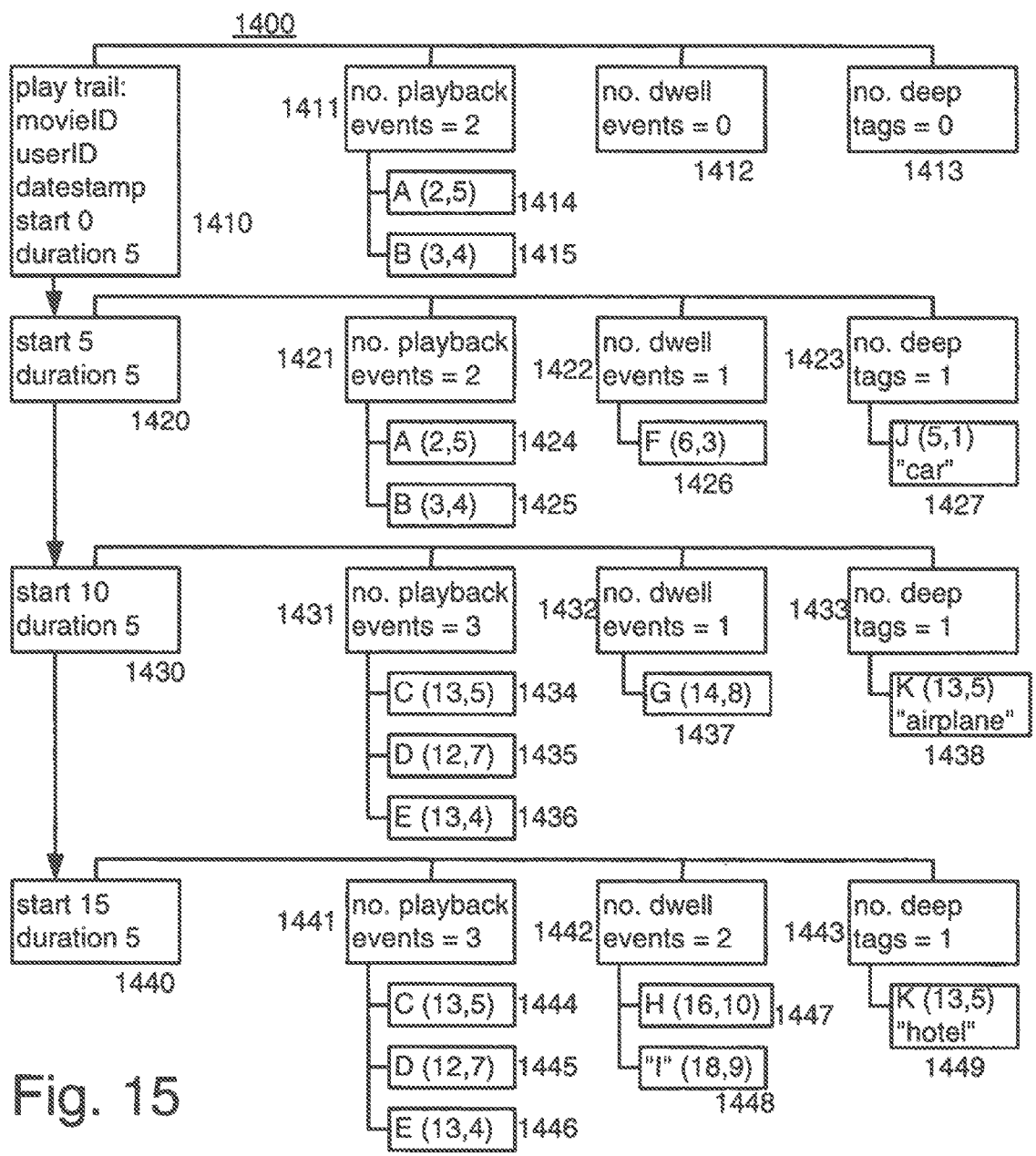
FIG. 15 is a data structure representing the sample play events of FIG. 14.

FIG. 15 is a data structure representing the sample play events of FIG. 14, that is, FIG. 15 shows play trail 1400. In general, a play trail has a head indicating the movie ID, the user ID for the viewer, a date stamp for when the play trail was created, such as when server 50 first stored the full play trail. The head also serves as the first statistical unit. Each statistical unit points to the next sequential statistical unit corresponding to the next sequential portion of the movie. Each statistical unit also points to a triplet of event type counters: number of playback events, number of dwell events, and number of deep tags.

Each event type counter also points to individual records for the events. Typically, an individual record records the start time of an event and its duration; in the case of a deep tag, text for the deep tag may also be recorded in the individual record. It will be appreciated that, when the play trail data is combined with demographic data associated with the user ID, a rich set of information is available.

In FIG. 15, head 1410 points to statistical units 1420, 1430 and 1440, having event type counters 1411, 1412, 1413; 1421, 1422, 1423; 1431, 1432, 1433; 1441, 1442, 1443, respectively. Event A in FIG. 14 is a playback of the movie from second 2 to second 7, and is represented in FIG. 15 as a (2, 5), where 5 is the duration, i.e., 7 seconds-2 seconds=5. Event A is recorded as a playback event associated with the first statistical unit, seconds 0-5 of the movie, and with the second statistical unit, seconds 5-10 of the movie, since event A spans both statistical units. More specifically, record 1414 and record 1424 both correspond to event A. As another example, event G in FIG. 14 is seen to be a dwell event at second 14 of the movie; the corresponding record 1437 in FIG. 15 indicates a dwell event at second 14 that lasted for 8 seconds.

At step 1340 of FIG. 13, server 50 receives the play trail. At step 1345, server 50 stores the play trail along with information about when the play trail was received, and the identity of the viewer, if known, or the computer address from which the play trail was sent. At step 1350, server 50 updates basic statistics for the movie. Basic statistics include, but are not limited to: number of deep tags created for a portion of a movie, access (listening and/or viewing) frequency for portions of a movie, replay frequency for portions of a movie, pause frequency for portions of a movie, and community score for portions of a movie.

As described above, a play trail is created at the user's location, then sent to server 50. In other embodiments, the play trail is stored in a so-called cookie, a locally stored data file that tracks an authenticated user's actions on a PC, on the user's PC so that the play trail data can persist over time in the cookie data even when a user's browser session has completed or has closed prematurely. The cookie can be extensive in terms of data structures and may include demographic data as well.

Alternatives to cookies include the use of HTTP authentication, client side persistence, local stored Flash objects, JavaScript window. name variables, and so on; each of these methods provides mechanisms to store and track user play trail data. The advantage of a cookie relative to a local file is that a cookie uses a standardized Internet mechanism to track user data in a well-defined location on a user's hard drive. The data is tracked across user browser sessions and is persistent across those sessions. Cookies protect user privacy by tracking user behavior without tracking identity. FIG. 15 shows how a play trail can be stored as a data structure; however this same approach can be applied to the storage of data in a user cookie stored on a PC. An advantage of a cookie relative to ongoing HTTP message transmission is that the cookie minimizes network bandwidth during network playback if the cookie data is transferred after the session is complete or during periods of minimal activity when interacting with a media application.

Play trails are a form of user behavior tracking. Other user behavior that is tracked to determine popularity of a movie or movie segment includes creating a deep tag and/or sending a deep tag, such as via email, instant message (IM), message service such as SMS or MMS, or podcasting. Deep tags indicate what users consider interesting.

An email or IM version of a deep tag typically comprises a URL providing the address of the deep tag, such as www.server.com/deeptag/movieID/StartTime/EndTime, or www.server.com/movieID/deeptag/deeptagID. Additionally, the email may include text associated with the deep tag, a thumbnail image for the deep tag, and an attachment comprising the portion of the movie indicated by the deep tag. SMS, MMS and podcast versions of a transmitted deep tag are similar.

Replay frequency measures how many times a listener/viewer replays a particular portion, as opposed to its initial playing.

Pause frequency measures how many seconds that a listener/viewer pauses at a particular point in a movie.

Community score is based on ratings provided by listeners/viewers, explained below in connection with FIG. 35. The ratings can be summed, or can be normalized. A normalized score is the total number of star ratings by viewers divided by the total number of viewers. For example, a summed score of 500 might occur because 100 viewers gave a 5-star rating to a movie, or because 500 viewers gave a 1-star rating to a movie; in these examples, the normalized ratings would be 500/100=5, and 500/500=1.

While FIG. 13 shows a situation in which the entire movie is available at PC 140 and server 50 is unaware of how the user is interacting with the movie until server 50 receives the play trail, in other embodiments, server 50 is involved in some user play actions, while PC 140 attends to the remaining user play actions. For example, playback and deep tagging may be accommodated at server 50, while pause is accommodated at PC 140. In these other embodiments, server 50 collects portions of the play trail and PC 140 collects the remainder of the play trail, then PC 140 transmits its play trail information to server 50 and server 50 creates a full, combined play trail representing the viewer's actions.

Figure 16:
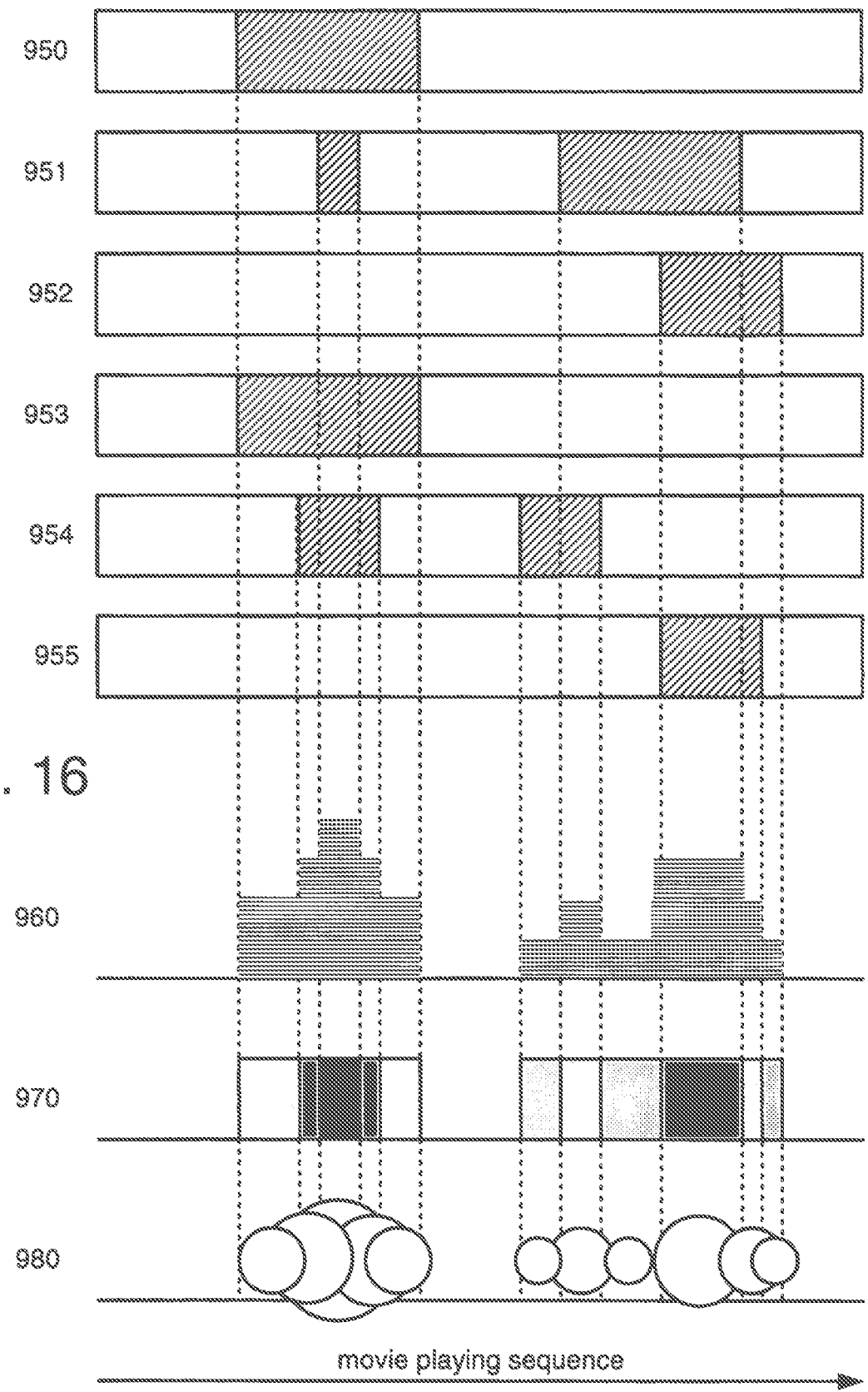
FIG. 16 is a diagram illustrating automatic determination of popular parts of a movie.

FIG. 16 is a diagram illustrating automatic determination of popular parts of a movie. Horizontal bars 950-955 represent the same movie, as deep tagged by different users. More generally, popularity can be defined as a selected metric or as a weighted combination of metrics. The metric can be one of the basic statistics, or a custom-defined statistic.

Histogram 960, also referred to as popularity density function 960, indicates the popularity metric, herein the number of times that a portion of the movie has appeared in a deep tag, which serves as an indication of the popularity of the various parts of the movie, plotted against the sequence in which the frames of the movie are displayed.

Color graph 970 uses different colors to represent different levels of popularity. In one scheme, the most popular portions of a movie are indicated by red areas, while the least popular portions of a movie are indicated by blue areas. In another scheme, different shades of gray are used to indicate popularity.

Color graph 970 can be generated as follows. Let the metric being plotted be the Total Interest in a specific part of the movie. The Total Interest metric is an indicator of the level of popularity of a section of a movie. The Total Interest is a weighted combination of metrics, such as the amount of time paused, the number of playbacks, or the number of deep tags created in a specific section of a movie. First, the metric is normalized to be a value between 0-100. Next, the normalized metric is mapped to the 0-255 code for each of the display colors of blue, green, and red.

As a specific example, let the metric plotted be the number of playback events per unit time for a movie, and assume the maximum number of playback events for any segment of a video is 25, so that 25 playback events is normalized to a value of 100. The color code is calculated using the following formula:

Red=(MAX(((Normalized_Metric−50)*255/50)),0))

Blue=(MAX(((50−Normalized_Metric)*255/50),0))

For:Normalized_Metric<=50:Green=(Normalized_Metric*255/50)else: Green=((100−Normalized_Metric)*255/50)

Sample usage statistics for a particular movie, and their conversion to RGB values are shown in the following table.

| Movie segment | no. playback events | Normalized value | Red | Blue | Green |
|---|---|---|---|---|---|
| 0 to 5 sec | 5 | 20 | 0 | 153 | 102 |
| 5 to 10 sec | 10 | 40 | 0 | 51 | 51 |
| 10 to 15 sec | 0 | 0 | 0 | 255 | 0 |
| 15 to 20 sec | 25 | 100 | 255 | 0 | 0 |

The Red Green Blue color values determine the color for a vertical column of pixels in color graph 970 corresponding to the time interval of the movie segment. As is well-known, each pixel of a display is actually a group of three light emitting elements: red, green and blue, and the intensity values for each of the elements determine the color perceived by the viewer. In some embodiments, the columns of color graph 970 are placed next to each other, like bar graphs having the same height, whereas in other embodiments, the colors are interpolated from column to column, to provide a more aesthetically pleasing appearance.

Cloud graph 980 has clouds or circles whose size corresponds to the popularity of a movie portion.

Other types of graphical representations of popularity may be employed, such as three dimensional strips with colored segments, three dimensional bar graphs, surface contour maps in three dimensions, and so on.

As used herein and in the claims, popularity statistics are based on one or more popularity metrics such as total number of requests for a movie, total number of times that the movie has been selected as a favorite (see FIG. 35), total number of times that the movie has been given a three, four or five star rating (see FIG. 35), number of times that a portion of the movie has been played back, number of times that a portion of a movie has been paused by a viewer, total pause time for a portion of a movie, number of times that a viewer has placed a deep tag on a portion of the movie, number of deep tag transmissions relating to the movie, and so on.

A further aspect of the movie may be provided by demographic or other selected data about viewers, such as age bracket, gender, location, income level and so on, instead of or in addition to the popularity metrics discussed above. Of course, this can be accomplished only when the viewer provides such demographic data, such as during establishing a new user account.

Popularity graphs can be reported to the owner of the movie.

Figure 35:
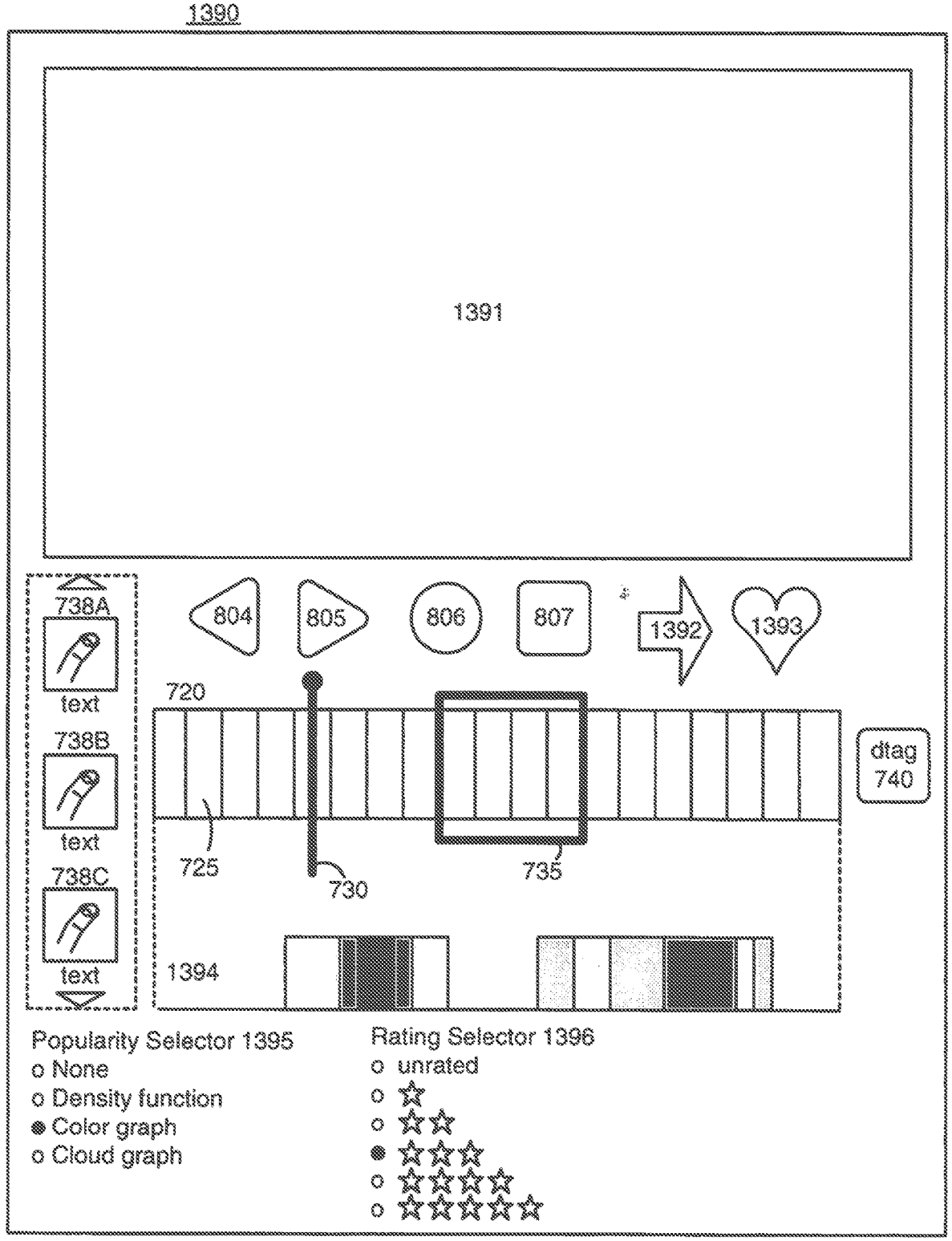
FIG. 35 is a diagram of a user interface for playing a movie.

As shown in FIG. 35, popularity graphs can be displayed to a viewer of the movie.

Popularity graphs can also be used internally by transcoder 40. Movie ads are placed in the popular parts, if they are long enough, or with respect to the popular parts, if the popular parts are shorter than the ad movie. For example, the movie ad could be placed so that its start is co-located with the start of a popular segment having a duration of at least 70% of the duration of the ad movie.

Returning to FIG. 13, generation of a custom statistics report, also referred to as a custom popularity report, will now be discussed.

At step 1380, an owner of a movie requests custom statistics about the movie. such as a number of deep tags created by a particular demographic group during a particular time period. At step 1355, server 50 receives the custom statistics request. At step 1360, server 50 retrieves appropriate play trails, and at step 1365, server 50 retrieves appropriate user data. At step 1370, server 50 generates the requested custom statistics report. At step 1375, server 50 sends the custom statistics report to the requester. At step 1385, the requester receives the custom statistics report.

Returning to FIG. 10, at step 600, transcoder 40 inserts the selected movie ads into the transcoded movie. Ad insertion is shown in more detail in FIG. 17. Before turning to FIG. 17, the diagrams of FIGS. 18A-18C illustrating ad bounceback for static ads, FIGS. 19A-19C illustrating slip-ad for proxy ads, and FIG. 20 illustrating ad bounceback and slip-ad are discussed.

Ad bounceback is a technique for prohibiting skipping of a static ad. The static ad can have a pre-ad zone defined before its start and/or a post-ad zone defined after its end. The pre-ad zone forces a bounceback to a few frames before the start of the ad; this is useful when the context of the movie is helpful to appreciating the ad. The post-ad zone is relevant to certain types of ads, and prohibits a user's skip from beginning until after the end of the post-ad zone FIG. 18A is similar to FIG. 5B that illustrates movie 20B with static ad 93B that occupies a portion of the frames of movie 20B. Segment 355 indicates frames that are played in a conventional manner. Segment 356 indicates that the user has skipped frames, either by fast forwarding or by seeking to a future point in movie 20B. Segment 357 indicates resumption of conventional frame playback. Segment 356 is seen to skip over ad 93B.

Figure 18A:
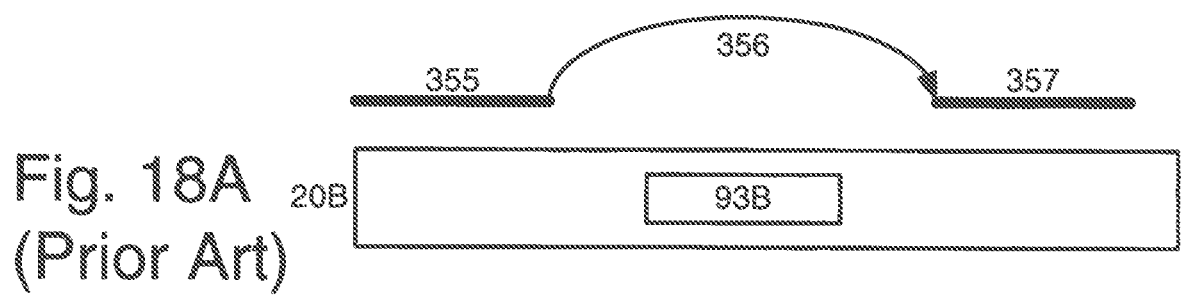
FIGS. 18A-18C are charts illustrating ad bounceback.
Figure 18B:
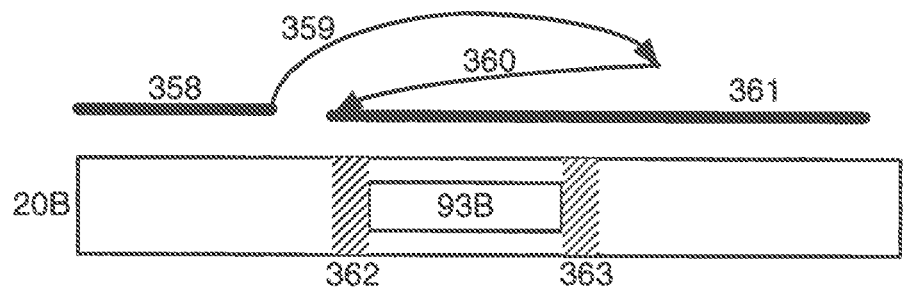

FIG. 18B shows ad bounceback in operation for a single static ad. Ad 93B has pre-ad zone 362 and post-ad zone 363. Segment 358 indicates frames that are played in a conventional manner. Segment 359 indicates that the user has skipped frames. Segment 360 is a bounceback to the start of pre-ad zone 362, and segment 361 indicates resumption of conventional frame playback. Segment 361 is seen to play ad 93B.

Figure 18C:
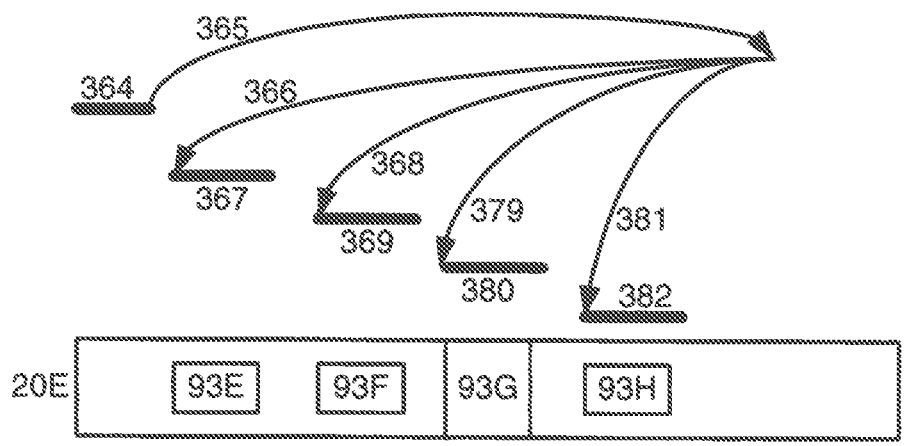

FIG. 18C shows ad bounceback in operation for multiple static ads. Ads 93E, 93F, 93H are static ads occupying respective portions of respective frames of movie 20E. Ad 93G is a static ad occupying the entire frames of movie 20E. Segment 364 indicates frames that are played in a conventional manner. Segment 365 indicates that the user has skipped frames. Since the skip would bypass several ads, namely ads 93E, 93F, 93G, 93H, there are different strategies that can be employed to determine where the ad bounceback goes to. Only one of these strategies is selected in any embodiment.

One strategy is to bounceback to the earliest ad that would otherwise be skipped. Segment 366 is a bounceback to the start of ad 93E, and segment 367 indicates resumption of conventional frame playback.

Another strategy is to bounceback to any ads that the user has indicated that he or she wishes to view. For example, prior to viewing a movie, the user may have indicated in preferences provided to movie system 10 that he or she is interested in ads relating to washing machines and/or ads that pay the user to watch them, via an input mechanism such as a user preferences web page. Assume ad 93F is a washing machine ad. Segment 368 is a bounceback to the start of ad 93F, and segment 369 indicates resumption of conventional frame playback.

Another strategy is to bounceback to any ads for which the advertiser has required, such as by paying a premium, that the ad be unskippable. For example, the advertiser associated with ad 93G may have paid to make ad 93G unskippable. Segment 379 is a bounceback to the start of ad 93G, and segment 380 indicates resumption of conventional frame playback.

Another strategy is to bounceback to the ad closest to the target skip destination, ad 93H in this case. Segment 381 is a bounceback to the start of ad 93H, and segment 382 indicates resumption of conventional frame playback.

Slip-ad is a technique for prohibiting skipping of a proxy ad. Movies can have no-ad zones defined anywhere therein. Slip-ad causes a proxy ad to move its position from the skipped material to after the resumption of playback. In operation, the proxy ad slips to where the user wants to watch.

FIG. 19A corresponds to FIG. 5D, showing original proxy ad 94C that occupies a portion of frames of movie 20D. Segment 385 indicates frames that are played in a conventional manner. Segment 386 indicates that the user has skipped frames. Segment 387 indicates resumption of conventional frame playback. Segment 386 is seen to skip over ad 94C.

FIG. 19B shows slip-ad in operation for a single proxy ad in movie 20F. No-ad zone 389 occurs at the end of movie 20F. Segments 385, 386, 387 operate as described above. However, original proxy ad 94C slips to midway between the skip point, that is, the end of segment 386, and the start of no-ad zone 389. Segment 388 indicates the slipping of original proxy ad 94C. The destination of original proxy ad 94C is referred to as slipped proxy ad 94C'; the size of the slipped proxy ad can be greater or less than the size of the original proxy ad. Ad 94D is delivered to the location indicated by slipped proxy ad 94C', and is part of the movie played to the user.

FIG. 19C shows slip-ad in operation for multiple proxy ads in movie 20G. Movie 20G has original proxy ads 94C, 94E and no-ad zone 389. Segment 388 indicates the slipping of original proxy ad 94C to slipped proxy ad 94C'. Ads 94D, 94F are respectively delivered to the locations indicated by slipped proxy ads 94C', 94E'.

FIG. 20 shows bounceback and slip-ad in operation in the same movie. Movie 20H has static ad 93B, original proxy ad 94C and no-ad zone 389. Segment 391 indicates frames that are played in a conventional manner. Segment 392 indicates that the user has skipped frames. Segment 386 is seen to skip over static ad 94B and original proxy ad 94C. Segment 393 is a bounceback to the start of static ad 94B. Segment 394 indicates resumption of conventional frame playback. Segment 395 indicates the slipping of original proxy ad 94C to slipped proxy ad 94C', located between the end of static ad 93B and the start of no-ad zone 389.

Figure 17:
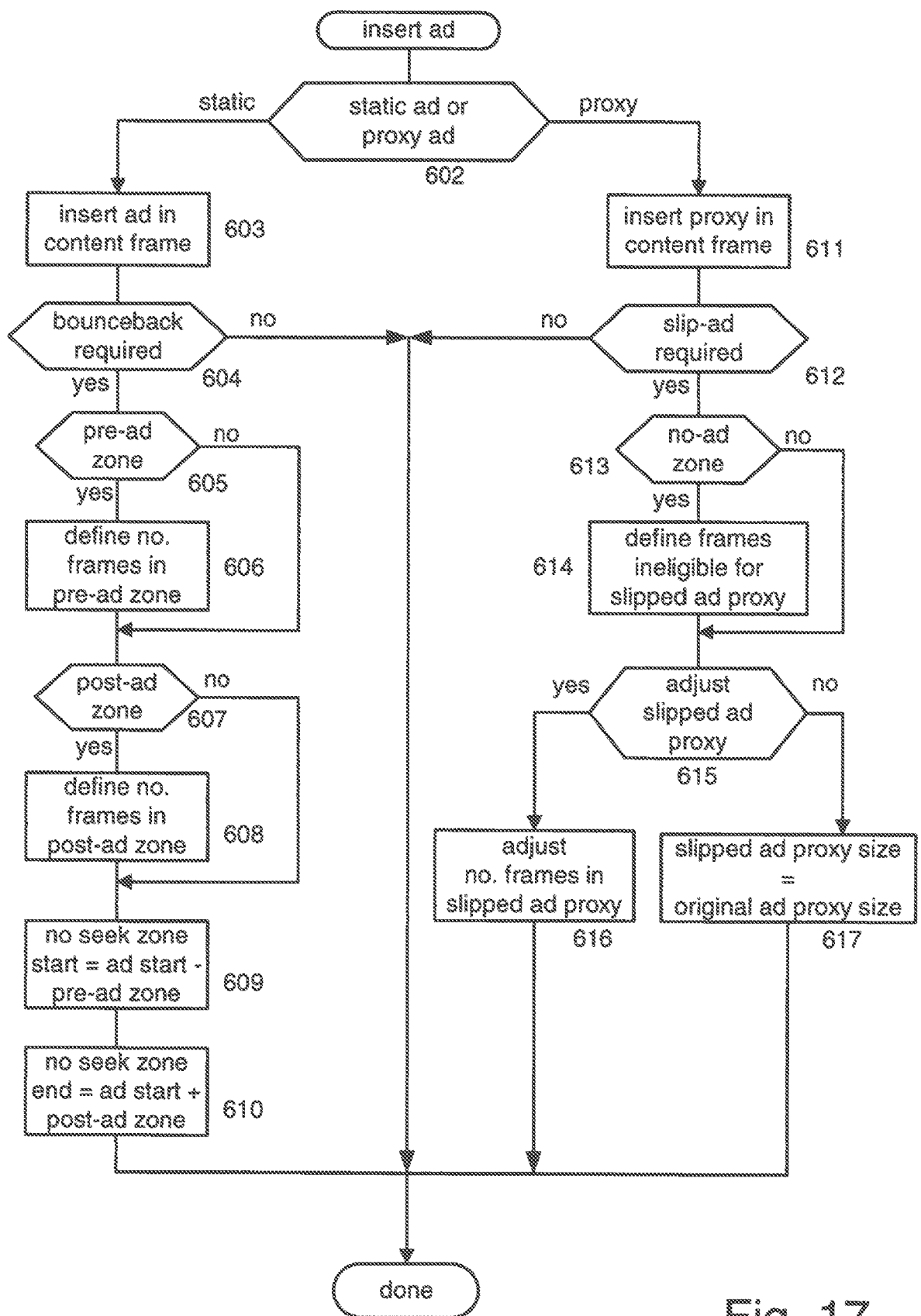
FIG. 17 is a flowchart depicting a portion of transcoder operation during movie creation.

FIG. 17 is a flowchart showing details of ad insertion.

At step 602, transcoder 40 of movie system 10 determines whether a static ad or a proxy ad is being inserted.

If a static ad is being inserted, then at step 603, the ad is inserted into the appropriate frames of the movie, at the appropriate place within the frames. At step 604, it is determined whether this ad should be protected by bounceback, such as by querying the editor. If no bounceback is needed, then processing is complete. If bounceback protection is desired, then at step 605, it is determined whether there should be a pre-ad zone, and if so, at step 606, how many frames should be in the pre-ad zone. At step 607, it is determined whether there should be a post-ad zone, and if so, at step 608, how many frames should be in the post-ad zone. At step 609, the start of the no-seek zone is defined as the start of the ad minus the pre-ad zone, if any. At step 610, the end of the no-seek zone is defined as the end of the ad plus the post-ad zone, if any. Ad insertion processing is complete.

If a proxy ad is being inserted, then at step 611, the proxy ad is inserted into the appropriate frames of the movie, at the appropriate place within the frames. At step 612, it is determined whether this ad should be protected by slip-ad, such as by querying the editor. If no slip-ad is needed, then processing is complete. If slip-ad protection is desired, then at step 613, it is determined whether there should be at least one no-ad zone in the movie, and if so, at step 614, the frames ineligible to receive a slipped proxy ad are indicated. At step 615, it is determined whether the size of the slipped proxy ad should be adjusted relative to the size of the original proxy ad. If so, at step 616, the number of frames in the slipped ad proxy are defined, and an insertion processing is complete. An increased size basically provides a buffer zone relative to any other ads in the movie. A decreased size is meaningful when the proxy ad is a graphic image, and increases the chance that the slipped ad proxy will be small enough to fit into the unskipped part of the movie. If the slipped ad proxy does not require size adjustment, then at step 617, the size of the slipped ad proxy is set equal to the size of the original ad proxy, and ad insertion processing is complete.

Figure 21:
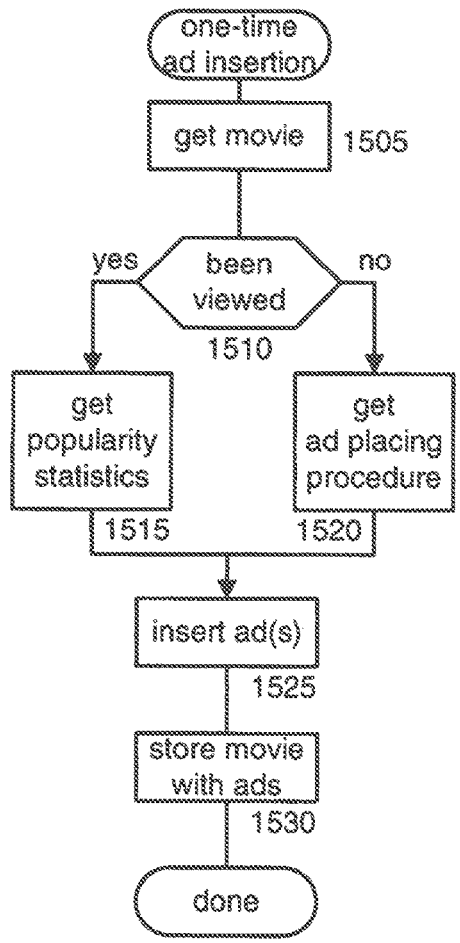
FIGS. 21-23 are flowcharts illustrating different techniques for using popularity statistics to insert ads in a movie.
Figure 22:
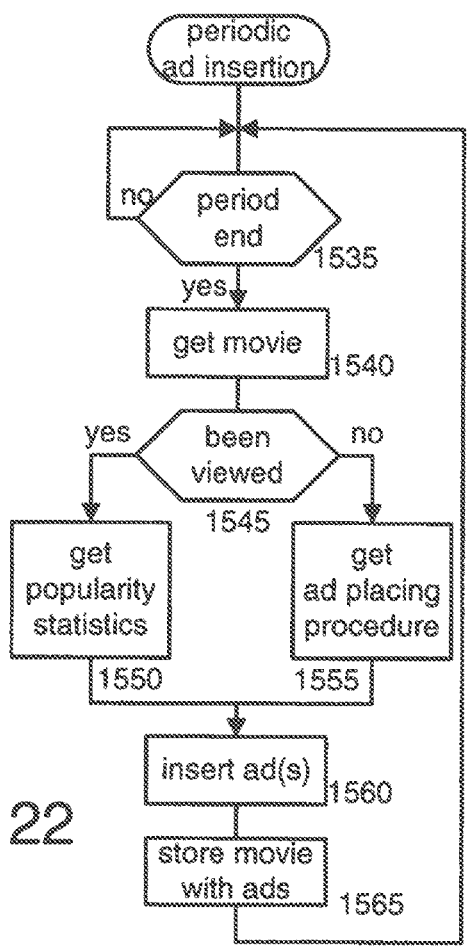
Figure 23:
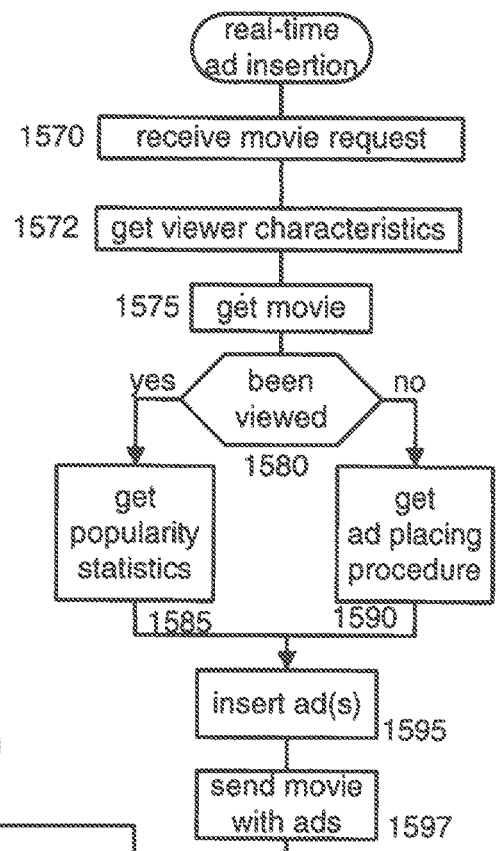

FIGS. 21-23 are flowcharts illustrating different techniques for using popularity statistics to insert ads in a movie. FIG. 21 shows a one-time ad insertion procedure. FIG. 22 shows a periodic ad insertion procedure. FIG. 23 shows a real-time, dynamic, "on the fly" ad insertion procedure.

FIG. 21 shows the technique just described, wherein transcoder 40 inserts ads into a movie. At step 1505, transcoder 40 obtains the movie, such as because the movie is being edited. At step 1510, transcoder 40 determines whether the movie has been viewed.

If the movie has been previously viewed, at step 1515, transcoder 40 obtains movie characteristics and popularity statistics for the movie, such as popularity density graph 960, color graph 970, cloud graph 980, or a computed metric such as Total Interest, discussed above as a weighted sum of various play events. Transcoder 40 also obtains the placement rules for an ad. Typically, an ad provider specifies default placement rules when their account is set up, and can modify, or override for a particular ad or movie, these default placement rules as they wish. Default ad provider placement rules specify whether an ad must be placed manually or automatically, by transcoder 40. If automatically, the ad provider placement rules are able to further specify whether the ad should be aligned with the start of a popular portion, be centered on a popular portion, be aligned with the end of a popular portion, be placed in the popular portion of closest duration to the ad, or other placement procedure. The duration of the ad and the duration of the movie may or may not be identical. The ad provider placement rules are also able to specify whether the ad provider requires the most popular portion of the movie, or will accept another portion that is still popular, such as by indicating how much of a premium the ad provider is willing to pay. In some embodiments, for aesthetic reasons, transcoder 40 generally ensures that there is only one movie ad in any portion of a movie.

On the other hand, if the movie has never been viewed, which in some embodiments corresponds to the number of views being below a threshold, then transcoder 40 uses a predefined procedure based on movie characteristics to place ads. Instances of a predefined procedure for ad placement include: (i) to place ads so they are uniformly distributed in time throughout the video, (ii) clustering ads into groups between movie portions of two to three minutes duration, permitting four to six ads to be inserted for every eight to ten minutes of movie content, as is done in broadcast television, (iii) to place ads at scene changes in the movie, (iv) to place ads at mid-scene in the movie, and so on. In some embodiments, for aesthetic reasons, transcoder 40 generally ensures that there is only one movie ad in any portion of a movie.

At step 1525, transcoder 40 places an ad in the movie, with the placement determined either by popularity statistics or the predefined procedure. At step 1530, transcoder 40 stores the movie with ad(s) in videobase 20.

FIG. 22 is similar to FIG. 21, except that in FIG. 22, a timer constantly runs and at a specified period, such as every hour, every day, every week, or other appropriate period, at step 1535, transcoder 40 redetermines the position of the ad in the movie.

FIG. 23 shows real-time ad insertion. At step 1570, a potential viewer requests a movie. At step 1572, transcoder 40 gets the characteristics of the viewer, if possible. For example, when a user registers with movie system 10, the user can specify their demographics; if the potential viewer is a registered user, then their demographics are available. At step 1575, transcoder 40 obtains the movie, and as described above, inserts ads using either popularity statistics or a predefined ad insertion procedure; here, the characteristics of the viewer may also be used to determine what ad(s) to place in the movie. At step 1597, transcoder 40 sends the movie to the viewer.

Other procedures may be used to automatically insert an ad into a movie, instead of or in combination with the techniques described above.

Motion analysis of a movie may be used to determine where to place an ad, for example, in a scene having the least amount of motion, or alternatively in a scene having a lot of motion but in a relatively static area of the high motion scene. Motion analysis ensures that ad placement is complementary to activity in the movie, rather than obliterating it.

For example, some advertisers may specify that their ad should be placed so that it does not interfere or intersect with dramatic scene changes or scenes of high interest with primary characters visible in the scene.

Face analysis of a movie may be used to ensure that an ad is not placed over a face and/or to ensure that an ad is placed in a scene with at least one human face. Advertiser business rules may indicate a preference for ad placement near faces (i.e., just above or below) so that they do not obscure any characters but are assured that their advertisement will be in an important scene.

Image analysis of a movie may be used to ensure that text or logos are not obscured by an ad. Alternatively, it may be desirable to obscure a logo in the movie with an ad.

Examples of products that perform object recognition and face detection on a video stream are:

Autonomy Virage Smart Encode, available at http://www-.virage.com/content/products/vs-smartencode/index-.html, and Intel Open Source Computer Vision tools, available at http://www.intel.com/research/mrl/research/opencv/

Figure 24:
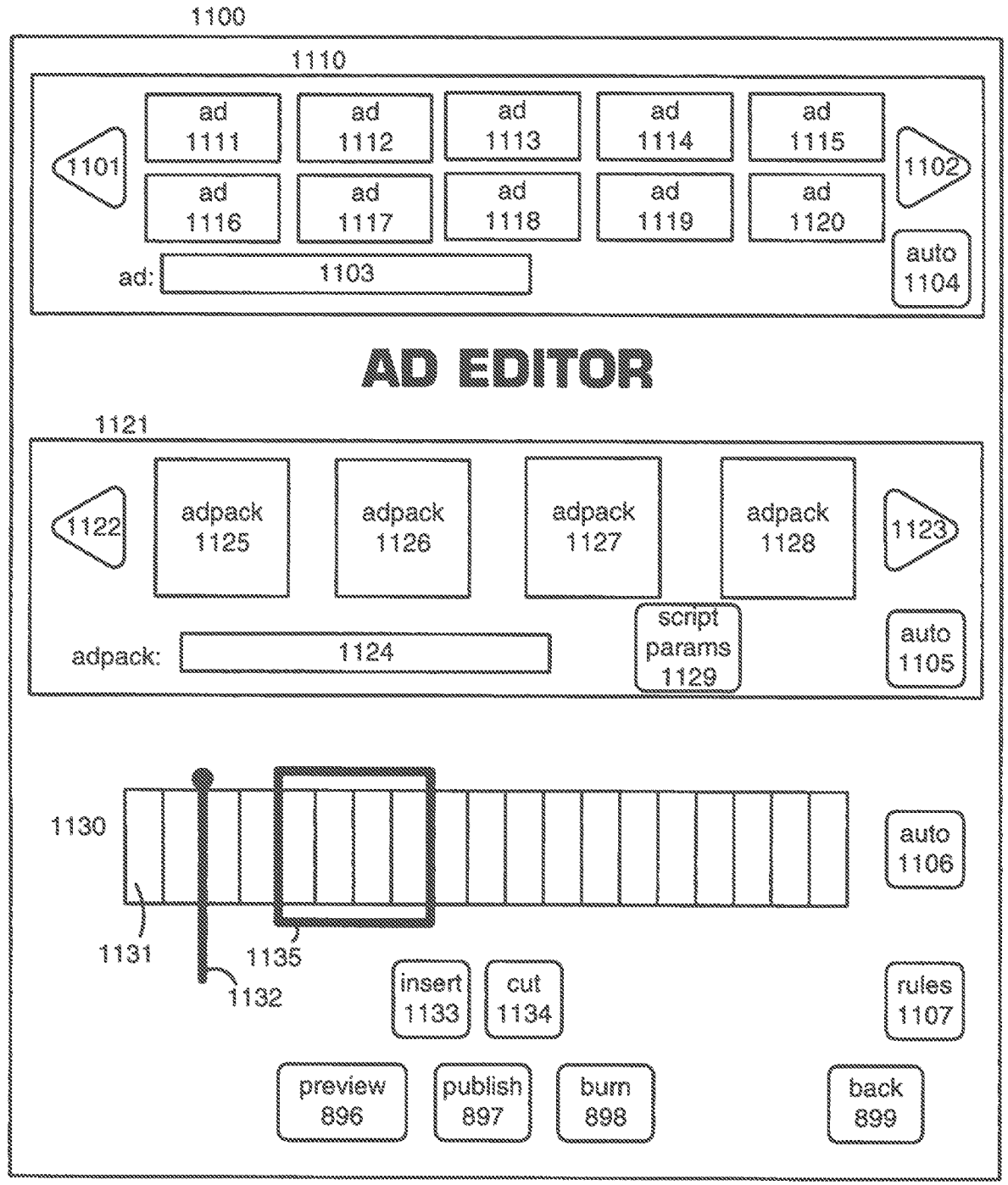
FIG. 24 is a diagram illustrating an ad editor interface.

FIG. 24 shows ad editor interface 1100 having ad area 1110, adpack area 1121 and texture strip 1130.

Ad area 1110 includes ad thumbnail windows 1111-1120 and navigation buttons 1101, 1102 for altering which thumbnails of the ad thumbnails in videobase 20 are displayed in area 1110. Filename entry window 1103 enables a user to type in the name of an ad file, or select an ad filename from a directory, which puts the file's thumbnail in ad thumbnail window 1111. Ad area 1110 also includes automatic button 1104, for indicating that movie system 10 should select an ad.

An adpack is a pairing of an ad movie and an adpack description. An adpack description controls how the ad movie will be displayed in the transcoded movie. Examples of adpack descriptions are:

Ad image at frame bottom
Ad image at frame bottom, fade in and fade out
Ad image slides from left to right in succeeding frames
Ad audio plays when frames are viewed
Ad video at frame top
Ad video at frame bottom
Ad video in frame left
Ad video in frame right The International Advertising Bureau has defined standard ad display areas, and these may be used as adpack descriptions; see, for example, http://www.iab.net/standards/popup/index.asp.

An adpack can also include one or more executable commands, as described above with respect to the tree playback product editor. The provider of an ad movie typically specifies certain adpacks as selectable for its ad movie, and configures the commands to be associated with its ad, movie. Examples of commands are: (i) a hyperlink to the ad provider's web site, (ii) sending the email address of the viewer of the transcoded movie to the ad provider, and (iii) requesting a file download from the ad provider to the viewer of the transcoded movie; other commands are also contemplated.

If the ad is a proxy ad, the adpack includes the address of the proxy ad server where the ad resides.

An adpack can also include special effects and scripts. For example, an adpack may be comprised of a special effect to fade in a graphical banner, then to fade out the graphical banner, wherein the graphical banner is overlaid in a video stream that permits the user to execute a script when clicking on the banner ad, the script causing the user's browser to launch a web site for an advertiser with analytics and tracking for the user interactions.

Adpack area 1121 includes adpack description windows 1125-1128 and navigation buttons 1122, 1123 for altering which adpack descriptions are displayed in area 1121. Filename entry window 1124 enables a user to type in the name of an adpack, or select an adpack from a directory, which puts the adpack in adpack description window 1125. Adpack area 1121 includes script parameters button 1129, for enabling a user to enter parameters for a script. Adpack area 1121 also includes automatic button 1105, for indicating that movie system 10 should select the placement of the ad in the frame.

Texture strip 1130 includes frame representations of the movie being edited, such as frame representation 1131. Positioner 1132 enables rapid selection of a frame of the movie. Slider 1135 indicates frame representations in the texture strip; the editor can adjust the left and right edges of slider 1135. Automatic button 1106 is used when the editor wishes to indicate that movie system 10 should select the frames in which the ad is placed.

To manually insert an ad, the editor selects an ad, such as by clicking ad thumbnail 1117, then selects an adpack description to control where in the frame the ad is placed, such as by clicking adpack description 1127, then adjusts slider 1135 to indicate which frames the ad is placed in, then clicks insert button 1133.

To instruct movie system 10 to select an ad and put it in the movie being edited, the editor clicks automatic buttons 1104, 1105 and 1106.

Rules button 1107 enables the editor to specify the advertiser's ad placement preferences. Advertiser preferences can specify movie characteristics, movie popularity characteristics, viewer characteristics, and how much the advertiser is willing to pay depending on the combination of features delivered, which may include whether the ad is viewed or whether the viewer takes an action relating to the ad. For example, some ads include hyperlinks that a viewer can click on, and the advertiser may be willing to pay a first rate if the ad is merely presented to the viewer, and a second rate if the viewer clicks on the hyperlink. Clicking rules button 1107 makes another window (not shown) appear, that guides the editor through specifying the advertiser preferences. In some embodiments, when an advertiser first registers with movie system 10, the advertiser specifies their default preferences; in these embodiments, the window (not shown) has the defaults filled in, and enables the editor to override the defaults.

To remove an ad, the editor adjusts slider 1135 then clicks cut button 1134.

Buttons 896, 897, 898, 899 function as follows.

Figure 28:
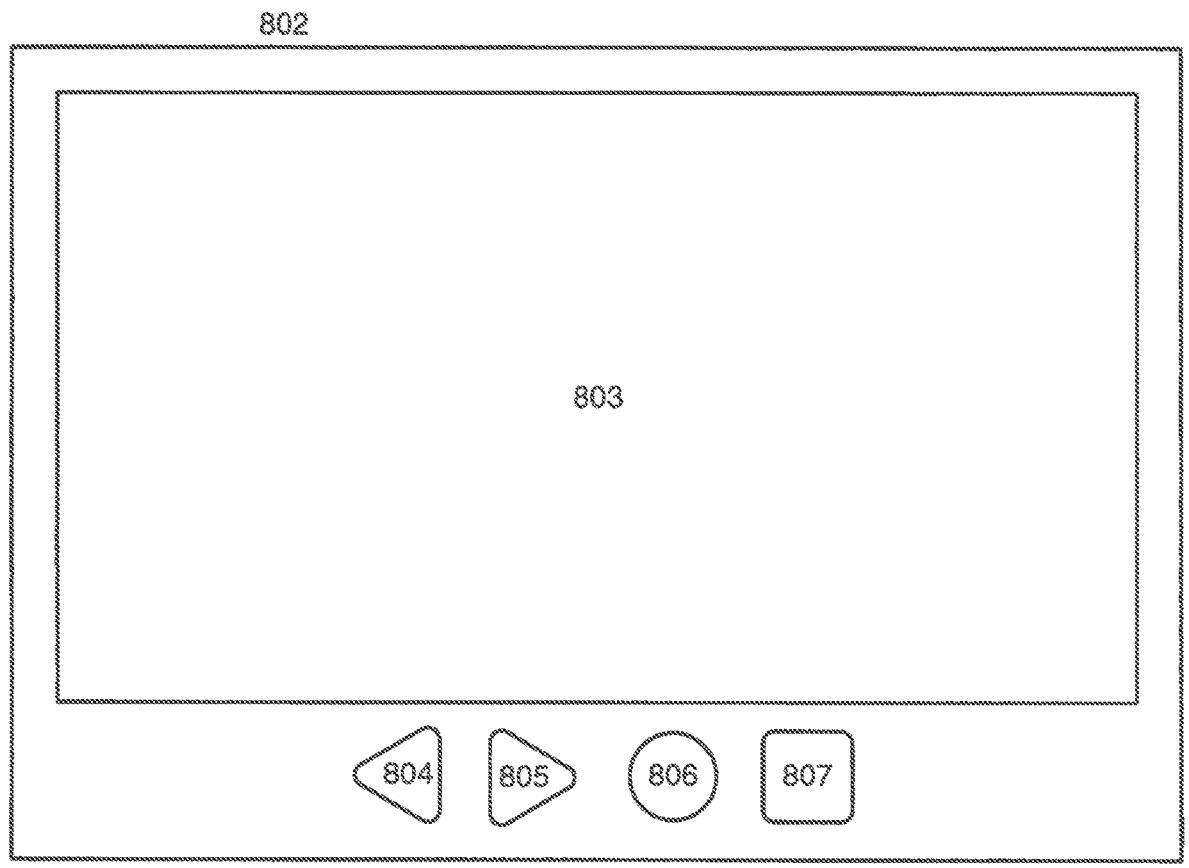

Preview button 896 being actuated causes transcoder 40 creates preview window 802, shown in FIG. 28, having viewing area 803, and navigation button 804-807, and begins playing the mash-up in preview window 803. The user clicks back button 804 to "rewind" the playback, forward button 805 to "advance" the playback, pause button 806 to pause the playback, and stop button 807 to terminate the playback and close preview window 802.

Publish button 897 being actuated causes transcoder 40 to pop-up a window (not shown) that enables the user to select a thumbnail and destination.

Burn button 898 enables the user to indicate to transcoder 40 that burning (recording) onto a medium is desired. Clicking burn button 898 causes transcoder 40 to pop-up a window (not shown) that enables the user to select a media for burning and provide delivery directions for the burned media.

Back button 899 enables the user to return to edit window 700 in FIG. 11.

Returning to FIG. 10, at step 620, transcoder 40 determines whether the user wishes to share the transcoded movie, or segments thereof. For example, the user indicates a desire to share by selecting share button 790 in FIG. 11. If so, at step 625, the user identifies segments by deep tagging them, or using previously defined deep tags. At step 630, the user identifies who is permitted to access which segments. In some embodiments, when a user registers with movie system 10, the user can create access groups having one or more outside users in each group; the same outside user can be included in one or more access groups. An outside user is generally identified by a nickname and an email address. Then, the user instructs transcoder 40 when to make the access permissions effective, typically by sending an email to the outside users identifying the segment address, and its short text description. The segment address is of the form: (server 50 address, transcoded movie identifier, deep tag identifier). In some embodiments, the user can, as part of sharing, list the transcoded movie in a directory accessible to other users of movie system 10, searchable by characteristics of the transcoded movie, such as its metadata subject keywords, its creation time, and/or its ads.

Figure 25:
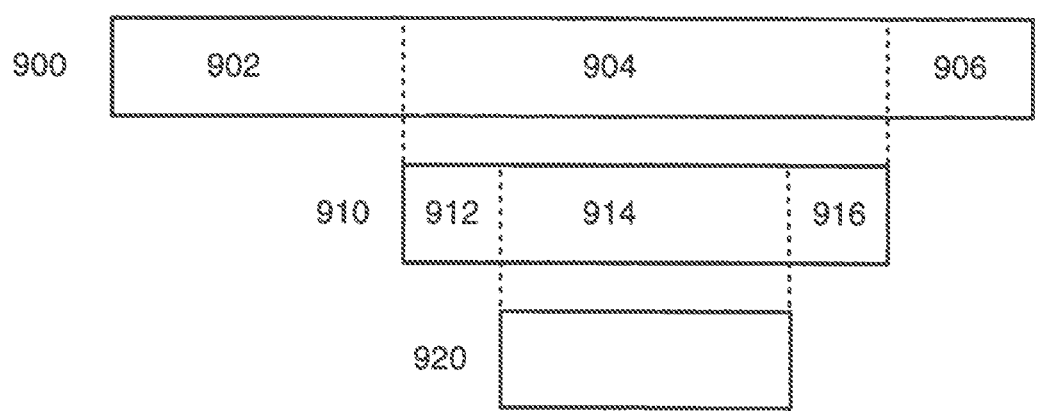
FIG. 25 is a diagram illustrating access permission for a movie.

FIG. 25 is a diagram illustrating access permission for a movie. Let it be assumed that the owner of movie 900, user1, defines a deep tag indicating segment 904 of movie 900, and permits an outside user, user2, to access segment 904. Now, in movie 900, segments 902 and 906 are private segments, while segment 904 is a shared segment.

User2 sees segment 904 as movie 910. User2 can define a deep tag indicating segment 914 of movie 910, and permit an outside user, user3, to access segment 914. Now, in movie 910, segments 912 and 916 are private to user2, while segment 914 is shared.

User3 sees segment 914 as movie 920, and can similarly enable access to all or parts of movie 920.

At step 631 of FIG. 10, transcoder 40 determines whether the user wishes to create a playback product. If so, at step 632 of FIG. 10, the steps of FIG. 26 are executed by transcoder 40.

If the movie that is to be turned into a playback product includes one or more static ads, then the playback product includes those ads and viewers of the playback product see the static ads. If the movie includes one or more dynamic ads, then the playback product includes those dynamic ads; if the player of the playback product is suitably coupled to a communication network and can interpret the embedded information to dynamically retrieve ads, then the viewer of the playback product will see the dynamic ads, otherwise, the viewer of the playback product will not see the dynamic ads.

Figure 26:
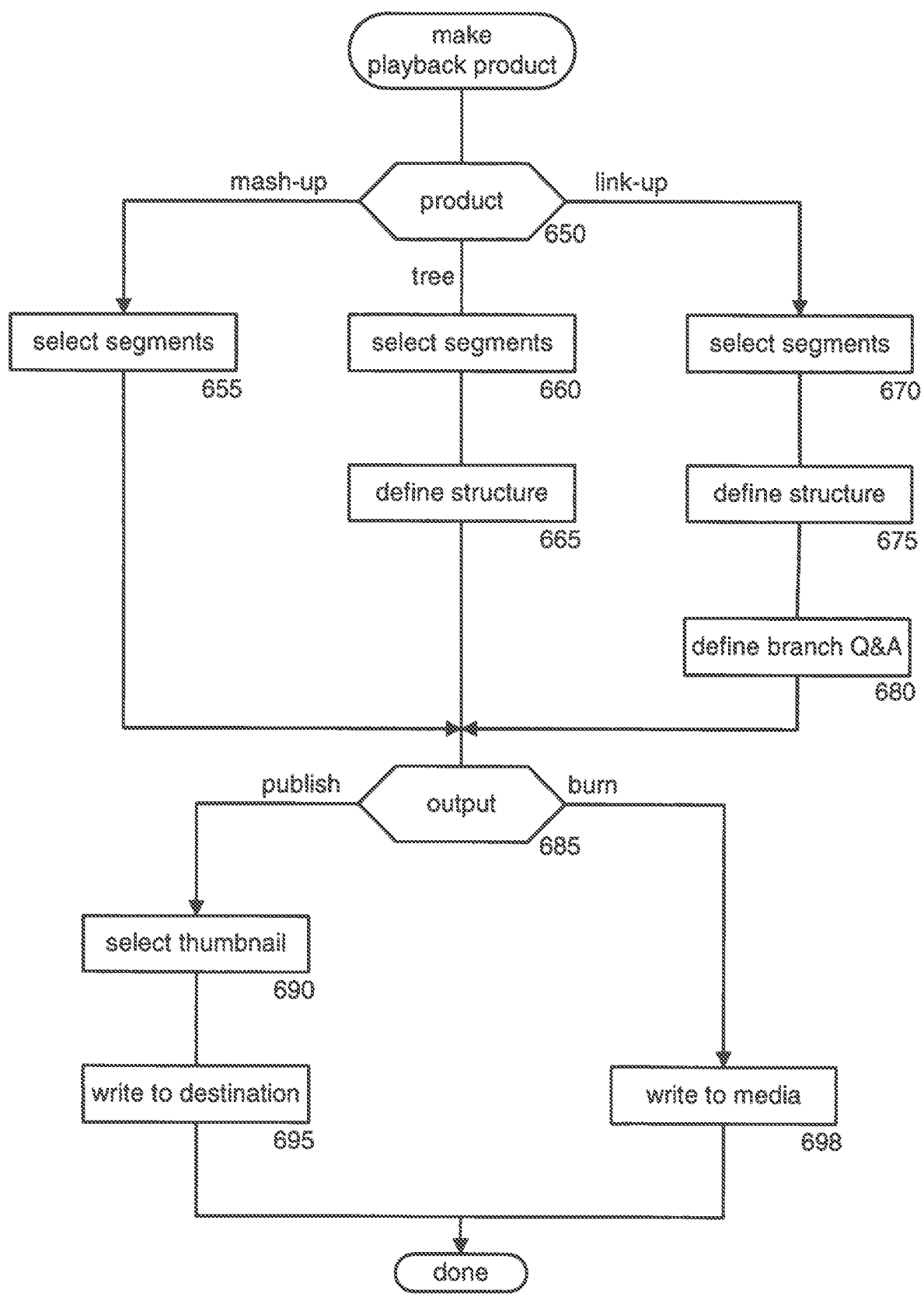
FIG. 26 is a flowchart depicting transcoder operation to generate a playback product.

Turning to FIG. 26, at step 650, transcoder 40 receives the user's selection of which playback product is to be created. For instance, using the editing interface of FIG. 11, the user indicates which playback product by selecting one of buttons 771, 772, 773. In this embodiment, three products are defined. In other embodiments, other products are available. The playback products are a mash-up, a tree, and a link-up.

A mash-up is a sequential display of selected segments. A viewer of a mash-up playback product can only navigate forward or backward in the product.

A tree is a set of segments and a hierarchical, linear control structure for displaying the segments. Generally, a viewer of a tree playback product clicks on selections to navigate the product, in addition to forward and backward.

A link-up is a set of segments and a non-linear control structure for displaying the segments. Generally, a viewer of a link-up playback product navigates via one or more of: forward and back movement, clicking on selections, and/or providing alphanumeric input. A tree and a mash-up are constrained forms of a link-up.

If a mash-up is selected, at step 655, the user selects the sequence of segments to be included via a mash-up editor. Then, at step 685, the user selects whether the mash-up is to be published or burned.

Publishing means transferring the mash-up to videobase 20 or to user PC 110. If publishing is selected, at step 690, the user selects a thumbnail to represent the mash-up, and provides metadata if desired such as a mash-up filename. At step 695, the user indicates a destination for the mash-up file, such as videobase 20, or PC 110. Transcoder 40 responds by transferring the mash-up in accordance with the user's selections.

Burning means writing the mash-up to a removable storage medium, such as a DVD or memory chip, and sending the removable storage medium to the user. If burning is selected, at step 698, transcoder 40 transfers the mash-up file to the removable storage medium type designated by the user. In the case of a DVD, transcoder 40 sends the mash-up file to DVD burner 60, which creates a DVD having the mash-up.

Figure 27:
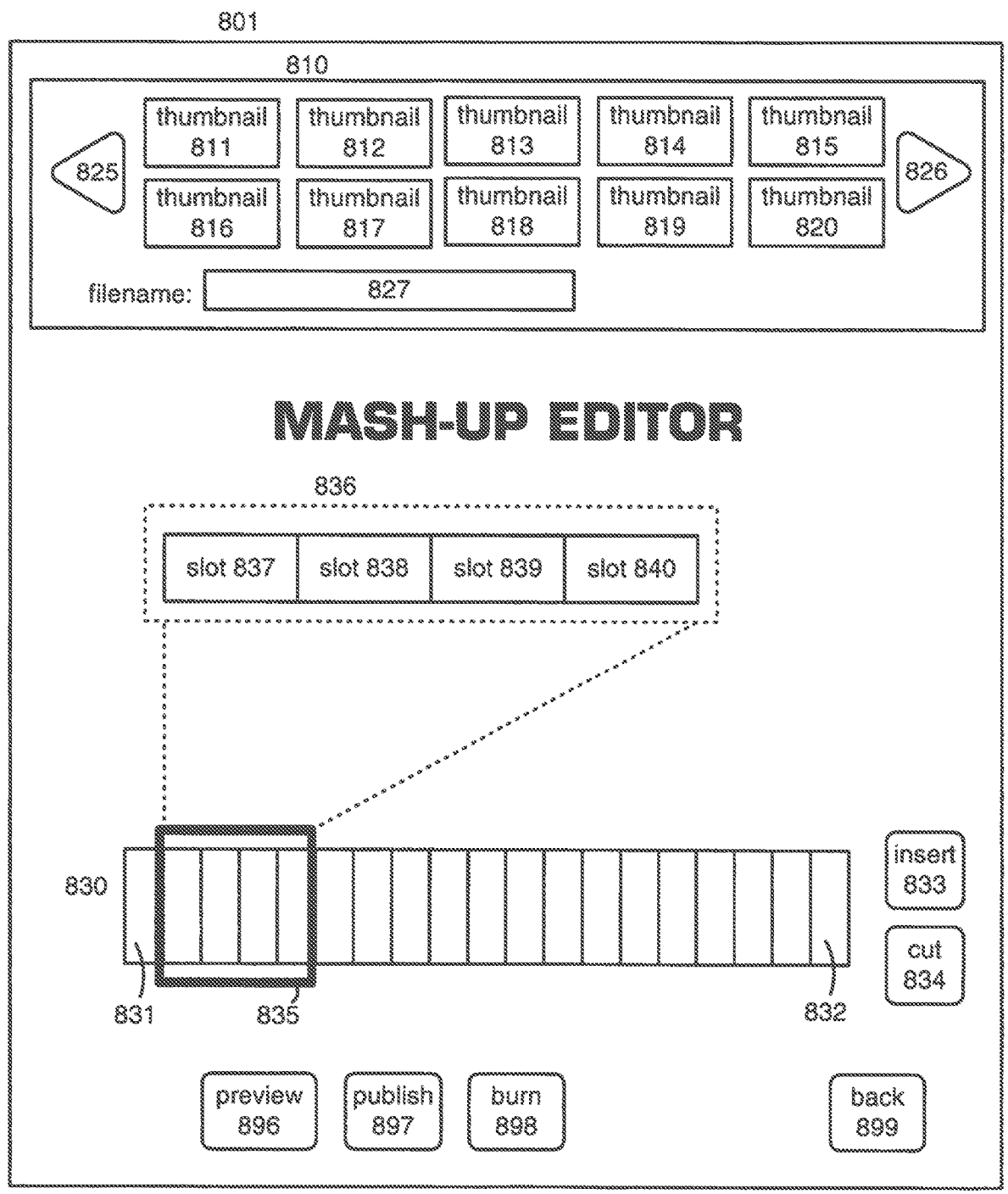
FIGS. 27-32 are diagrams used in explaining specialized editing capabilities for making playback products.

FIG. 27 shows mash-up editor interface 801. Thumbnail area 810 includes navigation buttons 825, 826 for altering which thumbnails of the user's stored thumbnails are displayed in area 810. In general, a user acquires stored files, represented by thumbnails, by uploading a movie, image, graphic or audio file; selecting frames of an existing movie; or creating a playback product as described herein. After storing a file, the user can edit the file by selecting the file's thumbnail in one of the specialized editors discussed herein. Thumbnail area 810 shows ten thumbnail windows 811-820, but a user may have hundreds of stored files, each with a corresponding thumbnail. Filename entry window 827 enables a user to type in the name of a file, or select a filename from a directory, which puts the file's thumbnail in thumbnail window 811.

Slots area 836 comprises placeholders into which the editor, also referred to as the user, drags and drops thumbnails to indicate that the thumbnails are part of the mash-up being created. Slots area 836 includes slots 837, 838, 839, 840.

Texture strip 830 represents the mash-up being created. Phantom start and end frames 831, 832 enable the user to add thumbnails before or after the selected thumbnails. Frame selector 835 has start and end portions that can be adjusted by the user. After the user is satisfied with the thumbnails dragged into slots 837-840, the user clicks insert button 833 to insert these thumbnails into the mash-up. In response, transcoder 40 creates a frame representation of each thumbnail, puts the thumbnail frame representation in the appropriate frame of texture strip 830, and clears slots 837-840. To insert subsequent files into the mash-up, the user moves frame selector 835 to a position after the inserted thumbnails. To insert preceding files into the mash-up, the user moves frame selector 835 to include phantom frame 831. To delete files from the mash-up, the user positions frame selector 835 on the frame representations of the thumbnails of the files to be deleted, and clicks cut button 834.

At any time, the user can click preview button 896 to see what the mash-up will look like. In response to preview button 896, transcoder 40 creates preview window 802, shown in FIG. 28, having viewing area 803, and navigation button 804-807, and begins playing the mash-up in preview window 803. The user clicks back button 804 to "rewind" the playback, forward button 805 to "advance" the playback, pause button 806 to pause the playback, and stop button 807 to terminate the playback and close preview window 802.

Publish button 897 enables the user to indicate to transcoder 40 that publication of the mash-up is desired. Clicking publish button 897 causes transcoder 40 to pop-up a window (not shown) that enables the user to select a thumbnail and destination.

Burn button 898 enables the user to indicate to transcoder 40 that burning of the mash-up is desired. Clicking burn button 898 causes transcoder 40 to pop-up a window (not shown) that enables the user to select a media for burning and provide delivery directions for the burned media.

Back button 899 enables the user to return to edit window 700 in FIG. 11.

If a tree playback product is selected, at step 660, the user selects the sequence of segments to be included via a tree editor, and at step 665, defines the tree structure. Then, at step 685, the user selects whether the tree playback product is to be published or burned.

Figure 29:
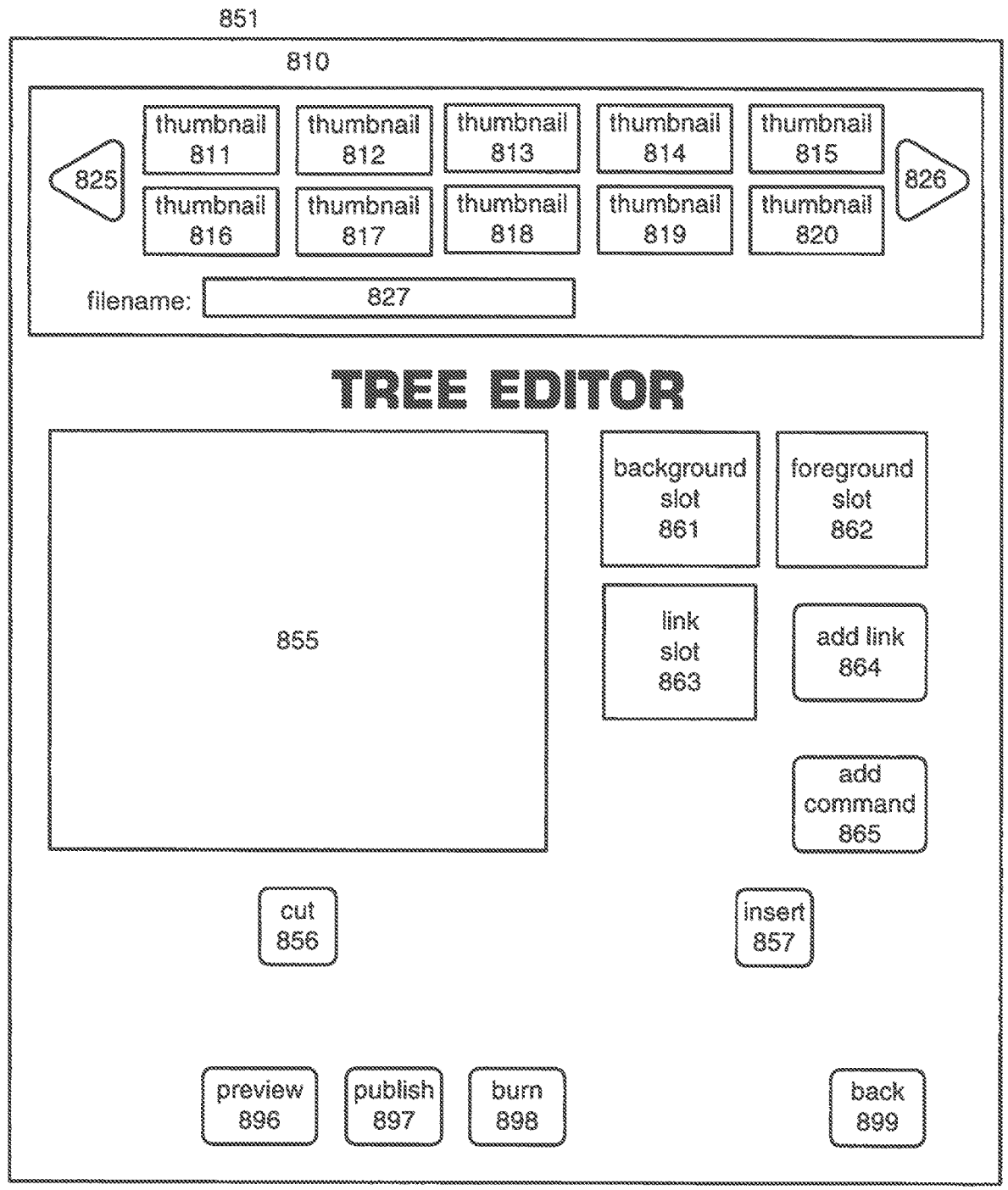

FIG. 29 shows tree editor interface 851. Tree editor interface 851 is generally similar to mash-up editor interface 801; similarities will not be discussed for brevity.

Tree structure window 855 shows a graph of the control structure of the tree playback product being created. Initially, the window is blank, since nothing has been specified.

Figure 30:
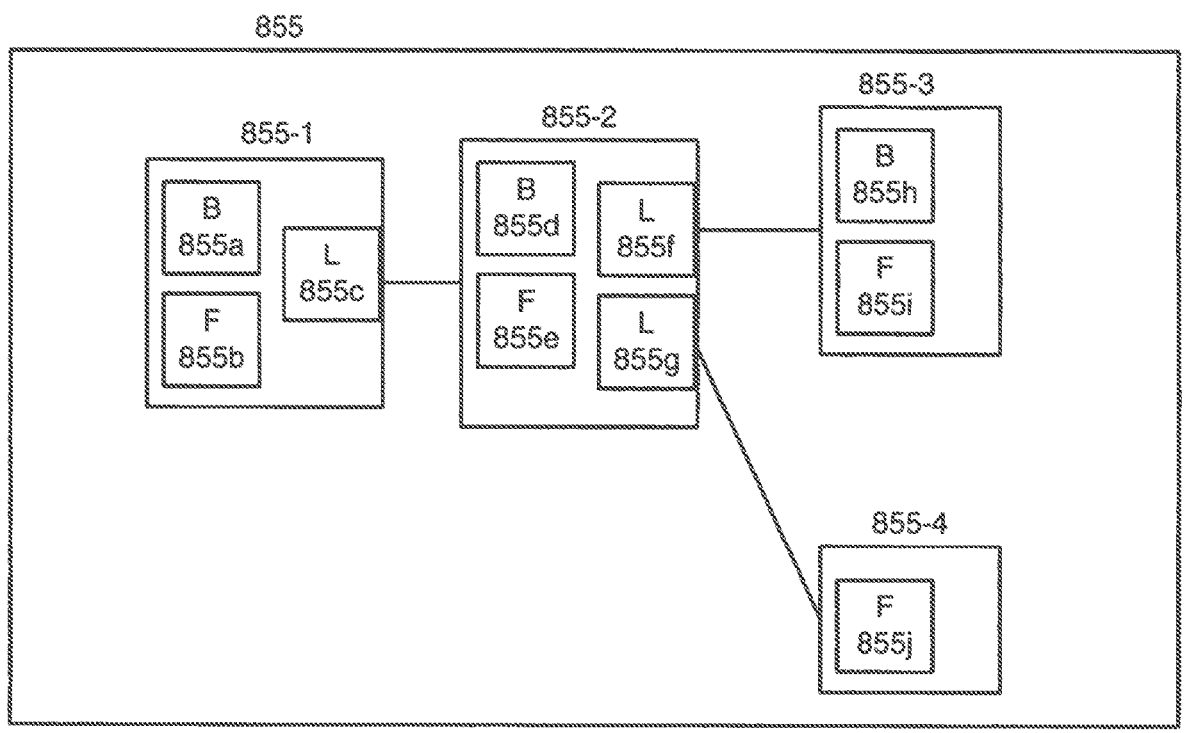

FIG. 30 shows an example of tree structure window 855 after a tree playback product has been created. The tree playback product includes segments 855-1, 855-2, 855-3 and 855-4. Window 855 shows, via lines, the control structure for the navigation between the segments of the playback product. In this example, segment 855-1 leads to segment 855-2 which in turn leads to either of segment 855-3 and 855-4.

Each segment of a tree playback product comprises a background, a foreground and a link. In one embodiment, a background is a still image, a foreground is a video or audio segment, and the link is indicated by a graphic image. When the viewer of the playback product clicks on the link, the viewer is taken to the next segment, that is, a link indicates one segment. Each segment can have 0, 1 or multiple links.

A tree segment can also include 0, 1 or multiple commands. Typically, a command is indicated by a graphic image. When the viewer of the playback product clicks on the command, the command is sent to the source of the playback product, such as server 50, for execution.

Returning to FIG. 29, to create a segment, the editor drags and drops thumbnails from thumbnail window 810 into at least one of background slot 861, foreground slot 862, and link slot 863. If more links are desired for this segment, the editor clicks add link button 864, and then drags and drops thumbnails into the additional link slots (not shown) created by clicking link button 864. When the user is satisfied, he or she clicks insert button 867 to create a segment.

If a tree playback product segment is created with at least one link, transcoder 40 creates an empty segment as the destination of each link, and displays the empty segment in tree structure window 855. The editor clicks on the empty segment in tree structure window 855 and inserts thumbnails into at least one of the background, foreground and link slots.

If the editor wishes to delete a segment, the editor selects the segment in tree structure window 855, then clicks cut button 856 to remove the segment. Removing a segment automatically removes the link leading to the segment from the preceding segment.

To create a command in a segment, the editor clicks add command button 865. Transcoder 40 provides a pop-up window with a command editor (not shown) that enables the editor to drag and drop a thumbnail indicating the command, select a command from a menu of commands or type the command directly into a command line window (if the editor knows how to write commands in the command language, such as JavaScript), and, when appropriate, provide parameters for the command. Examples of commands are: (i) a hyperlink to a webpage, (ii) provide the email address of the viewer of the playback product to the owner of the playback product, (iii) provide the email address of the viewer to a third party, (iv) download a program and execute it, and so on.

It will be understood that a thumbnail can be dropped into multiple slots during creation of a tree playback product.

Clicking preview button 896 causes transcoder 40 to create a window similar to that shown in FIG. 28, however, the tree playback product includes link areas in window 803 that a user can click to navigate between segments.

If a link-up playback product is selected, at step 670, the user selects the sequence of segments to be included via a link-up editor. At step 675, the user defines the link-up structure. At step 680, the user defines the link-up navigation questions and answers. Then, at step 685, the user selects whether the link-up is to be published or burned.

Figure 31:
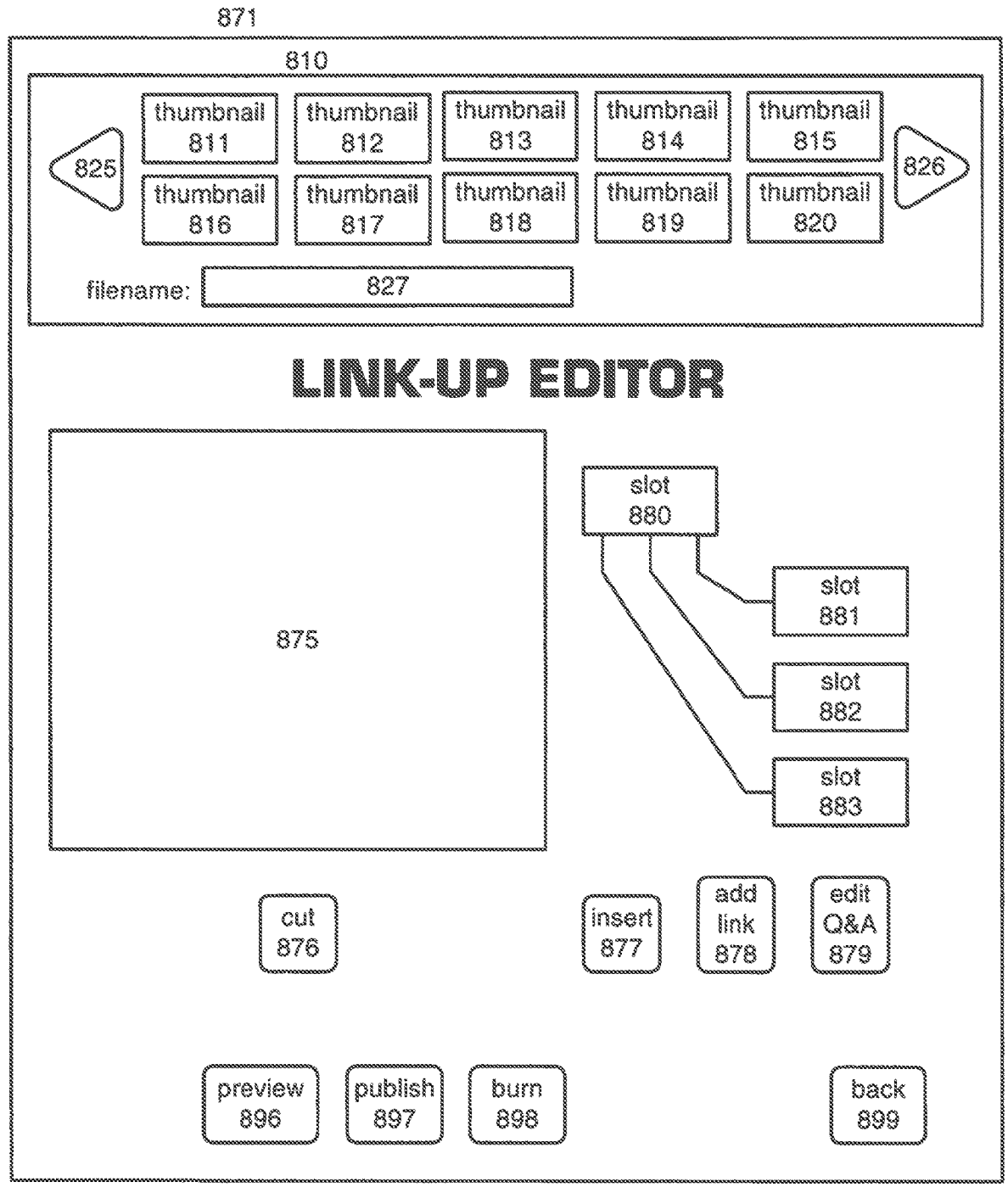

FIG. 31 shows link-up editor interface 871. Link-up editor interface 871 is generally similar to tree editor interface 851; similarities will not be discussed for brevity.

Link-up structure window 875 shows a graph of the control structure of the link-up playback product being created. Initially, the window is blank, since nothing has been specified.

Figure 32:
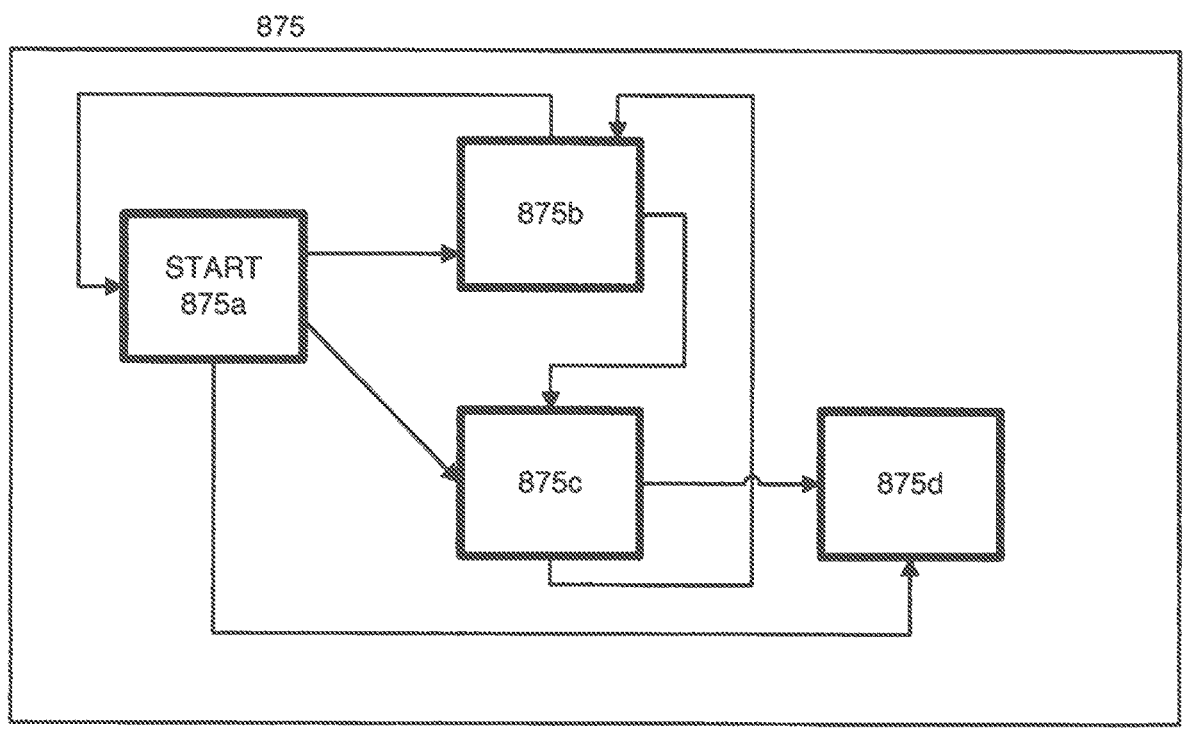

FIG. 32 shows an example of link-up structure window 875 after a link-up playback product has been created. The link-up playback product includes segments 875a, 875b, 875c and 875d. Window 875 shows, via lines, the control structure for the navigation between the segments of the playback product. In this example, segment 875a, always the first segment to be played during playback, leads to segments 875b, 875c and 875d. Segment 875b leads to 875a and 875c. Segment 875c leads to segments 875b and 875d. Segment 875d is sometimes referred to as a final segment, since it is never followed by another segment. Segments 875b and 875c are sometimes referred to as intermediate segments, since they are not the start segment and they do lead to another segment.

Returning to FIG. 31, to create the link-up structure, the editor drags and drops thumbnails from thumbnail window 810 into start slot 880 and at least one of intermediate slots 881, 882, 883. If more links are desired for this segment, the editor clicks add link button 878, and then drags and drops thumbnails into the additional slots created by clicking link button 878 (not shown). When the user is satisfied, he or she clicks insert button 877 to create the link-up. Transcoder 40 responds by displaying the link-up in link-up structure window 875, highlights the just-created bit of link-up structure, and freezes the highlight until the editor clicks edit Q&A button 879 to create text associated with the link-up.

A Q&A dialog (not shown), consists of an optional header and a set of choices associated with the respective links. One instance of a Q&A is,
    Click on the word to indicate what you want to view next:
      kitchen
      den
      basement
      garage
      backyard
    Another instance of a Q&A is,
      More pictures of actor Alice
      More pictures of actor Bob
      More pictures of actor Chris
    Another instance of a Q&A is,
    Type (or click on) the number closest to your age:
      15
      20
      25
      30

If the editor wishes to delete a segment, the editor selects the segment in link-up structure window 875, then clicks cut button 876 to remove the segment. Removing a segment automatically removes the portion of the Q&A leading to the segment from the preceding segments.

Clicking preview button 896 causes transcoder 40 to create a window similar to that shown in FIG. 28, however, the link-up playback product includes Q&A areas in window 803 that a viewer can utilize to navigate between segments.

The transcoded movie is then stored in videobase 20, and database 30 is suitably updated.

A use case will now be discussed.

Let it be assumed that a user uploads three files (FIG. 10, step 400). The first file is a DVD file in MPEG2 format. The second file is a webcam file in MPEG4 format. The third file is a mobile phone camera recording in 3GP format. At this time, the MPEG2, MPEG4 and 3GP formats are considered incompatible.

Movie system 10 converts each of these three files to proxy files in H.263 Flash format (FIG. 10, step 420). Let it be assumed that each of the proxy files has 100 frames, and have the filenames:

Proxy-1200
Proxy-1201
Proxy-1202

Now the user creates a mash-up (FIG. 10, step 450) using the mash-up editor (FIG. 27). Transcoder 40 represents the mash-up as a list of the proxy files and the start and end frames of each proxy file:

Proxy-1200, start 22, end 27
Proxy-1201, start 84, end 86
Proxy-1202, start 62, end 70

Next, the user adds special effects (FIG. 10, step 480) using the effects editor (FIG. 12). Let it be assumed that one special effect is a watermark (effect 45) comprising an image in the user's file proxy-678, and another special effect is a dissolve (effect 18) between the seventh to ninth frames of the mash-up. Transcoder 40 represents the result as:

Proxy-1200, start 22, end 27
Proxy-1201, start 84, end 86
Proxy-1202, start 62, end 70
Effect 45, proxy-678
Effect 18, start 7, end 9

Finally, the user inserts two ads, allowing the system to automatically choose the ads and their placement (FIG. 10, steps 530, 560, 590) using the ad editor (FIG. 24). Transcoder 40 represents the result as:

Proxy-1200, start 22, end 27
Proxy-1201, start 84, end 86
Proxy-1202, start 62, end 70
Effect 45, proxy-678
Effect 18, start 7, end 9
Ad 4511268, adpack 2, start 3, end 6
Ad 3897522, adpack 163, start 11, end 16

Figure 33:
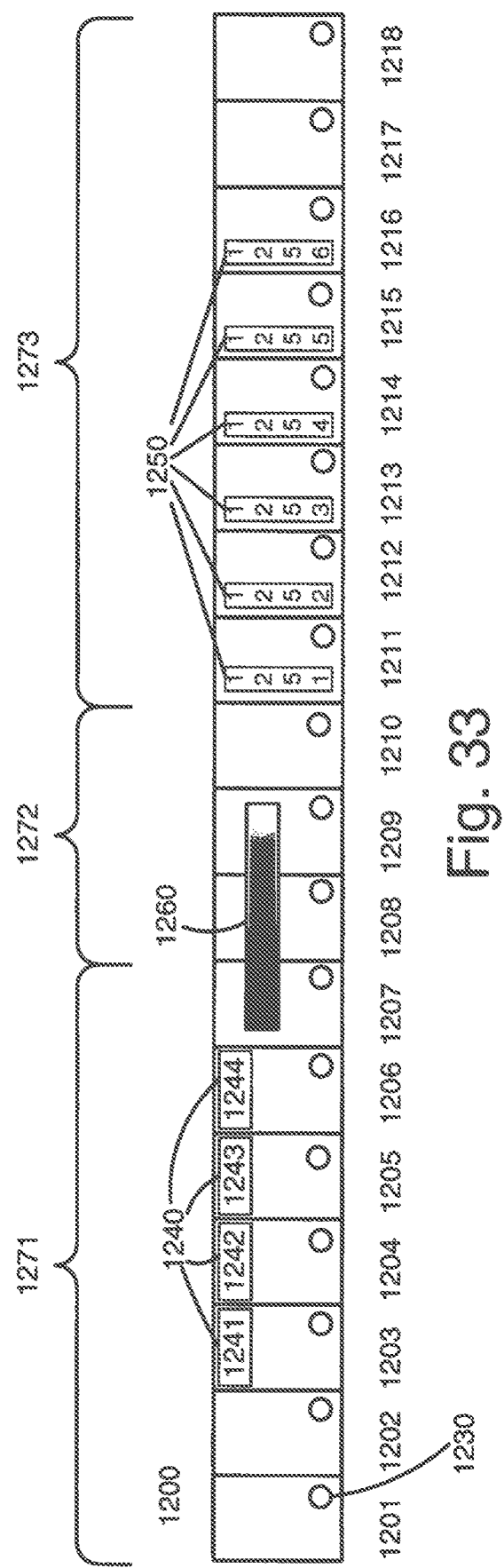
FIG. 33 is a diagram illustrating a transcoded movie.

FIG. 33 shows the texture strip resulting from this use case. Texture strip 1200 comprises frame representations 1201-1218. As indicated by bracket 1271, frame representations 1201-1207 are from file Proxy-1200. As indicated by bracket 1272, frame representations 1208-1210 are from file Proxy-1201, As indicated by bracket 1272, frame representations 1211-1218 are from file Proxy-1202. Watermark 1230, the logo in file proxy-678, is present in the bottom right of each frame, as depicted in each of the frame representations. Dissolve special effect 1260 is present in frame representations 1207-1209. First ad 1240, having frame representations 1241-1244, in present as a top banner in frames 1203-1206. Second ad 150, having frame representations 1251-1256, is present as a side banner in frames 1211-1216.

It will be appreciated that some editing functions can be accomplished in several ways. For example, if the user wishes to delete a frame from the movie, this can be accomplished via (1) creating a mash-up comprising the frames before the deleted frame, followed by the frames after the deleted frame, and not including the deleted frame; (2) adding a special effect to cause the deleted frame to be entirely dark or entirely light, as part of a scene transition; (3) directly selecting "delete frame" from the special effects menu; (4) enabling sharing of the entirety of the movie except for the to-be-deleted frame; and so on.

Figure 34:
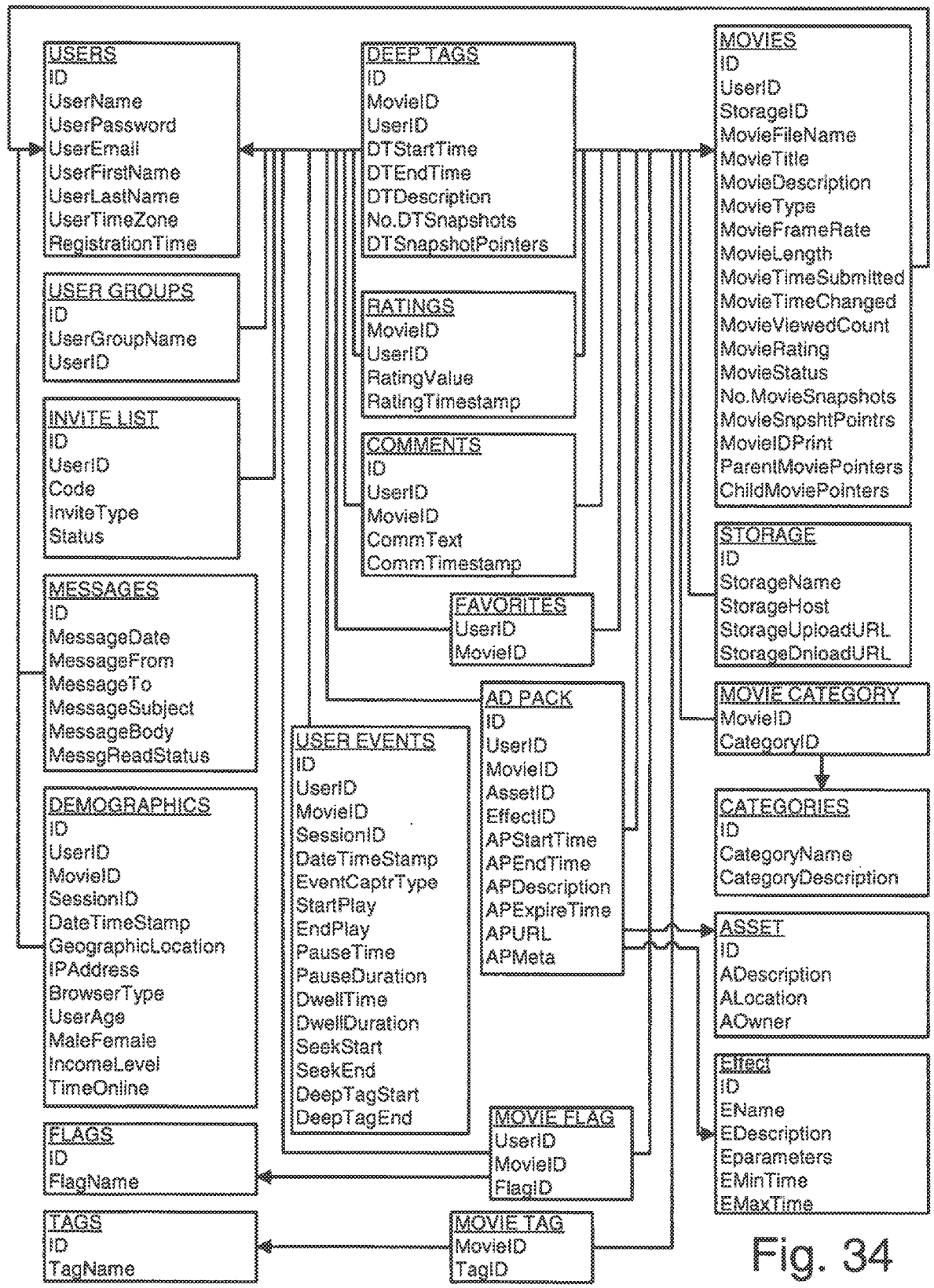
FIG. 34 is a data schema used in the present invention.

FIG. 34 is a partial data schema for database 30. Generally, database 30 can be viewed by users or by movies having appropriate access permission. The schema is structured in accordance with usage of movie system 10.

FIG. 35 shows screen display 1390, provided, for example, at PC 140 or phone 130, and including video display 1391, texture strip 720, positioner 730, deep tag marker 735, deep tag thumbnails 738A-738C, deep tag button 740, navigation buttons 804-807, send button 1392, favorites button 1393, popularity selector 1395, rating selector 1396 and graph area 1394. Screen display 1390 is typically used by a listener/viewer of a movie.

Elements 720, 730, 740 and 804-807 function as described above; the description will not be repeated here for brevity.

Deep tag thumbnails 738A, 738B, 738C appear in a deep tag windowpane. Each of the deep tags associated with the movie being displayed has an associated thumbnail. Each thumbnail is a small image and associated text including deep tag creator name, creation date and time, and any keywords provided by the creator. The small image is configured by the deep tag creator, and can be a portion of an image in a scene, a shrunken image of the scene, an image of the creator, or other suitable visual cue. The deep tag windowpane enables the viewer to scroll among the deep tag thumbnails for the movie. Typically, the thumbnails appear in sequential order corresponding to their location in the movie, but other orders can be used, such as popularity order.

Send button 1392 is used to email a hyperlink of the movie to an email account. Clicking on send button 1392 causes a window to pop-up for entry of an email address, similar to the pop-up window shown in FIG. 42. The pop-up window may have a drop down menu of previously used email addresses arranged by frequency of use, or alphabetical order and so on. In some embodiments, the window enables provision of a text message accompanying the hyperlink.

Favorites button 1393 is used to add the movie to the viewer's list of favorite movies maintained by the player for the user.

Popularity selector 1395 enables the user to control display of a popularity graph, as explained above with regard to FIG. 13. Popularity selector 1395 comprises a set of so-called radio buttons, from which one button can be selected. Selecting "None" suppresses display of a popularity graph. In FIG. 35, "Color graph" is selected, and so color graph 970 of FIG. 13, as appropriate for the movie being viewed, is provided in graph area 1394. In other embodiments, popularity selector 1395 uses a different format, such as a drop-down menu instead of radio buttons.

Rating selector 1396 enables the user to rate the movie. Rating selector 1396 comprises a set of so-called radio buttons, from which one button can be selected. The default is "unrated". If a viewer wishes to rate the movie, she or he clicks on the appropriate number of stars, from one star to five stars. In other embodiments, rating selector 1396 uses a different format, such as a slider bar instead of radio buttons.

Figure 36:
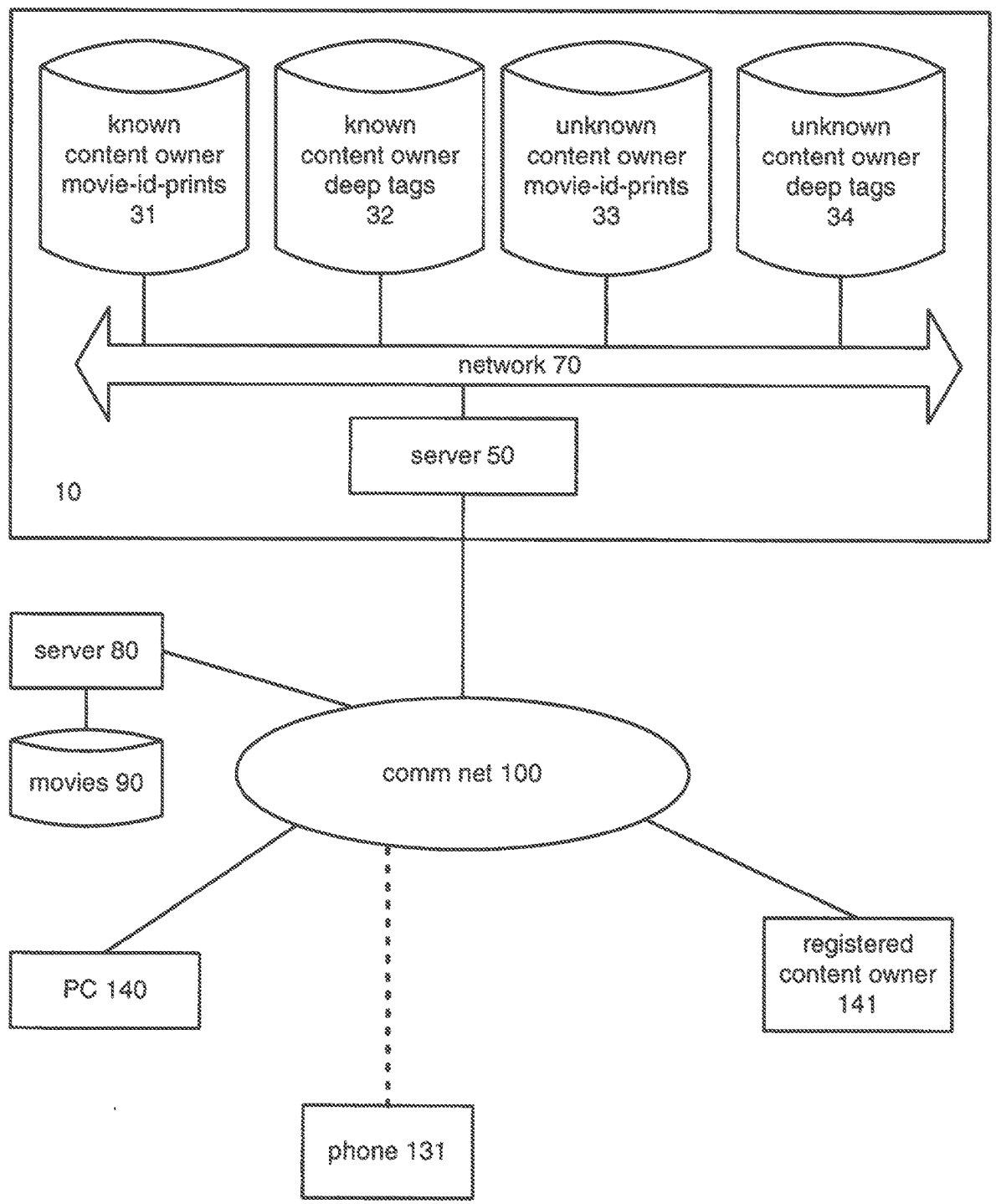
FIG. 36 is a configuration diagram for another embodiment of the present invention.

FIG. 36 is a configuration diagram for another embodiment of the present invention depicting the entities involved in deep tag usage. FIG. 36 shows movie system 10 as including server 50, network 70, known content owner movie-id-prints database 31, known content owner deep tags database 32, unknown content owner movie-id-prints database 33, and unknown content owner deep tags database 34. FIG. 36 also shows server 80, movie storage 90, communication network 100, PC 140, phone 131, and registered content owner host 141.

Server 80 serves to provide a website to visitors that access the website using network 100. Typically, server 80 provides software from movie system 10 that enables display of movies stored in movie storage 90 using the screen interface shown in FIG. 41. In some cases, the provided software operates to send a so-called browser plug-in program to a browser used by a visitor to the website provided by server 80.

Phone 131 is able to communicate wirelessly with communication network 100, and to play movies, receive email and so on.

PC 140 is a general purpose computer executing software in accordance with the present invention. In one embodiment, PC 140 has a web browser that is capable of interacting with information received from server 50 or 80.

Registered content owner host 141 is a general purpose computer programmed to receive and send messages using communication network 100, and may be a personal computer or a web server coupled to other computers.

It will be recalled that a deep tag can be thought of as a movie segment bookmark.

A movie-id-print is like a fingerprint for a movie, that is, a short way to identify a movie.

It is recognized that the ability to deep tag movies, and to send the deep tags to others opens the door to copyright concerns. The configuration shown in FIG. 36 addresses this problem by enabling movie content owners to specify rules for deep tag creation, and further tries to address copyright concerns by tracking deep tagging of movies having unknown content owners, notifying registered content owners of deep tagging of a movie that has an unknown content owner, and, after ownership is established, ensuring all deep tags comply with the content owner's rules. These features are discussed in detail below.

FIG. 37 is a flowchart showing creation of a deep tag and sending the deep tag to another party.

At step 2070, the user of PC 140 views a movie, either from movie storage 20 that is part of movie system 10 (see FIG. 1), or from movie storage 90. At step 2072, the user indicates that he or she wishes to deep tag a portion of the movie, such as by clicking on deep tag button 740 or fast deep tag button 741 (see FIG. 41, below). See the discussion below of different ways that a fast deep tag button can indicate what frames should be deep tagged. At step 2074, the user optionally provides text to accompany the deep tag. At step 2076, the user optionally sets access permission for the deep tag. At step 2078, the user specifies the email address, or so-called instant message id, of one or more recipients of the deep tag. At step 2080, the user sends the deep tag to the named recipient, such as the user of phone 131.

At step 2082, the user of phone 131 receives the deep tag, such as in the form of a hyperlink in an email, an icon in an instant messaging system, or other suitable method. At step 2084, the user of phone 131 activates the deep tag, which causes a movie player to begin executing on phone 131 and to play the movie segment indicated by the deep tag.

FIGS. 38A and 38B show embodiments of deep tags. FIG. 38A corresponds to the deep tag information shown in FIG. 34, namely:
deep tag ID
movie ID (for the movie the deep tag is associated with)
user ID (the creator of the deep tag)
deep tag start time relative to the movie
deep tag end time relative to the movie
a deep tag text description provided by the user
number of deep tag snapshots (thumbnails) associated with the deep tag
pointers to the deep tag snapshots It will be recalled that a snapshot, also referred to as a thumbnail, is a frame chosen to represent the object, for example, a frame at the start, middle or end of the deep tag.

FIG. 38B includes the information of FIG. 38A plus the following: movie-id-print, for convenience in converting from an unknown content owner to a known content owner, the creation date and time of the deep tag, and for each time the deep tag is sent: the sender address, the recipient address, the date and time that the recipient first viewed the deep tagged information, and a text comment, if any, provided by the recipient; an address can be an email address, an instant message ID, and IP address or any other suitable identifier.

Deep tags for which the content owner is known are stored in known content owner deep tags database 32. Deep tags for which the content owner is unknown are stored in unknown content owner deep tags database 34.

Figure 39:
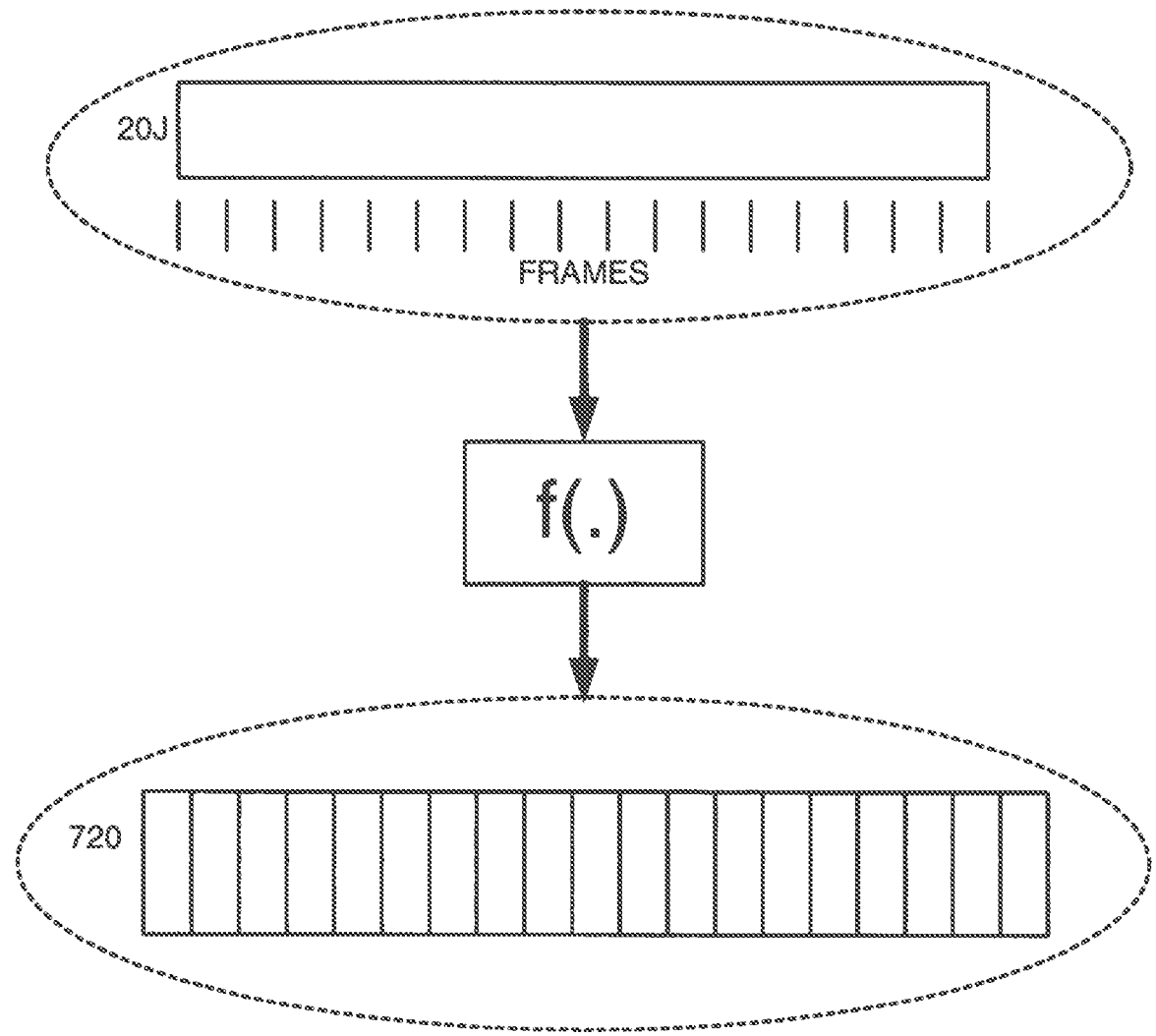
FIG. 39 depicts the process of converting a movie into a texture strip.

FIG. 39 depicts the process of converting movie 20J into texture strip 720. As explained above, transcoder 40 builds the texture strip representing the movie by applying a function, shown as "f(·)" in FIG. 39, to each frame to generate texture data. Transcoder 40 is typically built so that the function is a module, sometimes selected from a library of modules. Texture strip 720 may represent each frame of movie 20J, or may represent selected frames of movie 20J, with the selection being periodic, random, or according to another predetermined procedure. For example, the function might be to extract the center 8.times.8 pixels of each frame and realign into a 64 pixel height column and the texture strip is the sequence of 64 pixel columns. In some embodiments, transcoder 40 checks whether the center set of 8.times.8 pixels are substantially unchanged from frame to frame, and if so, selects different pixels from each frame such as sweeping the position of the 8.times.8 pixel set along a diagonal, from frame to frame, or other suitable technique.

Figure 40C:
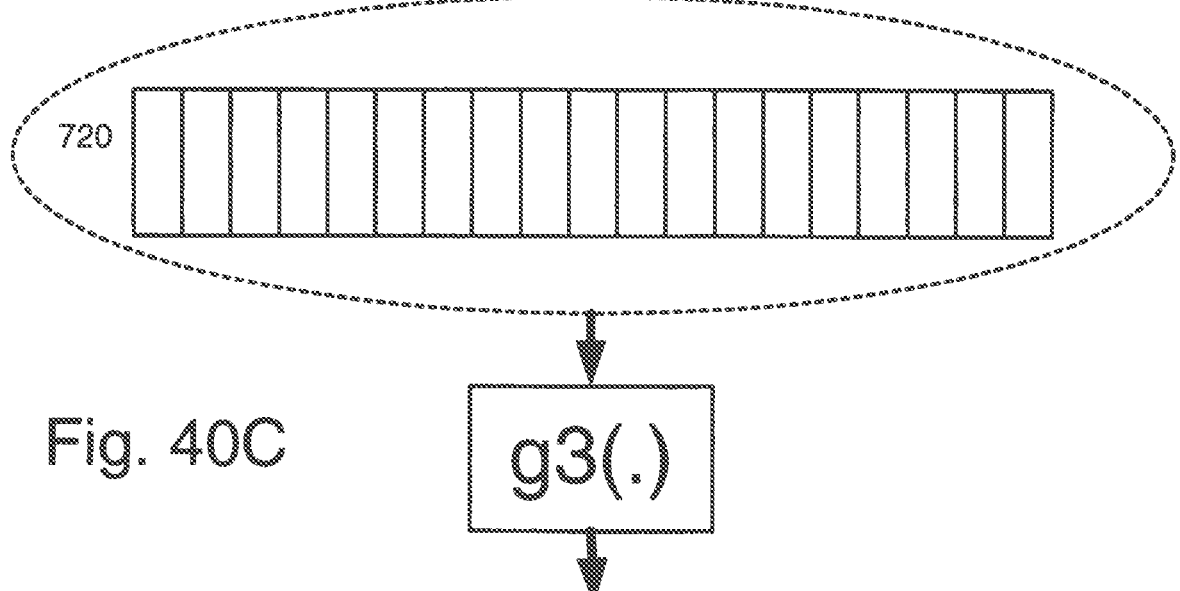
Figure 40D:
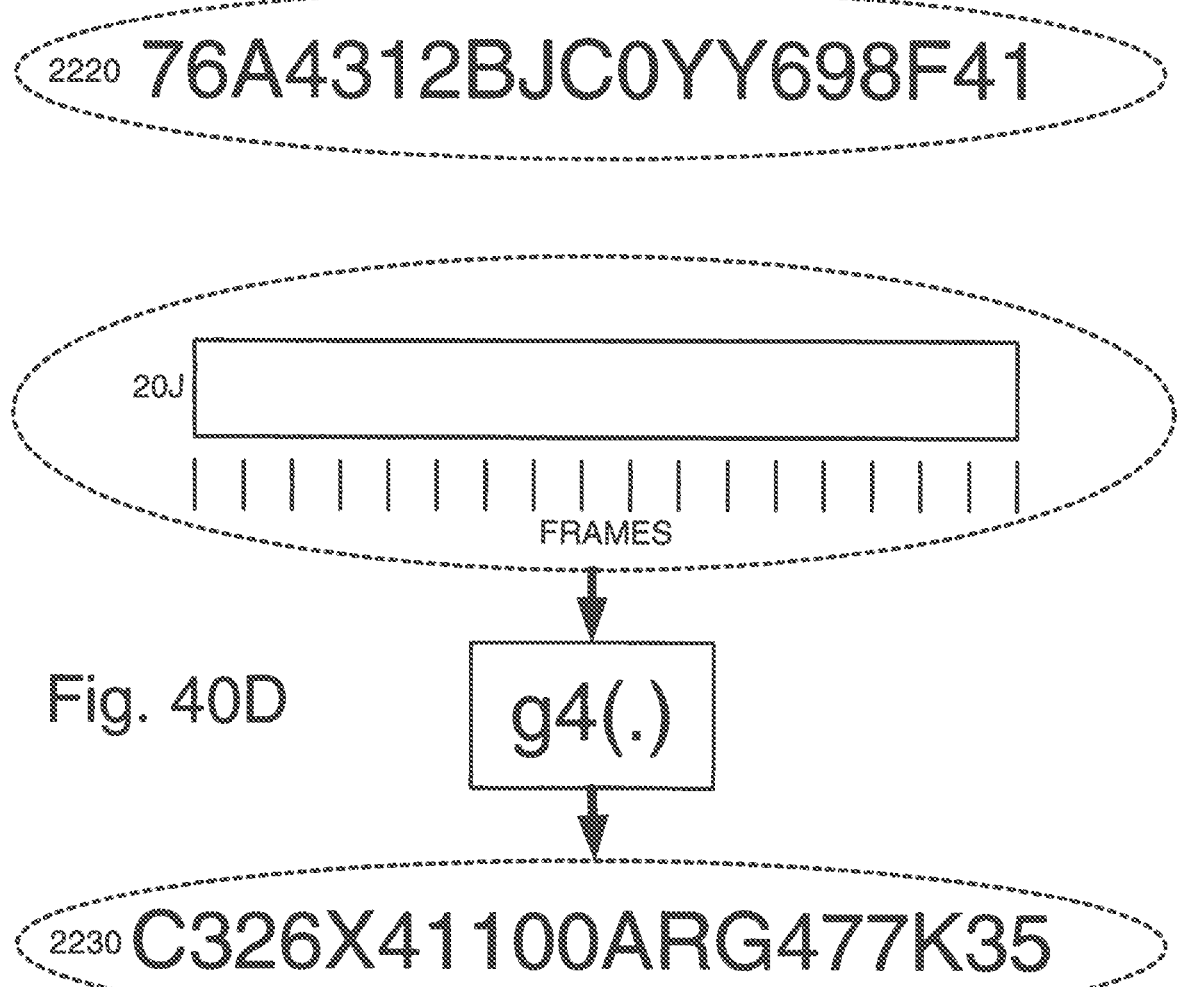

FIGS. 40A-40D depict different ways to create a movie-id-print. Generally, a function g(·) is applied to something to generate the movie-id-print. In the technique of FIG. 40A, the function g1(·) is the identity function, so that texture strip 720 is the same as movie-id-print 2200. In the technique of FIG. 40B, the function g2(·) is a subset selector, so a portion of texture strip 720 is used as movie-id-print 2210. FIG. 40B is a more detailed view of texture strip 720, corresponding to when texture strip 720 comprises columns of pixels. In the technique of FIG. 40C, the function g3(·) is a hash function and is applied to texture strip 720 to create movie-id-print 2220. In the technique of FIG. 40D, the function g4(·) is a hash function and is applied to movie 20J to create movie-id-print 2230.

Movie-id-prints for which the content owner is known are stored in known content owner movie-id-prints database 31. Movie-id-prints for which the content owner is unknown are stored in unknown content owner movie-id-prints database 33.

Figure 41:
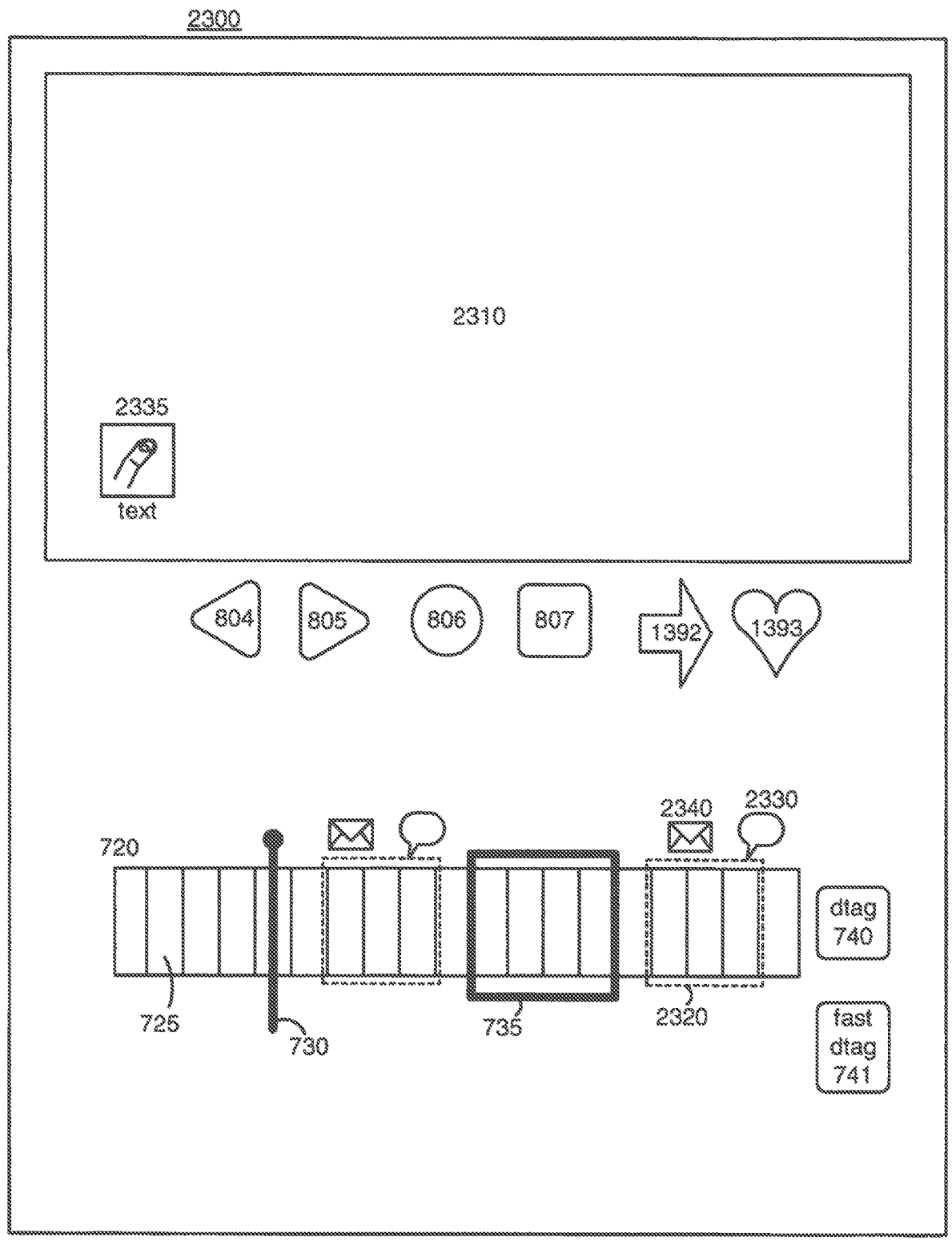
FIG. 41 is a diagram of another user interface for playing a movie.

FIG. 41 is a diagram of a user interface for playing a movie, and is similar to the diagram of FIG. 35. Corresponding elements will not be described for brevity. It will be recalled that the typical way to create a deep tag is by adjusting the left and right sides of deep tag marker 735, such as by dragging, then clicking deep tag button 740. If desired the thus-created deep tag can be sent to another party using send button 1392. If no deep tag has been indicated, send button 1392 will select the address of the entire movie being viewed for transmission to another party.

Deep tag imprint 2320 is superimposed on texture strip 720, and indicates frames that have a deep tag associated therewith. There may be many instances of deep tag imprint 2320 for each texture strip 720, each instance corresponding to a separate deep tag, the deep tag being stored in known content owner deep tag database 32 or unknown content owner deep tag database 34.

Deep tag descriptor 2330 is associated with deep tag imprint 2320, and provides the text descriptor, if any, that is part of the deep tag. For example, if a cursor is positioned on deep tag descriptor 2330, a small area opens on screen 2300 and displays the text descriptor. Alternately, a pop-up window displays the text descriptor.

Deep tag thumbnail 2335 is similar to deep tag thumbnail 738A of FIG. 35, except that deep tag thumbnail 2335 is superimposed on the movie displayed in viewing area 2310 when the movie frames indicated by the deep tag are displayed. In practice, deep tag thumbnail 2335 may be provided as a composite overlay that is translucent, so that the movie frame of viewing area 2310 is visible "beneath" deep tag thumbnail 2335. When there are plural deep tags associated with a movie frame, then plural deep tag thumbnails appear in viewing area 2310 while the movie frame is displayed.

Deep tag send button 2340 is associated with deep tag imprint 2320, and provides a quick way to send the deep tag to another party. For example, if the cursor clicks on deep tag send button 2340, a small pop-up window opens and enables the user to specify the recipient's address.

A streamlined way for creating and sending a deep tag is also provided, sometimes referred to as a "one-click deep tag".

Assume that movie 20J is being viewed in screen display 2300 on PC 140 by a user. Movie 20J is typically provided from movie storage 20 (FIG. 1), but can alternatively be provided from movie storage 90 (FIG. 1 or 36). When the user clicks on fast deep tag button 741, a deep tag is automatically created and pop-up window 2350, shown in FIG. 42, appears so that the user can specify where, if anywhere, the deep tag should be sent.

Generally, the owner of the website from which movie 20J is provided specifies how a fast deep tag is created, selecting from one or more of the following:
  User preferences—follow the preference of a registered (formal) viewer for how the fast deep tag button operates, and if the viewer is not a registered viewer, then use one of the following techniques as a default;
  Simple deep tag—a specified amount of the movie is captured before or after button 741 is clicked, with the amount being determined by the owner of the website, the user, or the owner of the movie;
  Duration deep tag—the portion of the movie that plays while button 741 is being clicked on is captured; thus, beginning to click the fast deep tag button serves as a first indication and ending clicking of the fast deep tag button serves as a second indication;
  Bracket deep tag—after button 741 is clicked, a first amount of the movie preceding the click and a second amount of the movie subsequent to the click are captured, with the first and second amounts being determined by the owner of the website, the user, or the owner of the movie;
  Frame deep tag—after button 741 is clicked, a single frame is captured, such as the frame being displayed when the button is clicked, or the frame indicated by positioner 730;
  Tail deep tag—after button 741 is clicked, a deep tag is created encompassing the portion of the movie from the click until the end of the movie;
  Two click deep tag—the first click of button 741 indicates the start of a new deep tag, the movie continues to play in screen 2300, and the second click of button 741 indicates the end of the deep tag.

Figures 42, 43:
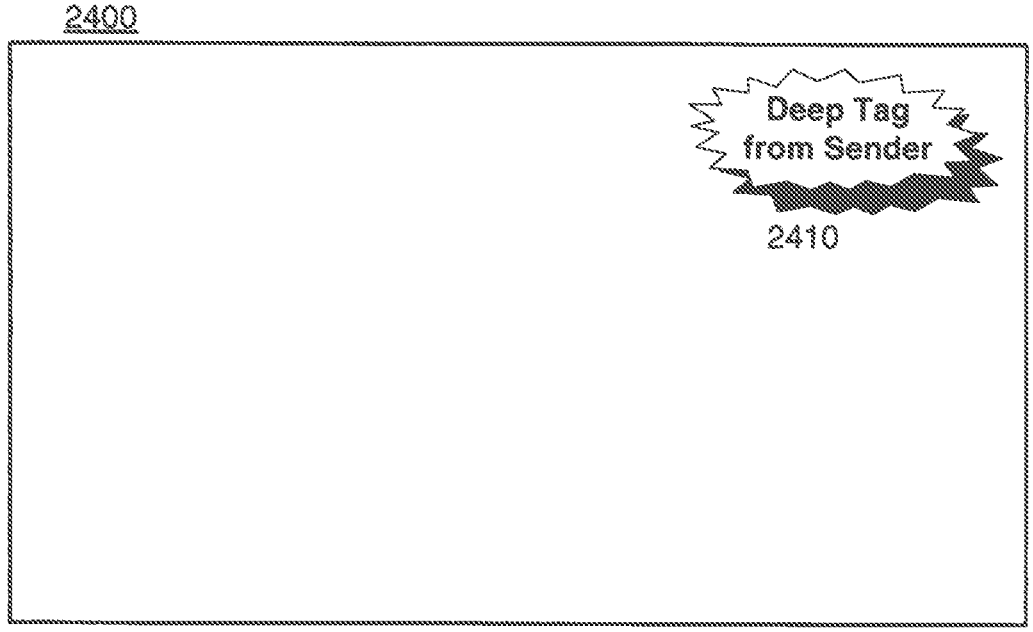
FIG. 42 is a diagram of a pop-up window for creating a deep tag.
FIG. 43 is a diagram of a recipient's screen showing reception of an instant deep tag.

FIG. 42 is a diagram of pop-up window 2350 for creating a deep tag. Window 2350 appears after a fast deep tag has been created, as described above. If the user does not wish to send the just-created deep tag to anyone, the user clicks on the cancel button. Otherwise, the user provides data and clicks on the send button. The provided data includes the sender's address, the recipient's address, the desired access permission, and whether instant deep tag sending is enabled.

Access permission refers to whether and how the recipient can alter the deep tag. At one level, no alterations are permitted. At the standard level, the recipient can add comments but cannot otherwise alter the deep tag. At another level, the recipient can create their own version of the deep tag, indicating more or less of the original movie and possibly indicating another movie, and inheriting the text associated with the first deep tag.

Instant deep tag sending is discussed below with regard to FIG. 43. If this is not enabled, the deep tag can be sent only as a hyperlink in an email message.

In one embodiment of movie system 10, a deep tag creator is either an anonymous user, a casual user or a formal user. Movie system 10 can consider deep tags created by some or all of anonymous, casual and formal users when determining the popularity or other statistic of a movie.

An anonymous user is not known to movie system 10. Deep tags created by an anonymous user are generally not stored for subsequent retrieval by the anonymous user, that is, they exist only while the anonymous user is interacting with the movie associated with the deep tag. Deep tags created by anonymous users have analytic value to movie system 10. An anonymous user can comment on and rate only their own deep tags. Movie system 10 tracks deep tags from anonymous users via a suitable temporary mechanism, such as a cookie.

A casual user is a user for which movie system 10 knows only his or her address, such as email address or instant message ID or telephone number. Typically, an anonymous user converts to a casual user by entering an address in the sender portion of pop-up window 2350. A casual user can comment on and rate only their own deep tags. Deep tags created by a casual user can be retrieved by the casual user, generally because a so-called cookie is stored on the casual user's access device, or because the casual user provides their address to movie system 10.

A formal user is a user that has registered with movie system 10 via a sign-up process involving creating a profile with a registered ID and demographic information relating to the user, and perhaps validating other of their information such as that their email address is actually controlled by them. Deep tags created by a formal user are stored in known content owner deep tag database 32 or unknown content owner deep tag database 34. A formal user can comment on and rate movies and deep tags created by other formal users, can upload and deep tag movies, can make deep tags and movies public, and can search and browse their deep tags and public deep tags created by other formal users. A formal user can be a content owner. Movie system 10 may periodically invite casual users to convert to formal users. The demographic information associated with formal users makes their activities more valuable to movie system 10 than the activities of casual or anonymous users. In various embodiments of movie system 10, the capabilities and privileges of a formal user may differ.

FIG. 43 is a diagram of a recipient's screen showing reception of an instant deep tag, that is, an icon that appears on a display and which can be clicked on to generate a pop-up window to play the movie segment indicated by the deep tag. The instant deep tag typically has the address of the sender, and sometimes includes descriptive text, if any, provided by the sender either when causing the deep tag to be instantly sent, or associated with the deep tag. A sample format for a pop-up player is shown in FIG. 28. In some embodiments, the pop-up player has the format shown in FIG. 36. At the conclusion of play, the pop-up player may automatically display the home page of the website that provides the movie associated with the deep tag. Typically, before the instant deep tag icon appears on the recipient's display, the recipient is asked whether he or she wishes to accept the deep tag. The recipient may specify in his or her profile that instant deep tags are permitted from certain senders, i.e., a whitelist, and may specify that instant deep tags are prohibited from certain senders, i.e., a blacklist; these specifications operate to automatically accept or refuse an instant deep tag, avoiding the acceptance question.

Figure 44:
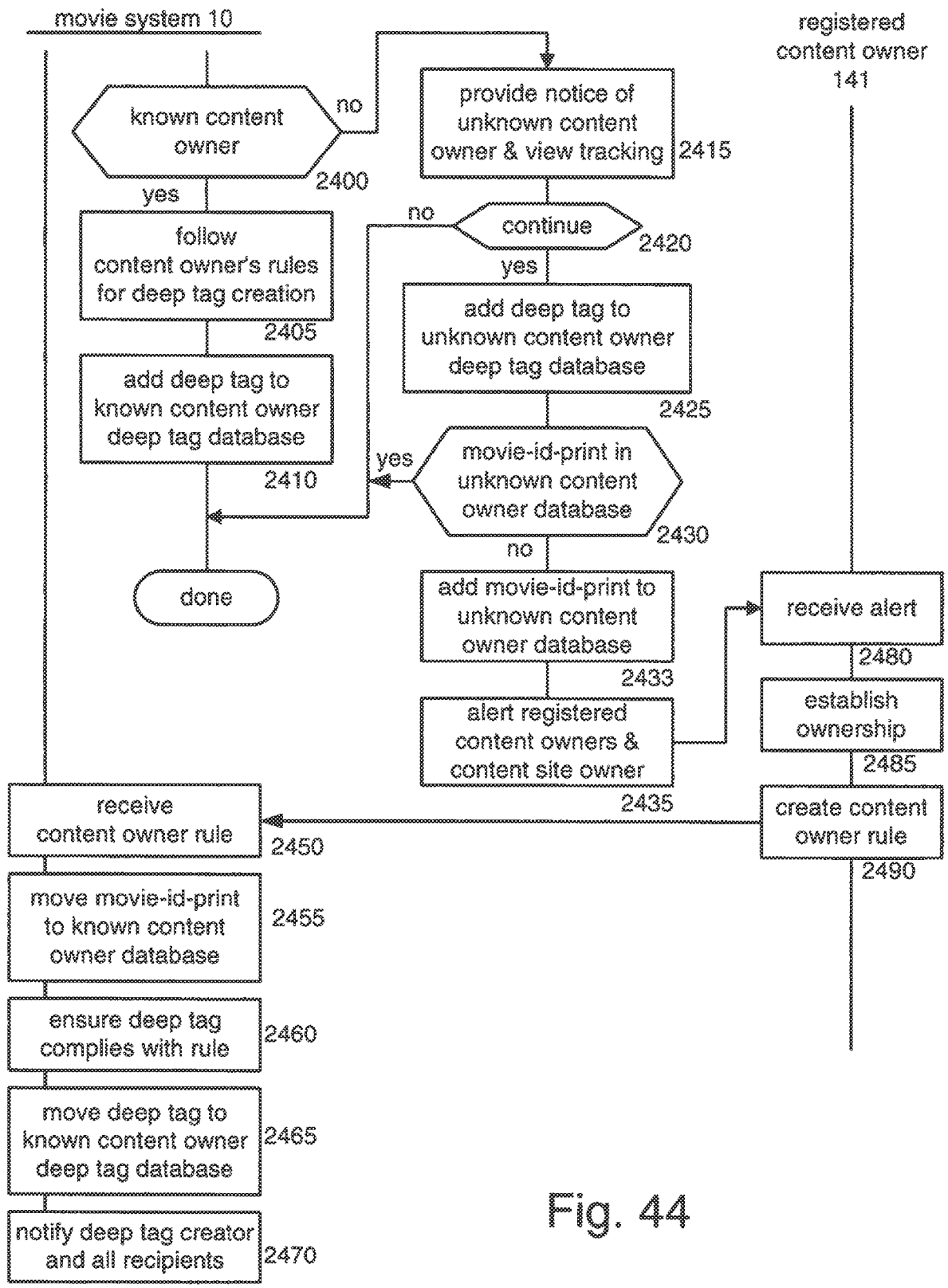
FIG. 44 is a flowchart showing details of creating and modifying deep tags.

FIG. 44 is a flowchart showing details of creating and modifying deep tags.

Let it be assumed that movie system 10 has received a request to create a deep tag, such as when a user clicks on deep tag button 740 or fast deep tag button 741.

At step 2400, movie system 10 determines whether the content owner of the movie is known, such as by checking known content owner movie-id-print database 31 or by recognizing that the movie is stored in movie storage 20. If the content owner is known, then at step 2405, movie system 10 follows the content owner's rules for deep tag creation relative to the movie. For example, the content owner may permit deep tags only to be made from a specified version of the movie, not from other copies thereof. As another example, the content owner may require that at the conclusion of play of a deep tagged segment, the player loads a particular webpage. As a further example, the content owner may require that the deep tag include one or more advertisements included in the content. As a yet further example, the content owner may require a share of revenue realized from viewing of the content or any deep tagged portion of the content. Other rules are contemplated such as controlling the ways in which deep tags can be combined, where some deep tags might only be allowed for combining with deep tags from the same content owner. At step 2410, the deep tag is added to known content owner deep tag database 32, and deep tag creation processing is complete.

However, if the content owner is unknown, then at step 2415, movie system 10 notifies the would-be creator that the content owner is unknown and so movie system 10 will be collecting data on who views the to-be-created deep tag, and when, and will be notifying recipients of the deep tag that if they click it, data about them will be collected. The notification is provided by a pop-up window, playing an audio file, or other suitable means. In some embodiments, the would-be creator notifies movie system 10 of whom the likely content owner is, such as by selecting from a menu of registered content owners and/or by providing contact information and/or a name of the content owner; this serves as a request for permission to use the content, which is generally forwarded by movie system 10 to the likely content owner. At step 2420, it is determined whether the would-be creator consents to the data collection. If not, processing is complete. If consent is provided, then at step 2425, movie system 10 creates the deep tag and adds it to unknown content owner deep tag database 34. Then, at step 2430, movie system 10 checks whether the movie has a movie-id-print in unknown content owner movie-id-print database 33. If so, this means that registered content owners have already been notified, and so processing is complete. If not, at step 2433, movie system 10 places the movie-id-print to unknown content owner database 33, and at step 2435, movie system 10 sends an alert to all registered content owners, or to a subset of all registered content owners, and to the owner of the site where the deep tagged movie resides, if the site owner is known. The subset may be determined by the text associated with the movie, by the similarity of the movie to movies with known content owners, or by another suitable method.

Registered content owner 141 is a party who has previously registered with movie system 10 to receive alerts when a movie with an unknown content owner is deep tagged. At step 2480, registered content owner 141 receives an alert from movie system 10. At step 2485, owner 141 determines whether they own the content, and if so, establishes ownership by a suitable procedure. In some cases, content ownership is established in response to other than alerts from movie system 10; that is, a content owner may otherwise become aware that its content is being used through movie system 10. At step 2490, owner 141 specifies rules for deep tagging the movie, and sends the rules to movie system 10.

At step 2450, movie system 10 receives the newly created content owner's rules for deep tagging. If not already done during step 2485, movie system 10 transfers the movie-id-print from database 33 to database 31. At step 2460, movie system 10 ensures that deep tags associated with the movie comply with the rules, and if they do not, either (a) the deep tags are suitably adjusted, or (b) the deep tag is rendered inactive, and the deep tag creator is invited to adjust the deep tag to make it active again. At step 2465, the deep tags associated with the movie are moved from database 34 to database 32. At step 2470, movie system 10 notifies the deep tag creator and all parties who have viewed the deep tag that the content owner is known, and any unauthorized copies should be destroyed or brought into compliance with the content owner's rules.

Dynamically updated viewer displays will now be discussed. First, dynamically updated deep tags will be discussed. Then, dynamically updated movie selections will be discussed.

Dynamically updated deep tags are relevant when a viewer is watching a movie in a manner in which the viewer can see the deep tags associated with the movie, such as:
- by viewing a thumbnail associated with the deep tag, shown for example as deep tag thumbnail 738A in FIG. 35;
- by viewing a popularity graph of the deep tags for a movie, shown for example as a color graph in graph area 1394 in FIG. 35, or density function 960 in FIG. 16 (that would be displayed in graph area 1394), or cloud graph 980 in FIG. 16 (that would be displayed in graph area 1394);
- by viewing a composited deep tag thumbnail, shown for example as deep tag thumbnail 2335 in FIG. 41; or
- by using a cursor positioning device such as a mouse to view information associated with deep tags indicated on a texture strip, such as deep tag imprint 2320 in FIG. 41.

Movie system 10 receives, in real time, information about how a viewer is interacting with a movie, such as clicking the play button, the pause button and so on. Accordingly, movie system 10 knows all current viewers of a movie.

When one viewer of a movie acts on a deep tag, such as creating, editing or deleting the deep tag, then the deep tag displays, if any, for all other viewers of the movie are updated to reflect the deep tag act. This is dynamically updated deep tag display.

It will be recalled that if the viewer is an anonymous user, the deep tags created by that viewer persist only for the duration of the viewer's session. Specifically, when movie system 10 determines that the anonymous user is no longer watching the movie, movie system 10 dynamically updates the displays of all other viewers of the movie to delete any deep tags created by the anonymous user.

In some embodiments, formal users and/or the owner of the movie and/or the owner of the website that provides the movie can control whether dynamically updated deep tag displays are supported. Specifically, some formal users may prefer to turn off this feature.

Dynamically updated movie selections enable movie system 10 to operate in a sort of narrowcast format. Different versions of dynamically updated movie selections are discussed. It will be appreciated that other versions of dynamically updated movie selections can be configured.

A first version of dynamically updated movie selections enables a formal user of movie system 10 to specify characteristics of movies that should be presented to the user, and then the user can just view in a passive mode, without selecting movies. Example characteristics are:
   the most popular movies that I haven't seen yet, in all of movie system 10
   the most popular movies that I haven't seen in the last week, in all of movie system 10
   the most popular movies that I haven't seen yet, among female viewers age 20-25 in New York and London
   the most popular movies that I haven't seen yet with the keyword "Paris"

In a variation of this version of dynamically updated movie selections, instead of the whole movie being displayed, only its deep tags with certain characteristics are displayed, such as its three most popular deep tags, deep tags created by users with certain demographic characteristics, or deep tags created by specifically named users.

A viewing trail is a particular sequence of movie viewing for a particular user. The viewing trail includes not only which movies were viewed, but also the actions taken for the movie, such as play, pause, fast forward, rewind and so on.

In another version of dynamically updated movie selections, formal users can designate their viewing trails as public or private. Movie system 10 assumes a default of "private" for viewing trails. A formal user can specify the level of public access to their viewing trails, e.g., open to all, open to anyone who pays, open to designated users (whitelist), open to all except designated users (blacklist), open to users with certain demographic characteristics, open to all except users with certain demographic characteristics, and so on.

If a formal user has public viewing trails, then another formal user can instruct movie system 10 to show the other formal user the movies that were viewed by the first formal user, such as in the first formal user's most recent movie viewing, on a specific day or meeting other characteristics. This is useful when the first formal user is a celebrity, or carefully selects their viewing trails. It will be appreciated that a public viewing trail is a simple version of a mash-up movie. However, the creator of the mash-up usually recognizes revenue from ads inserted into the mash-up. The creator of a viewing trail can recognize revenue from something akin to a subscription model. In most cases, creation of a viewing trail is easier to accomplish than creation of a mash-up movie. In a variation, the first formal user can create a viewing trail, and then email it to friends.

In a variation of this version of dynamically updated movie selections, instead of the whole movie being displayed, only its deep tags created by the first formal user are displayed.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for movie segment bookmarking and sharing, the method comprising:
   receiving, by a movie system executing on a processor through a user interface on a user device, an indication from a user to deep tag a portion of a video;
   responsive to the indication, generating, by the movie system, a deep tag that deep tags the portion of the video, the deep tag comprising a deep tag identifier identifying the deep tag, a deep tag start time specifying a start time of the portion of the video, a deep tag end time specifying an end time of the portion of the video, and a pointer to a deep tag snapshot;
   receiving, by the movie system through the user interface, an instruction to send the deep tag to a recipient, the instruction comprising a recipient identifier or address; and
   sending, by the movie system, the deep tag to the recipient using the recipient identifier or address, wherein activating the deep tag on a device of the recipient causes a player to begin executing on the device of the recipient to play the portion of the video deep tagged by the user.

2. The method according to claim 1, wherein the deep tag is sent to the recipient through a hyperlink in an email or an icon in an instant messaging system.

3. The method according to claim 1, wherein the device of the recipient comprises a phone, a mobile phone, or a smartphone.

4. The method according to claim 1, further comprising:
   receiving text from the user to accompany the deep tag, wherein the deep tag further comprises a deep tag text description containing the text from the user.

5. The method according to claim 1, further comprising:
   prior to generating the deep tag, determining an owner of the video and determining whether any rule set by the owner of the video applies to deep tag creation.

6. The method according to claim 1, further comprising:
   receiving an access permission for the deep tag from the user; and
   determining whether the recipient has the access permission prior to sending the deep tag to the recipient.

7. The method according to claim 1, wherein the deep tag snapshot comprises a thumbnail associated with the deep tag.

8. A movie system for movie segment bookmarking and sharing, the movie system comprising:
   a processor;
   a non-transitory computer-readable medium; and
   instructions stored on the non-transitory computer-readable medium and translatable by the processor for:

receiving, through a user interface on a user device, an indication from a user to deep tag a portion of a video;

responsive to the indication, generating a deep tag that deep tags the portion of the video, the deep tag comprising a deep tag identifier identifying the deep tag, a deep tag start time specifying a start time of the portion of the video, a deep tag end time specifying an end time of the portion of the video, and a pointer to a deep tag snapshot;

receiving, through the user interface, an instruction to send the deep tag to a recipient, the instruction comprising a recipient identifier or address; and sending the deep tag to the recipient using the recipient identifier or address, wherein activating the deep tag on a device of the recipient causes a player to begin executing on the device of the recipient to play the portion of the video deep tagged by the user.

9. The movie system of claim 8, wherein the deep tag is sent to the recipient through a hyperlink in an email or an icon in an instant messaging system.

10. The movie system of claim 8, wherein the device of the recipient comprises a phone, a mobile phone, or a smartphone.

11. The movie system of claim 8, wherein the instructions are further translatable by the processor for:

receiving text from the user to accompany the deep tag, wherein the deep tag further comprises a deep tag text description containing the text from the user.

12. The movie system of claim 8, wherein the instructions are further translatable by the processor for:

prior to generating the deep tag, determining an owner of the video and determining whether any rule set by the owner of the video applies to deep tag creation.

13. The movie system of claim 8, wherein the instructions are further translatable by the processor for:

receiving an access permission for the deep tag from the user; and determining whether the recipient has the access permission prior to sending the deep tag to the recipient.

14. The movie system of claim 8, wherein the deep tag snapshot comprises a thumbnail associated with the deep tag.

15. A computer program product for movie segment bookmarking and sharing, the computer program product comprising a non-transitory computer-readable medium storing instructions translatable by a processor of a movie system for:

receiving, through a user interface on a user device, an indication from a user to deep tag a portion of a video;

responsive to the indication, generating a deep tag that deep tags the portion of the video, the deep tag comprising a deep tag identifier identifying the deep tag, a deep tag start time specifying a start time of the portion of the video, a deep tag end time specifying an end time of the portion of the video, and a pointer to a deep tag snapshot;

receiving, through the user interface, an instruction to send the deep tag to a recipient, the instruction comprising a recipient identifier or address; and sending the deep tag to the recipient using the recipient identifier or address, wherein activating the deep tag on a device of the recipient causes a player to begin executing on the device of the recipient to play the portion of the video deep tagged by the user.

16. The computer program product of claim 15, wherein the deep tag is sent to the recipient through a hyperlink in an email or an icon in an instant messaging system.

17. The computer program product of claim 15, wherein the device of the recipient comprises a phone, a mobile phone, or a smartphone.

18. The computer program product of claim 15, wherein the instructions are further translatable by the processor for:

receiving text from the user to accompany the deep tag, wherein the deep tag further comprises a deep tag text description containing the text from the user.

19. The computer program product of claim 15, wherein the instructions are further translatable by the processor for:

prior to generating the deep tag, determining an owner of the video and determining whether any rule set by the owner of the video applies to deep tag creation.

20. The computer program product of claim 15, wherein the instructions are further translatable by the processor for:

receiving an access permission for the deep tag from the user; and determining whether the recipient has the access permission prior to sending the deep tag to the recipient.

* * * * *